United States Patent
Kawabe et al.

(10) Patent No.: US 9,517,559 B2
(45) Date of Patent: Dec. 13, 2016

(54) ROBOT CONTROL SYSTEM, ROBOT CONTROL METHOD AND OUTPUT CONTROL METHOD

(71) Applicant: HONDA MOTOR CO., LTD., Tokyo (JP)

(72) Inventors: Koji Kawabe, Wako (JP); Taro Yokoyama, Wako (JP); Takayuki Kanda, Soraku-gun (JP); Satoru Satake, Soraku-gun (JP); Takamasa Iio, Soraku-gun (JP); Kotaro Hayashi, Soraku-gun (JP); Florent Ferreri, Soraki-gun (JP)

(73) Assignee: HONDA MOTOR CO., LTD., Tokyo (JP)

( * ) Notice: Subject to any disclaimer, the term of this patent is extended or adjusted under 35 U.S.C. 154(b) by 344 days.

(21) Appl. No.: 14/498,871

(22) Filed: Sep. 26, 2014

(65) Prior Publication Data

US 2015/0094851 A1   Apr. 2, 2015

(30) Foreign Application Priority Data

Sep. 27, 2013 (JP) ................... 2013-202373
Sep. 27, 2013 (JP) ................... 2013-202375
Sep. 27, 2013 (JP) ................... 2013-202688

(51) Int. Cl.
*B25J 11/00* (2006.01)
*B25J 9/16* (2006.01)
*G05D 1/02* (2006.01)

(52) U.S. Cl.
CPC ........... *B25J 9/1664* (2013.01); *B25J 11/0005* (2013.01); *G05D 1/0251* (2013.01);
(Continued)

(58) Field of Classification Search
CPC ... B25J 11/0005; B25J 9/1664; G05D 1/0251; G05D 2201/0217; Y10S 901/47; Y10S 901/01; A61H 3/06; A61H 3/061; A61H 2003/063; A61H 2003/065; A61H 3/066; A61H 3/068
(Continued)

(56) References Cited

U.S. PATENT DOCUMENTS

2003/0171850 A1* 9/2003 Kobayashi .............. G10L 13/00
                                                      700/272
2005/0137747 A1* 6/2005 Miro ....................... G06N 3/008
                                                      700/245

(Continued)

FOREIGN PATENT DOCUMENTS

JP      2005131713 A   *  5/2005
JP      2010-231470 A     10/2010

(Continued)

OTHER PUBLICATIONS

Shiomi et al., "Field Trial of Networked Social Robots in a Shopping Mall", The 2009 IEEE/RSJ International Conference on Intelligent Robots and Systems, Oct. 11-15, 2009, pp. 2846-2853.

(Continued)

*Primary Examiner* — Stephen Holwerda
(74) *Attorney, Agent, or Firm* — Westerman, Hattori, Daniels & Adrian, LLP

(57) ABSTRACT

A robot control system detects a position and a direction of each user by a plurality of range image sensors provided in an exhibition hall. A central controller records an inspection action after a user attends the exhibition hall until the user leaves to generate an inspection action table. When the user attends again, the central controller reads a history of inspection action from the inspection action table. Then, the central controller chooses from an utterance content table an utterance content containing a phrase that mentions the inspection action included in the history at a time of last time attendance, determines the utterance content, and makes a robot output the determined utterance content to the user.

22 Claims, 33 Drawing Sheets

(52) U.S. Cl.
CPC ..... *G05D 2201/0217* (2013.01); *Y10S 901/01* (2013.01); *Y10S 901/47* (2013.01)

(58) Field of Classification Search
USPC .......................................................... 700/257
See application file for complete search history.

(56) References Cited

U.S. PATENT DOCUMENTS

| | | | | |
|---|---|---|---|---|
| 2005/0222712 | A1* | 10/2005 | Orita | G10L 15/26 700/246 |
| 2008/0109114 | A1* | 5/2008 | Orita | B25J 19/005 700/248 |
| 2011/0238212 | A1* | 9/2011 | Shirado | G05D 1/0274 700/246 |

FOREIGN PATENT DOCUMENTS

| | | |
|---|---|---|
| JP | 2011-20223 A | 2/2011 |
| JP | 2011-224737 A | 11/2011 |
| JP | 5077077 B2 | 11/2012 |

OTHER PUBLICATIONS

Shiomi et al., "Interactive Humanoid Robots for a Science Museum" Interacting with Autonomy, Mar./Apr. 2007, pp. 25-32.

* cited by examiner

PLAN VIEW

USER MANAGEMENT TABLE 334

| USER | NUMBER OF ATTENDANCE TIMES | ATTENDANCE FLAG |
|---|---|---|
| AAA | 2 | 1 |
| BBB | 3 | 0 |
| ⋮ | ⋮ | ⋮ |
|  |  |  |
|  |  |  |
|  |  |  |
|  |  |  |

FIG. 9

INSPECTION ACTION TABLE 336

USER AAA

| NUMBER OF ATTENDANCE TIMES | EXHIBITIONS | INSPECTION TIME PERIOD (SEC.) | MOVING LOCUS |
|---|---|---|---|
| 1 | E1 | 300 | |
| 1 | E2 | 60 | |
| 1 | E3 | 40 | |
| 2 | E1 | | |
| 2 | E2 | | |
| 2 | E3 | | |
| ⋮ | ⋮ | ⋮ | ⋮ |

FIG. 10

UTTERANCE CONTENT TABLE 336

| CONTENT NUMBER | CONTENTS |
|---|---|
| 1 | "Although it seems you did not see very much last time, please see slowly this time" |
| 2 | "Although it seems you did see the exhibition Ei well last time, please also see the exhibition Ej this time" |
| 3 | "Although it seems you did see various exhibitions last time, please see thoroughly this time also" |
| 4 | "Since there is a new exhibition Enew, please see it" |
| ⋮ | ⋮ |

FIG. 13
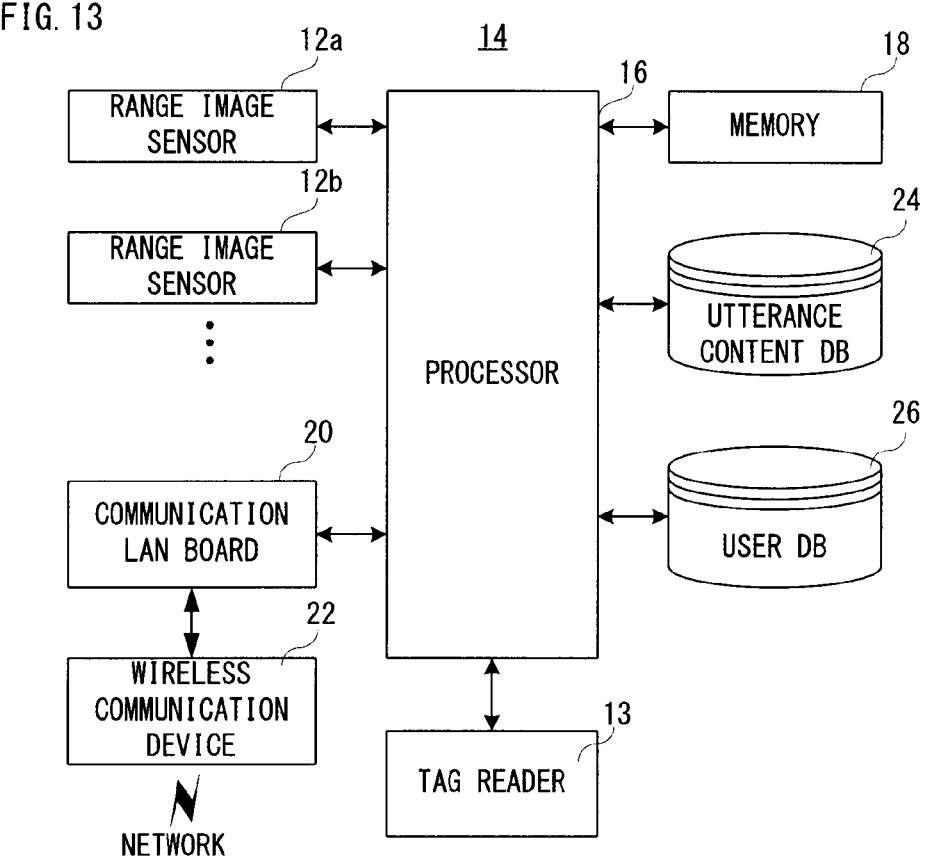
FIG. 14 PLAN VIEW
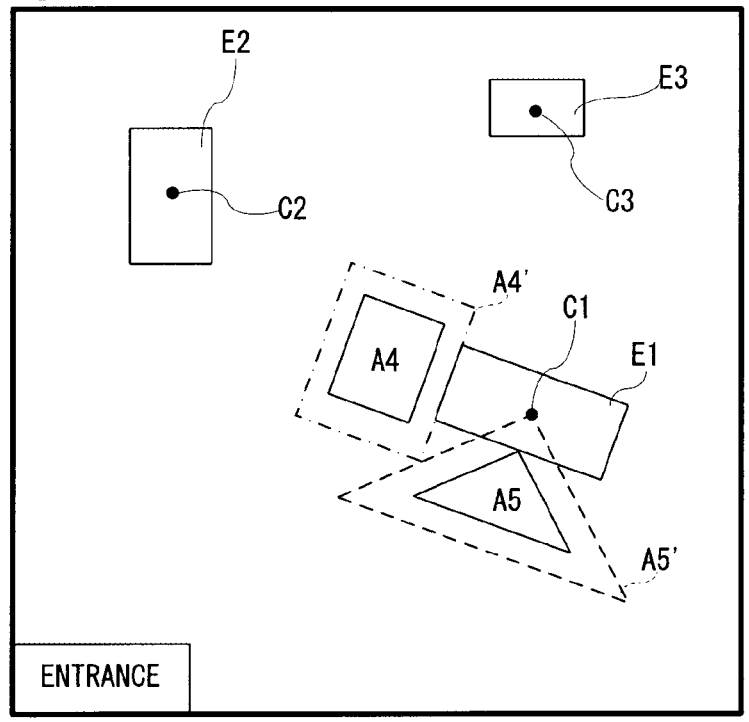

UTTERANCE CONTENT DB

| NUMBER | CENTER POINT | EXPLAIN-ABLE RANGE | EXPLAIN STOP RANGE | CONTENTS |
|---|---|---|---|---|
| 1 | C1 | A1 | A1' | "This (with pointing) is electric socket" "Electricity is charged from here (with pointing)" ⋮ |
| 2 | C1 | A2 | A2' | "This motor (with pointing) also bears cooling" ⋮ |
| ⋮ | ⋮ | ⋮ | ⋮ | ⋮ |

FIG. 18

USER DB

| USER ID | EXHIBITIONS | DEEPENING (SPECIALTY) | SPREAD |
|---|---|---|---|
| 001 | E1 | 3 | 0 |
| | E2 | 0 | 2 |
| | ⋮ | ⋮ | ⋮ |
| 002 | E1 | 0 | 1 |
| | E2 | 0 | 0 |
| | ⋮ | ⋮ | ⋮ |
| ⋮ | ⋮ | ⋮ | ⋮ |

FIG. 19

UTTERANCE CONTENT DB

| NUMBER | CENTER POINT | EXPLAIN-ABLE RANGE | EXPLAIN STOP RANGE | DEEPENING (SPECIALTY) | SPREAD | CONTENTS |
|---|---|---|---|---|---|---|
| 1 | C1 | A1 | A1' | 0 | 0 | "This (with pointing) is electric socket" |
| | | | | 1 | 0 | "Electricity is charged from here (with pointing), battery is of lithium ion" |
| | | | | 0 | 1 | "Electric bicycle capable of being charged in the same way at home seems to be sold" |
| | | | | ... | ... | ... |
| 2 | C1 | A2 | A2' | 0 | 0 | "This (with pointing) is motor" |
| | | | | 1 | 0 | "This motor (with pointing) is attached with fun look closely, and bears cooling, too" |
| | | | | 0 | 1 | "60 km per hour appears with this motor" |
| ... | ... | ... | ... | ... | ... | ... |

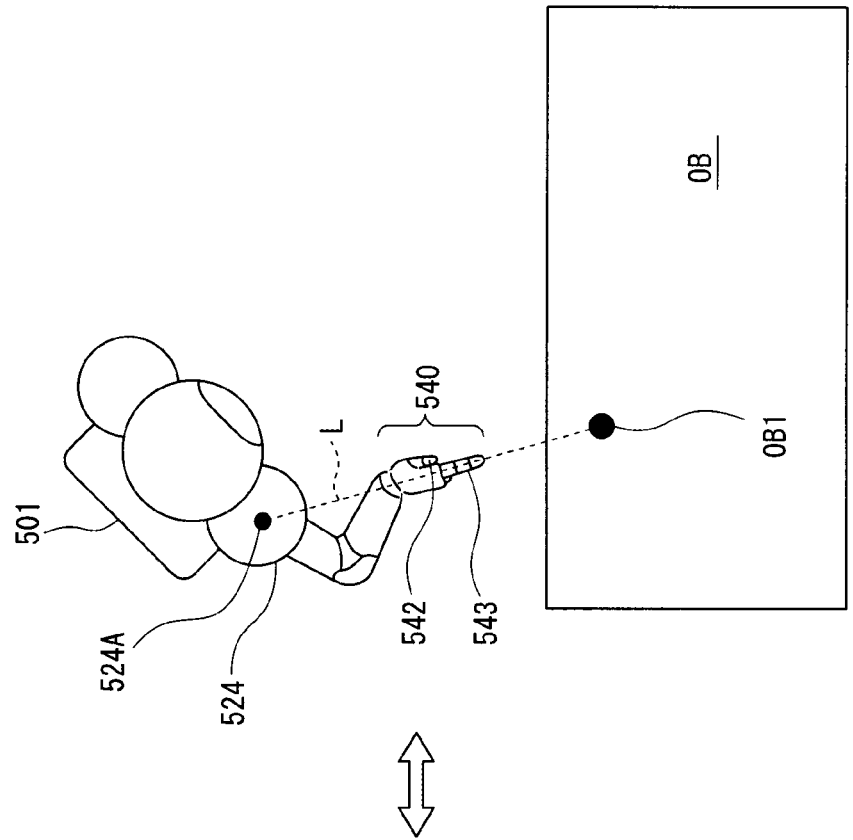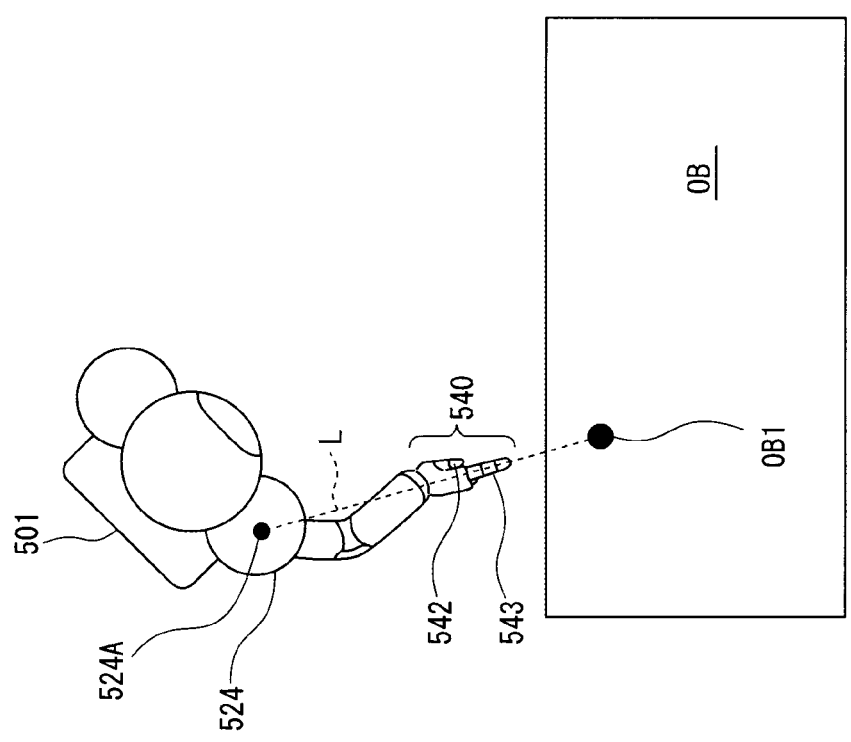
FIG. 34

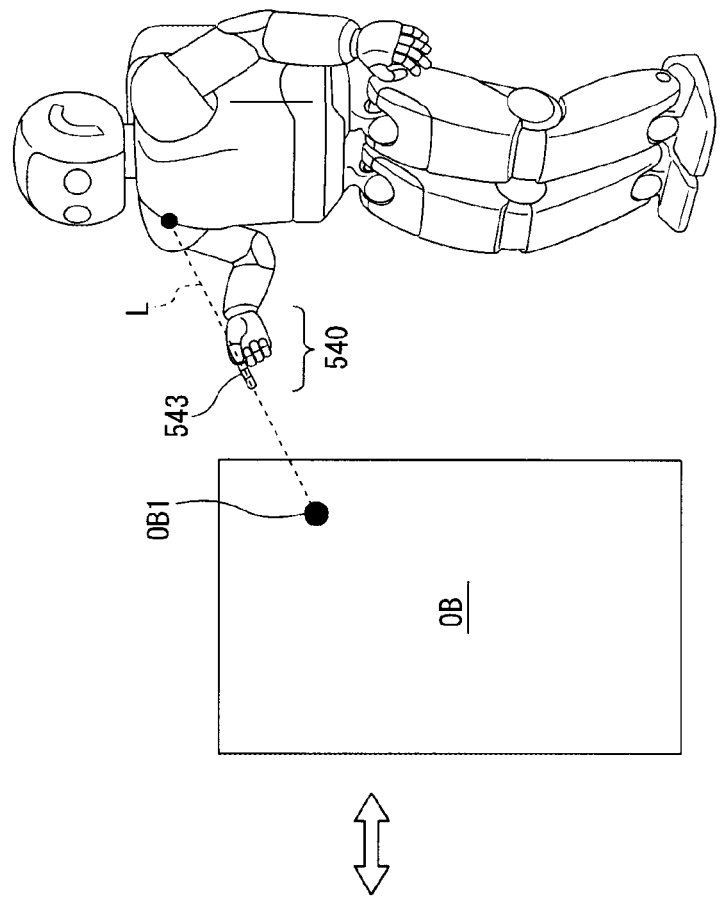
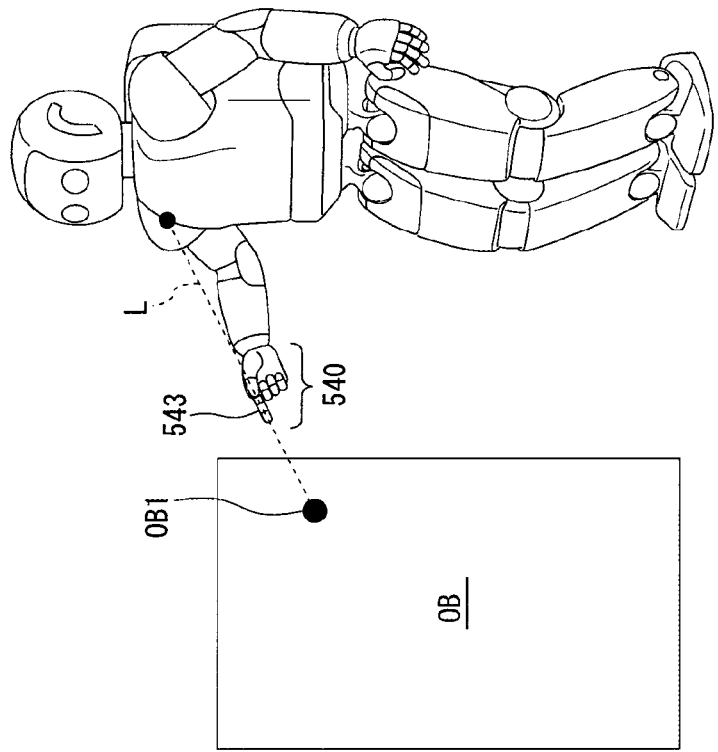
FIG. 35

TWIST AMOUNT OF WAIST JOINT PORTION [°]

ANGLE DIFFERENCE (X−L)

ROBOT CONTROL SYSTEM, ROBOT CONTROL METHOD AND OUTPUT CONTROL METHOD

CROSS REFERENCE OF RELATED APPLICATION

The disclosures of Japanese Patent Application Nos. 2013-202373, 2013-202375 and 2013-202688 are incorporated herein by reference.

BACKGROUND OF THE INVENTION

Field of the Invention

The present invention relates to a robot control system, robot control method and output control method, and more specifically, a robot control system, robot control method and output control method, providing an attendant with guidance information such as an explanation about an exhibition as an utterance content.

Description of the Related Art

An example of a background art is disclosed in, Masahiro Shiomi, Takayuki Kanda, Hiroshi Ishiguro and Norihiro Hagita, Interactive Humanoid Robots for a Science Museum, IEEE Intelligent Systems, vol. 22, no. 2, pp. 25-32, March/April 2007 (Non-patent literature 1). In the non-patent literature 1, a robot that shows an inside of a science museum explains to a user an exhibition that the user has not seen yet from an inspection history in the science museum.

Furthermore, another example of the background art is disclosed in, M. Shiomi, T. Kanda, D. F. Glas, S. Satake, H. Ishiguro and N. Hagita, Field Trial of Networked Social Robots in a Shopping Mall, IEEE/RSJ Int. Conf. on Intelligent Robots and Systems (IROS2009), pp. 2846-2853, 2009 (Non-patent literature 2). According to the non-patent literature 2, a robot approaches a user and provides the user with service corresponding to that place.

In addition, a still another example of the background art is disclosed in, Japanese patent application laying-open No. 2010-231470 [B25J 13/00, G06Q 50/00] laid-open on Oct. 4, 2010 (Patent literature 1). In the patent literature 1, a broader action of a human being who moves at a shopping mall is predicted, and a robot provides with recommendation information the human being that the broader action is predicted.

In addition, a further example of the background art is disclosed in, Japanese patent application laying-open No. 2011-224737 [B25J 9/22, B25J 5/00] laid-open on Nov. 10, 2011 (Patent literature 2). For example, research on a robot that guides an exhibition, etc. is advanced. Then, in the patent literature 2, there is disclosed an invention of a robot that has two arm portions, and performs an operation for pointing at an object with either one of arm portions.

In addition, a further example of the background art is disclosed in, Japanese patent application laying-open No. 2011-20223 [B25J 13/00] laid-open on Feb. 3, 2011 (Patent literature 3). In the patent literature 3, there is disclosed a technology that a laser display is provided other than an explanation robot for an exhibition, and a guidance voice about the exhibition that the laser is irradiated is reproduced.

Then, the other example of the background art is disclosed in, Japanese patent No. 5077077 [B25J 13/08, B25J 5/00] registered on Sep. 7, 2012 (laid-open on Dec. 10, 2009) (Patent literature 4). In the patent literature 4, there is disclosed an invention about a robot that moves to a position for explaining an exhibition without interrupting the gaze of a looker that is turned to the exhibition.

However, although the non-patent literature 1 is effective as a guiding robot that gets the user to see as many exhibitions as possible, since restricted to guidance on that place, the robot may not necessarily give an appropriate explanation for the user.

Moreover, in the non-patent literature 2, since a plurality of users who visit the same place are not necessarily interested in the same thing, there is possibility that the robot provides erroneous service to the users. Furthermore, in the patent literature 1, since a plurality of human beings that the same broader actions are predicted may not be interested in the same thing, it is thought that the robot provides erroneous recommendation information. Accordingly, the robot of the non-patent literature 2 or the patent literature 1 cannot provide the information that is suitable for the person getting interested in the exhibition in the exhibition hall that the exhibitions are placed.

Moreover, in the patent literatures 2 to 4, when the robot that autonomously moves points at the object for guidance, there is a case where the gaze of a person who receives the guidance cannot be guided effectively.

SUMMARY OF THE INVENTION

Therefore, it is a primary object of the present invention to provide a novel robot control system, robot control method and output control method.

It is another object of the present invention to provide a robot control system and robot control method, capable of providing appropriate guidance information.

It is a still another object of the present invention to provide a robot control system and output control method, capable of providing an utterance content appropriately.

It is the other object of the present invention capable to provide a robot control system, capable of guiding more effectively a gaze of a person who receives guidance.

A first aspect of the present invention is a robot control system including a robot that outputs an utterance content to a user in an exhibition hall placing an exhibition, comprising: a recording module that records an inspection action of a user at a time of attendance of the user as a history; and a first output module that makes the robot, when the user attends again, output an utterance content that is determined based on the history.

A second aspect of the present invention is a robot control method performed by a computer of a robot control system including a robot that outputs a utterance content to a user in an exhibition hall placing an exhibition, comprising steps of: recording an inspection action of a user at a time of attendance of the user as a history; and making the robot, when the user attends again, output an utterance content that is determined based on the history.

A third aspect of the present invention is a robot control system including a robot capable of autonomously moving in a space that an exhibition is placed, comprising: an acquiring module that acquires a position and a direction of a user in the space; a first determining module that determines whether the user enters a predetermined range corresponding to the exhibition; a second determining module that determines whether the direction of the user turns to the exhibition, and an outputting module that makes the robot output an utterance content about the exhibition when it is determined that the user enters the predetermined range and that the direction of the user turns to the exhibition.

A fourth aspect of the present invention is an output control method in a robot control system including a robot capable of autonomously moving in a space that an exhibition is placed, wherein a processor of the robot control system performing: an acquiring step that acquires a position and a direction of a user in the space; a first determining step that determines whether the user enters a predetermined range corresponding to the exhibition; a second determining step that determines whether the direction of the user turns to the exhibition, and an outputting step that makes the robot output an utterance content about the exhibition when it is determined that the user enters the predetermined range and that the direction of the user turns to the exhibition.

BRIEF DESCRIPTION OF THE DRAWINGS

FIG. 9 is a view showing an example of an inspection action table shown in FIG. 7.

FIG. 10 is a view showing an example of an utterance content table shown in FIG. 7.

FIG. 13 is a block diagram showing a further example of the electric structure of the central controller shown in FIG. 1.

FIG. 14 is a view showing a further example of a plan view (map) of the exhibition hall shown in FIG. 1.

FIG. 18 is a view showing an example of structure of a user DB shown in FIG. 13.

FIG. 19 is a view showing a further example of structure of the utterance content DB shown in FIG. 13.

FIG. 34 is a view schematically showing an operation performed by the robot 501 when pointing at an object.

FIG. 35 is a view schematically showing an operation performed by the robot 501 when pointing at an object.

DETAILED DESCRIPTION OF THE PREFERRED EMBODIMENTS

First Embodiment

Figure 1:
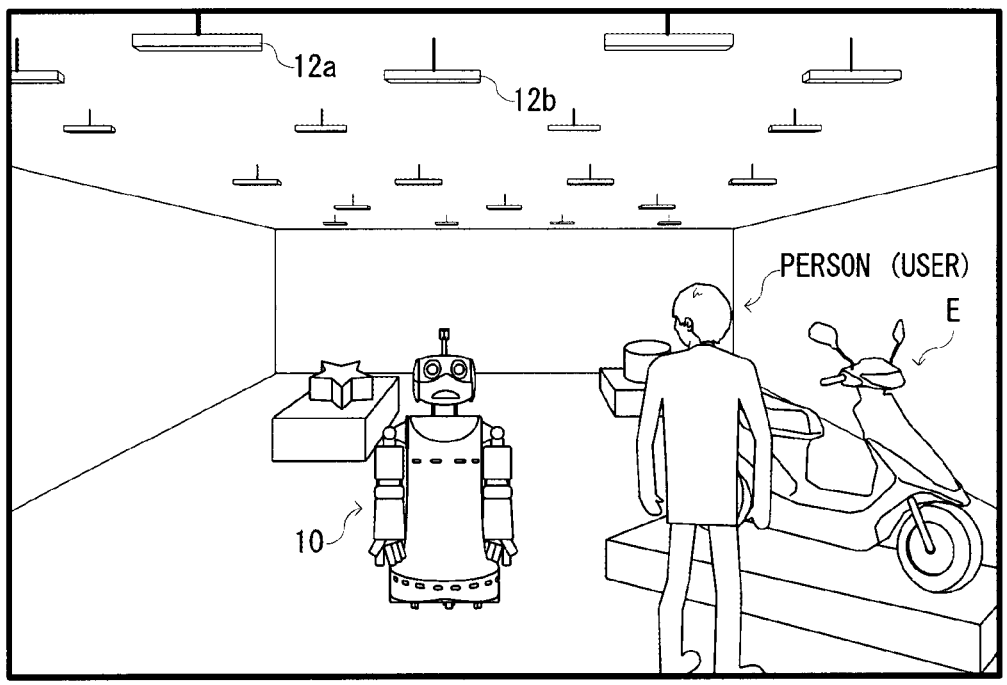
FIG. 1 is a view showing an example of an exhibition hall that a robot control system of one embodiment according to the present invention is applied.

With reference to FIG. 1, a robot control system 100 of this embodiment is used in a space (environment) such as an exhibition hall that exhibitions E are placed. In the exhibition hall, a person (a user or attendant) and a robot 10 can move arbitrarily, and a plurality of range image sensors 12 (12a, 12b, - - - ) for detecting positions and directions of those bodies of all the users and the robots in this exhibition hall are provided on a ceiling.

The robot 10 is also an interaction-oriented robot (communication robot), and having a function to perform a communication action with a communication object such as a user with using a body action such as a gesture and/or a voice. Furthermore, the robot 10 offers, as part of the communication, service of outputting an explanation (utterance content) about the exhibition E to a user and guiding the exhibition hall. If required to providing the service, the robot 10 autonomously moves in an inside of the exhibition hall, or operates based on action instructions applied by a central controller 14.

Furthermore, although the space of the embodiment is the exhibition hall that the exhibitions E are placed, not limited to this, the robot control system 100 is usable in a shopping mall, a floor of a company, a museum, an attraction hall, etc.

In addition, although only one user is shown in FIG. 1 for simplifying, much more users may be in the exhibition hall. Similarly, although only one robot 10 is shown, the robot control system 100 can simultaneously control two or more robots 10.

Figure 2:
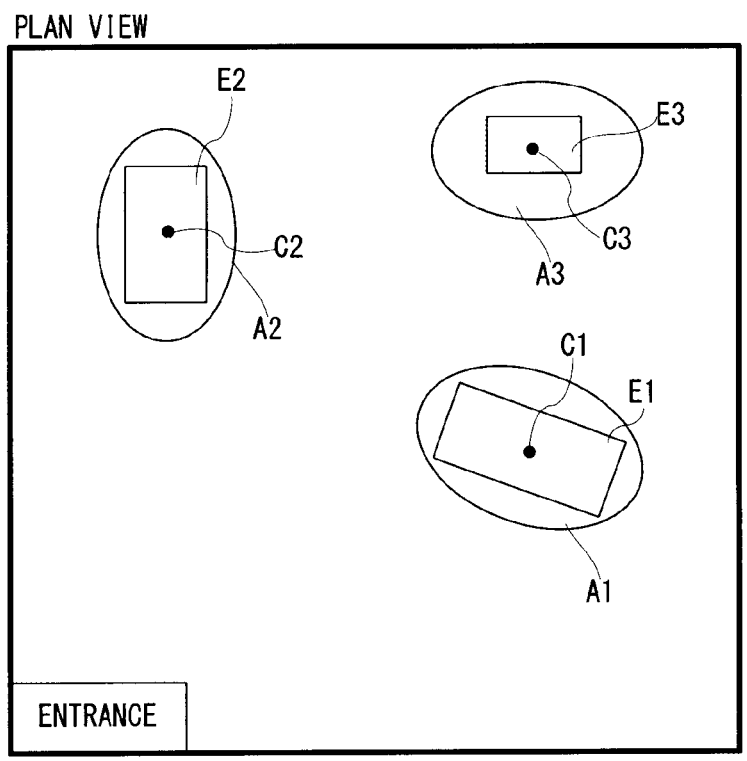
FIG. 2 is a view showing an example of a plan view (map) of the exhibition hall shown in FIG. 1.
Figure 3:
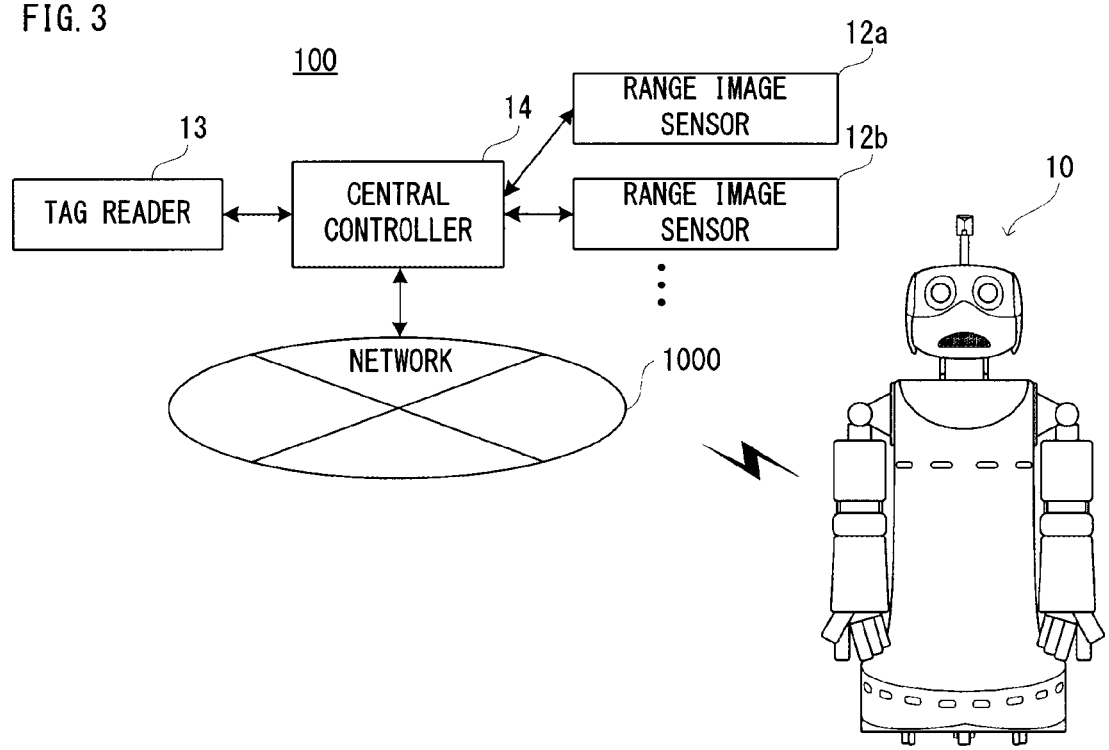
FIG. 3 is a view showing an outline of the robot control system of one embodiment according to the present invention.
Figure 4:
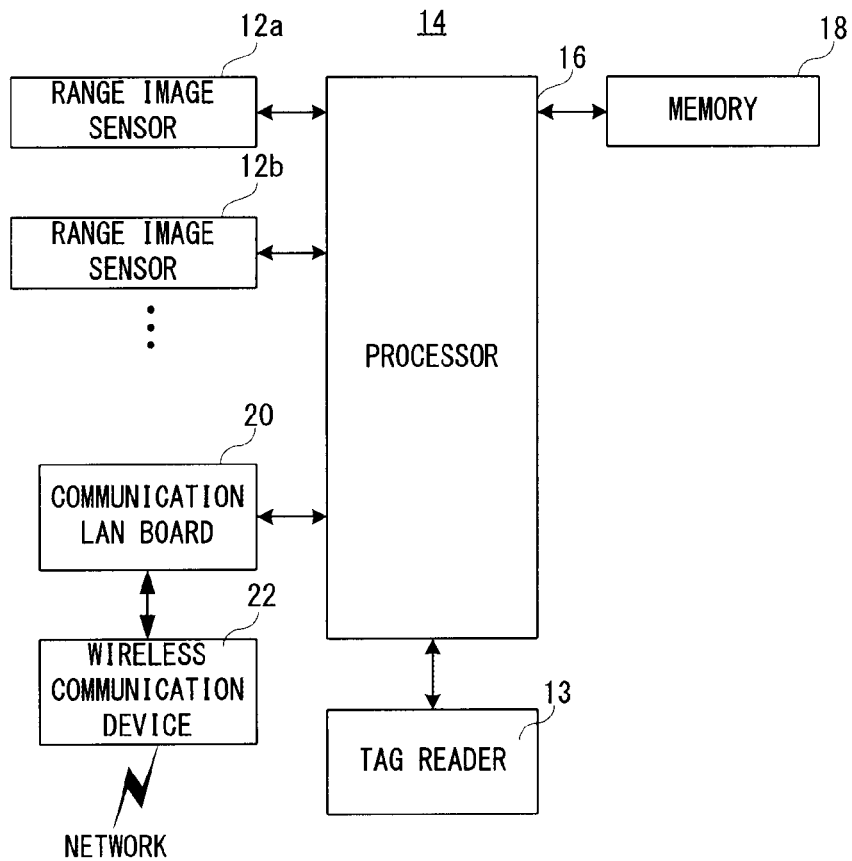
FIG. 4 is a block diagram showing an example of electric structure of a central controller shown in FIG. 3.

FIG. 2 is a map showing planar positions of such an exhibition hall (space). With reference to FIG. 2, a plurality (three, in this embodiment) of exhibitions E (E1, E2, E3) are placed in the exhibition hall. An entrance is formed in the exhibition hall and a tag reader 13 (FIG. 3, FIG. 4) for reading data of an RFID tag is installed in the entrance. For example, a user enters the exhibition hall after making the tag reader read the RFID tag himself/herself owns. A user ID is stored in the RFID tag, and the tag reader reads the user ID from the RFID tag, and sends the user ID to the central controller 14 (FIG. 3, FIG. 4).

In addition, an arbitrary one can be used as an RFID tag. However, since this embodiment intends to provide appropriate guidance information (to output an utterance content, for example) with reference to a history of the last time inspection action when the same attendant comes the second time and afterwards, it is necessary in this embodiment to specify the attendant (user) individually. Therefore, as a RFID tag to be used in the embodiment, a tag that is peculiar to each individual and installed in a member card, portable phone (including smartphone), car key or the like, for example, can be considered.

However, a user individual may be specified by providing a camera at the entrance of the exhibition hall and by performing image processing of a user's face image that is photographed by the camera. Then, a trouble making a user show a RFID tag is avoidable.

Each of explainable ranges A1, A2 and A3 is set for each corresponding exhibition E1, E2 and E3 in the exhibition hall, respectively. The explainable range A means such a range that if the user enters in this range, the robot 10 can provide the user with the explanation (guidance information) about the exhibition. Coordinates data such as a position, shape, size, etc. of each of the explainable ranges A1, A2 and A3 are stored in advance as map data 332 described later (FIG. 7) together with coordinates data such as a position of each of center points C1, C2 and C3, shape, size, etc. of each of corresponding exhibitions E1, E2 and E3.

In addition, in this embodiment, when the user exists in the explainable range Ai of the exhibition Ei, it is assumed that the user inspects the exhibition Ei.

With reference to FIG. 3, the central controller 14 of the robot control system 100 detects, at every predetermined time period (one second, for example), a position of a user who moves arbitrarily and a direction of the user, by the range image sensors 12a, 12b, - - - . Furthermore, the central controller 14 performs a wireless communication with the robot 10 through a network 1000, and if needed, controls an action or behavior of the robot 10. A user ID is applied to the user whom position is detected in the space.

FIG. 4 is a block diagram showing electric structure of the central controller 14. With reference to FIG. 4, the central controller 14 includes the range image sensors 12a and 12b, the tag reader 13, a processor 16, etc. The processor 16 may be called a computer or CPU (Central Processing Unit). In addition to the range image sensor 12a and the range image sensor 12b mentioned previously, other range image sensors 12 are connected to the processor 16. In addition, when the range image sensors 12a and 12b do not need to be distinguished, simply called the "range image sensor 12."

A memory 18 and a communication LAN board 20 are connected to the processor 16.

The range image sensor 12 irradiates a light such as an infrared light or laser, and captures a light reflected from the object (reflected light) by an optical sensor such as a CCD (Charge Coupled Device) sensor, etc. The range image sensor 12 measures an actual distance to the object by measuring a time until the reflected light returns for each pixel. The product called Xtion (registered trademark) made by ASUS (registered trademark) is adopted as the range image sensor 12 in the embodiment. In addition, in other embodiments, it is possible to use Kinect (registered trademark) sensor of Microsoft (registered trademark), three-dimensional range image sensor D-IMager (registered trademark) of Panasonic (registered trademark), etc. as the range image sensor 12. Such a kind of sensor may be called a three-dimensional distance measurement sensor, 3D scanner, etc.

The processor 16 acquires three-dimensional information of the target (user) through such the range image sensor 12. A shape of the target and a distance to the target are included in the three-dimensional information from the range image sensor 12. For example, if sensing of the user is performed by the range image sensor 12 provided on the ceiling, shapes of a head and both shoulders of the user at a time of viewing the user from the top, and distances to the head and to the both shoulders are acquired as three-dimensional information.

Thirty five (35) range image sensors 12, for example are installed in the exhibition hall at predetermined positions (already-known), and the processor 16 acquires the three-dimensional information from each of them, and can calculate the position (position coordinates (x, y, z) of a feature point such as the center of gravity, for example) of the user in the three-dimensional space (in a world coordinates system) and the direction of the user (direction of feature portions such as a head and both shoulders, for example).

In addition, in other embodiments, the position and the direction of the user may be detected not using the range image sensor 12 but using two-dimensional or three-dimensional LRF (Laser Range Finder).

The memory 18 may include a ROM (Read Only Memory), a HDD (Hard Disk Drive), and a RAM (Random Access Memory). A control program for controlling an operation of the central controller 14 is stored in advance in the ROM and the HDD. Furthermore, the RAM is also used as a working memory and a buffer memory for the processor 16.

The communication LAN board 20 is constructed by a DSP(s), for example, and applies send data that is given from the processor 16 to a wireless communication device 22 that in turn sends the send data to the robot 10 through a network 1000. For example, the send data is data required for autonomous movement of the robot 10, data required for providing the service, a signal (command) for instructing action instructions to the robot 10, etc. Furthermore, the communication LAN board 20 receives data via the wireless communication device 22, and applies received data to the processor 16.

In addition, in other embodiments, the central controller 14 may be provided with an output device such as a display and an input device such as a mouse, keyboard, etc.

Figure 5:
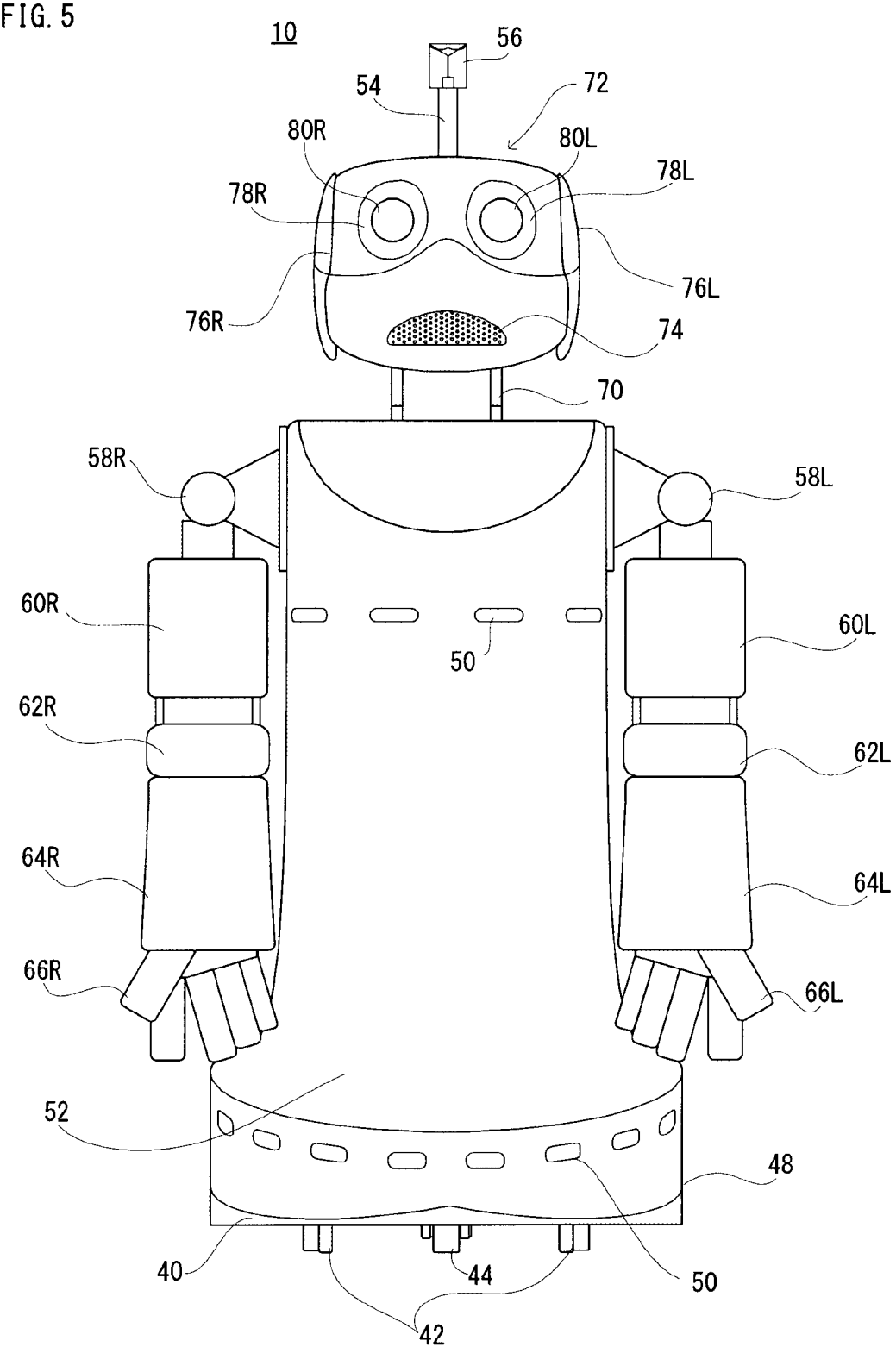
FIG. 5 is a view that an appearance of an example of a robot used in the embodiment shown in FIG. 3 is viewed from the front.

FIG. 5 is a front view showing an appearance of the robot 10 of this embodiment. With reference to FIG. 5, the robot 10 includes a truck 40, and two wheels 42 and one trailing wheel 44 are provided on an undersurface of the truck 40 for making the robot 10 autonomously move. The two wheels 42 are independently driven by a wheel motor 46 (see FIG. 6), and therefore, it is possible to make the truck 40, that is, the robot 10 move in an arbitrary direction of front and rear, right and left. Furthermore, the trailing wheel 44 is an auxiliary wheel that assists the wheels 42. Accordingly, the robot 10 can move by autonomous control in the inside of the space that the robot 10 is arranged.

On the truck 40, a sensor attachment panel 48 of a cylinder shape is provided, and many infrared distance sensors 50 are attached to the sensor attachment panel 48. These infrared distance sensors 50 measure distances with the objects (a user, an obstacle, etc.) around the sensor attachment panel 48, i.e., the robot 10.

In addition, although the infrared distance sensor is used as a distance sensor in this embodiment, instead the infrared distance sensor, an LRF, ultrasonic distance sensor, milli-wave radar, etc. may be used.

On the sensor attachment panel 48, a body 52 is provided to stand straight. Furthermore, the infrared distance sensor 50 mentioned above is further provided in a front upper center portion (position equivalent to a breast of the user (human being)) of the body 52 to measure a distance with mainly the user in front of the robot 10. Furthermore, a support 54 extending from an approximately center of a side upper end portion is provided in the body 52, and an omnidirectional camera 56 is provided on the support 54. The omnidirectional camera 56 is for photographing a circumference of the robot 10, and distinguished over eye cameras 80 described later. As the omnidirectional camera 56, a camera using a solid-state image sensing device such as a CCD or CMOS (Complementary Metal Oxide Semiconductor) is employable, for example. In addition, the installation positions of these infrared distance sensors 50 and the omnidirectional camera 56 are not limited to the parts concerned, but may be changed suitably.

An upper arm 60R and an upper arm 60L are provided on the both side upper end portions (positions equivalent to a shoulder of the human being (user)) of the body 52 by a shoulder joint 58R and a shoulder joint 58L, respectively. Although illustration is omitted, the shoulder joint 58R and the shoulder joint 58L have three degrees of freedom of three axes perpendicularly intersecting with each other, respectively. That is, the shoulder joint 58R can control angles of the upper arm 60R around each of the three axes perpendicularly intersecting with each other. A certain axis (yaw axis) of the shoulder joint 58R is an axis parallel to a longitudinal direction (or axis) of the upper arm 60R, and other two axes (a pitch axis and a roll axis) are axes perpendicularly intersecting to that axis from respective different directions. Similarly, the shoulder joint 58L can control angles of the upper arm 60L around each of the three axes perpendicularly intersecting with each other. A certain axis (yaw axis) of the shoulder joint 58L is an axis parallel to a longitudinal direction (or axis) of the upper arm 60L, and other two axes (a pitch axis and a roll axis) are axes perpendicularly intersecting to that axis from respective different directions.

Furthermore, an elbow joint 62R and an elbow joint 62L are provided at respective tip ends of the upper arm 60R and the upper arm 60L. Although illustration is omitted, the elbow joint 62R and the elbow joint 62L have one degree of freedom of one axis, respectively, and can control an angle of a forearm 64R and a forearm 64L around this axis (pitch axis).

A hand 66R and a hand 66L are provided at tip ends of the forearm 64R and the forearm 64L, respectively. Each hand 66 is provided with a thumb, an index finger (user pointing finger), a middle finger, a third finger and a little finger like a user (human being). A knuckle (not shown) is provided at a root of the thumb and a root of the index finger of the hand 66, thereby to move independently. Furthermore, the middle finger, the third finger and the little finger are uniformly molded, and a knuckle is provided at a root thereof like each of the thumb and the index finger. Then, the middle finger, the third finger and the little finger can be moved collectively.

Furthermore, a wrist is provided at a root of each of the hand 66R and the hand 66L. Although illustration is omitted, each of the wrists has one degree of freedom of one axis, and can control an angle of each of the hand 66R and the hand 66L around the axis of this axis (yaw axis). Furthermore, although illustration is omitted, the knuckles of the thumb, the index finger and three remaining fingers (the middle finger, the third finger and the little finger) of the hand 66R and the hand 66L each has one degree of freedom, and can control an angle of each of the fingers around this axis.

Accordingly, the robot 10 becomes possible to perform pointing at an arbitrary object by the hand 66 in a pointing state that the thumb, the middle finger, the third finger and the little finger are bent, or pointing at an arbitrary object using entirely the upper arm 60, the forearm 64 and the hand 66 in a state that the fingers are opened. Therefore, the upper arm 60, the forearm 64 and the hand 66 may be called a pointing device or pointing member.

In addition, in other embodiments, a hand 66 that each finger is independent like a human being, and has knuckles of the same number as those of the fingers of the human being may be adopted. In such a case, the robot 10 becomes possible to perform not only pointing but also holding a thing with fingers, or communication by sign language.

Furthermore, although illustration is omitted, contact sensors 68 (collectively shown in FIG. 5) are provided on the front of the truck 40, portions equivalent to the shoulders including the shoulder joint 58R and the shoulder joint 58L, the upper arm 60R, the upper arm 60L, the forearm 64R, the forearm 64L, the hand 66R and the hand 66L, respectively. The contact sensor 68 of the front of the truck 40 detects a contact of the user to the truck 40 or other obstacles. Accordingly, if the robot 10 is brought into contact with an obstacle during own movement, the robot can detect that, and can stop the drive of the wheel 42 immediately thereby to do the quick stop of the movement of the robot 10. Furthermore, the other contact sensors 68 detect whether anything touches to respective parts concerned. In addition, the installation positions of the contact sensors 68 are not be limited to the parts concerned, and the contact sensors 68 may be installed at proper positions (positions equivalent to the breast, the abdomen, the side, the back and the waist of the human being).

A head joint 70 is provided in an upper center (position equivalent to a head of the human being) of the body 52, and a head 72 is further provided thereon. Although illustration is omitted, the head joint 70 has three degrees of freedom of three axes, and angles around the three axes can be controlled. A certain axis (yaw axis) is an axis that goes right above the robot 10 (vertically upward), and the other two axes (a pitch axis and a roll axis) are axes perpendicularly intersecting this axis from different directions, respectively.

A speaker 74 is provided in a position equivalent to a mouth of the human being on the head 72. The speaker 74 is used for taking communication by the robot 10 with using a voice or sound with the user around the robot 10, or for outputting an utterance content described later by the robot 10. Furthermore, a microphone 76R and a microphone 76L are provided in positions equivalent to ears of the human being. Hereinafter, the right microphone 76R and the left microphone 76L may be collectively called microphone 76. The microphone 76 takes in sounds of the circumference, especially a voice of the user who is a target that the robot performs communication. Furthermore, an eyeball portion 78R and an eyeball portion 78L are provided in positions equivalent to eyes of the human being. The eyeball portion 78R and the eyeball portion 78L include an eye camera 80R and an eye camera 80L, respectively. Hereinafter, the right eyeball portion 78R and the left eyeball portion 78L may be collectively called eyeball portion 78. Furthermore, the right eye camera 80R and the left eye camera 80L may be collectively called eye camera 80.

The eye camera 80 photographs a face and other parts of the user who approaches the robot 10 and objects close to the robot 10, etc., and fetches an image signal corresponding thereto. In addition, as the eye camera 80, a camera similar to the above-described omnidirectional camera 56 may be used. For example, the eye camera 80 is fixed within the eyeball portion 78, and the eyeball portion 78 is attached to a predetermined position within the head 72 via an eyeball support (not shown). Although illustration is omitted, the eyeball support has two degrees of freedom of two axes, and an angle around each of the axes can be controlled. For example, one of the two axes is an axis (yaw axis) of a direction that goes above the head 72, and the other is an axis (pitch axis) of the direction that goes in a direction perpendicularly intersecting with one axis and perpendicularly intersecting with a direction that the front side (face) of the head 72 turns. When the eyeball support rotates around each of the two axes, the tip (front) side of the eyeball portion 78 or eye camera 80 is displaced, and the camera axis, i.e., a direction of the gaze is moved. In addition, the installation positions of the above-mentioned speaker 74, the microphone 76, and the eye camera 80 are not limited to the parts concerned, but these may be installed in proper positions.

Thus, the robot 10 in this embodiment has twenty five (25) degrees of freedom in total of two independent drive of the wheel 42, three degrees of freedom of the shoulder joint 58 (six degrees of freedom at right and left, respectively), one degree of freedom of the elbow joint 62 (two degrees of freedom at right and left, respectively), one degree of freedom of the wrist (two degrees of freedom at right and left, respectively), one degree of freedom of the knuckle (six degrees of freedom with each finger at right and left, respectively), three degrees of freedom of the head joint 70 and two degrees of freedom of the eyeball support (four degrees of freedom at right and left, respectively).

Figure 6:
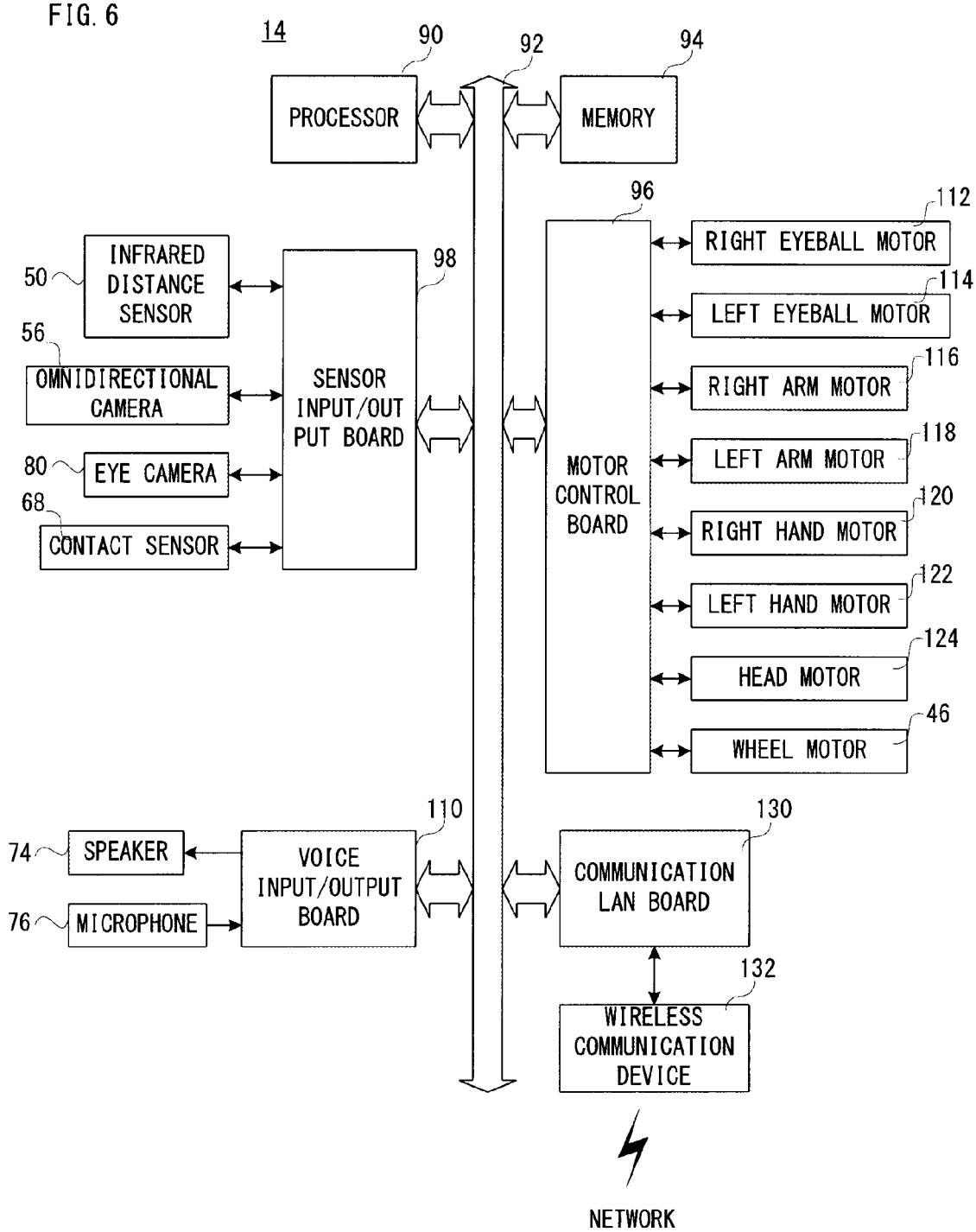
FIG. 6 is a block diagram showing an example of electric structure of the robot shown in FIG. 5.

FIG. 6 is a block diagram showing electric structure of the robot 10. With reference to this FIG. 6, the robot 10 includes a processor 90. The processor 90 is also called a microcomputer or CPU, and is connected with, via a bus 92, a memory 94, a motor control board 96, a sensor input/output board 98, an audio input/output board 110 and a communication LAN board 130.

The memory 94 includes a ROM and a RAM. A control program for controlling an operation of the robot 10 is stored in advance in the ROM. For example, a detection program for detecting outputs of the respective sensors (sensor information), a communication program for sending and receiving necessary data, commands, etc. with an external computer (central controller 14), etc. are stored. Furthermore, the RAM is used as a working memory and a buffer memory for the processor 90.

The motor control board 96 is constructed by DSP(s), for example, and controls the drive of the motor of each axis of the arms, the head joint, the eyeball portions, etc. That is, the motor control board 96 receives control data from the processor 90, and controls rotation angles of two motors (FIG. 6 collectively shows as the "right eyeball motor 112") that control respective angles of two axes of the right eyeball portion 78R. Similarly, the motor control board 96 receives control data from the processor 90, and controls rotation angles of two motors (FIG. 6 collectively shows as the "left eyeball motor 114") that control respective angles of two axes of the left eyeball portion 78L. Furthermore, the motor control board 96 receives control data from the processor 90, and controls rotation angles of four motors in total (FIG. 6 collectively shows as the "right arm motor 116") of three motors that control respective angles of three perpendicularly intersecting axes of the shoulder joint 58R and one motor that controls an angle of the elbow joint 62R. Similarly, the motor control board 96 receives control data from the processor 90, and controls rotation angles of four motors in total (FIG. 6 collectively shows as the "left arm motor 1186") of three motors that control respective angles of three perpendicularly intersecting axes of the shoulder joint 58L and one motor that controls an angle of the elbow joint 62L.

Furthermore, the motor control board 96 receives control data from the processor 90, and controls rotation angles of four motors in total (FIG. 6 collectively shows as the "right hand motor 120") of one motor that controls an angle of the right wrist and three motors that control respective angles of three knuckles in the right hand 66R. Similarly, the motor control board 96 receives control data from the processor 90, and controls rotation angles of four motors in total (FIG. 6 collectively shows as the "left hand motor 122") of one motor that controls an angle of the left wrist and three motors that control respective angles of three knuckles in the left hand 66L.

Here, the rotation of the motor is not necessarily directly reflected for the angle of the knuckle, and the angle of the knuckle is controlled by a fluid pressure cylinder that operates by the rotation of the motor. More specifically, a piston that moves an operation fluid is accommodated freely movably in the fluid pressure cylinder, and the position of this piston is changed by the rotation of the motor. Then, the angle of the knuckle changes according to the motion of the fluid pressure cylinder. In addition, since the hand of the robot using a fluid pressure cylinder is described in detail in Japanese patent application laying-open No. 2013-96514, for example, a detailed description is omitted here by referring to No. 2013-96514.

Furthermore, the motor control board 96 receives control data from the processor 90, and controls rotation angles of three motors (FIG. 6 collectively shows as the "head motor 124") that control respective angles of three perpendicularly intersecting axes of the head joint 70.

Then, the motor control board 96 receives control data from the processor 90, and controls rotation angles of two motors (FIG. 6 collectively shows as the "wheel motor 46") that drive the wheel 42. In addition, in this embodiment, in order to simplify the control, a stepping motor (namely, pulse motor) is used for the motor except the wheel motor 46. However, as similar to the wheel motor 46, direct current motors may be used. In addition, the actuators that drive the body portions of the robot 10 may be suitably changed not only in the motor with the power source of current. For example, an air actuator, etc. may be applied in other embodiments.

Like the motor control board 96, the sensor input/output board 98 is constructed by DSP(s), and fetches the signal from each sensor, and applies the signal to the processor 90. That is, data concerning a reflection time from each of the infrared distance sensors 50 is input to the processor 90 through the sensor input/output board 98. Furthermore, an image signal from the omnidirectional camera 56 is input to the processor 90 after subjected to predetermined processing by the sensor input/output board 98 as required. An image signal from the eye camera 80 is similarly input to the processor 90. Furthermore, signals from the above-described plurality of contact sensors 68 (FIG. 6 shows the "contact sensor 68" collectively) are applied to the processor 90 via the sensor input/output board 98.

Similarly, the audio input/output board 110 is also constructed by DSP(s), and a sound or voice according to sound synthesis data applied from the processor 90 is output from the speaker 74. Furthermore, an audio input from the microphone 76 is applied to the processor 90 via the audio input/output board 110.

The communication LAN board 130 is constructed by DSP(s), for example, and applies the send data from the processor 90 to the wireless communication device 132 that in turn sends the send data to the external computer (central controller 14) via the network 1000. Furthermore, the communication LAN board 130 receives data via the wireless communication device 132, and applies received data to the processor 90. For example, the send data may include the image data of the circumference that is photographed by the omnidirectional camera 56 and the eye camera 80.

Figures 7, 8:
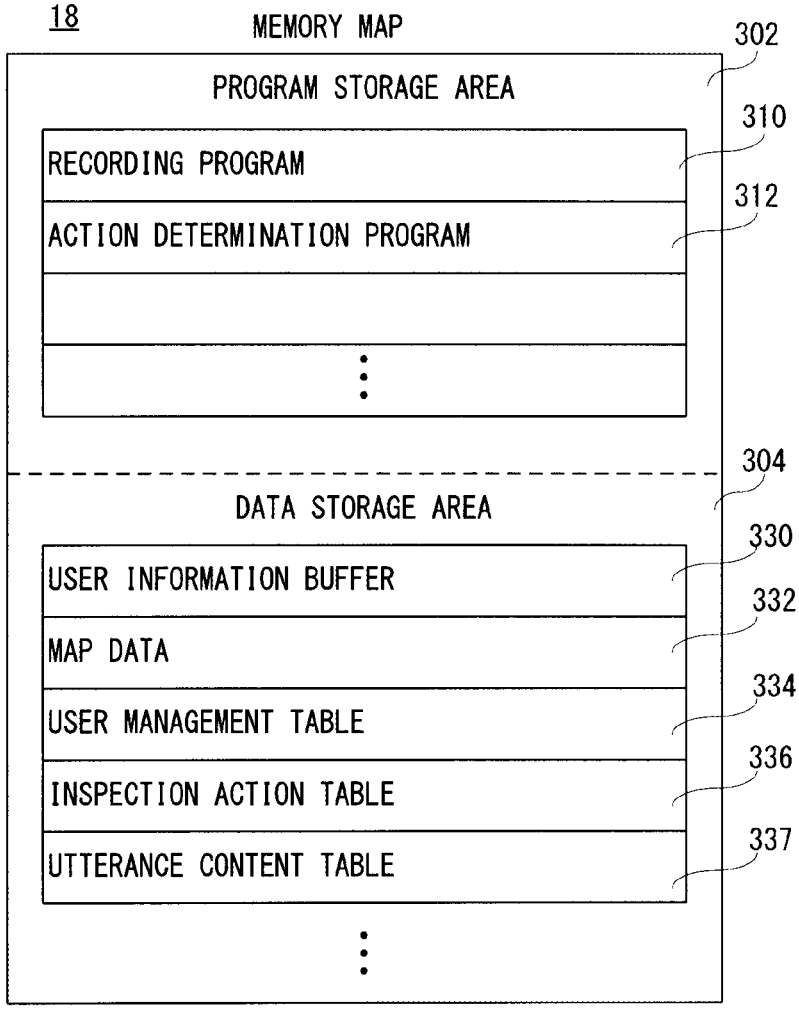
FIG. 7 is a view showing an example of a memory map of a memory of the central controller shown in FIG. 4.
FIG. 8 is a view showing an example of a user management table shown in FIG. 7.

FIG. 7 is a view showing an example of a memory map of the memory 18 in the central controller 14 shown in FIG. 4. As shown in FIG. 7, the memory 18 includes a program storage area 302 and a data storage area 304. The program storage area 302 is stored with a recording program 310 that records a history of inspection action of each user who attends the exhibition hall, an action determination program 312 for determining an operation of each robot, etc. in addition to an operating system (OS) as programs for operating the central controller 14. In addition, although illustration is omitted, in this program storage area 302, a program for detecting a position and a direction of the user from outputs of the above-described range image sensors 12, etc. are included.

A user information buffer 330 is provided in the data storage area 304, and the data storage area 304 is stored with map data 332. For example, the position and the direction of the user that are obtained through calculation based on three-dimensional information are temporarily stored in the user information buffer 330 as user information.

The map data 332 includes map data indicating a plan view as shown in FIG. 2. The map data includes the above-described various coordinates data such as information (coordinates) of the exhibitions E and the predetermined ranges corresponding to the exhibitions E, for example.

In addition, although illustration is omitted, buffers that temporarily stores results of various calculations, other counters, flags, etc. required for an operation of the central controller 14 are provided in the data storage area 304.

A user management table 334 is shown in FIG. 8, for example, and records, for each user, the number of attendance times, an attendance flag that indicates whether the user is during the attendance, and as described above, it is detected that the user attends by reading the RFID when entering from the entrance, and it is detected that the user concerned leaves by reading the RFID when exiting from the entrance. When a user comes, the number of attendance times is incremented and the attendance flag is set. When a user leaves, the attendance flag is reset.

An inspection action table 336 is shown in FIG. 9, for example, and records, for each user, an inspection time period by the user with respect to each of the exhibitions E1, E2 and E3 for every attendance. Although FIG. 9 shows the inspection action table about the user AAA, for example, a table same for other users is provided. This inspection action table 336 as well as the previous user management table 334 is formed in the memory 18 when a corresponding user attends first, and the number of attendance times is incremented (updated) for every subsequent attendance. Then, it is recorded for every attendance, which exhibition is inspected by which user in how long time period. Along with that, a moving locus that shows how the user moves in the inside of the exhibition hall is recorded in the inspection action table 336. The moving locus is recordable by acquiring a position of the user for every Δt seconds, for example. However, illustration of the moving locus is omitted in FIG. 9 since it becomes complicated.

In an utterance content table 338, as shown in FIG. 10, data of utterance contents is recorded for each content number, for example. Since these utterance contents are peculiar to the exhibition hall or the exhibitions, the utterance content table 338 is set up (prepared) in advance at every time that the exhibition hall and/or the exhibitions are changed. In this embodiment, as an example, the content number 1 is an utterance content as "Although it seems you did not see very much last time, please see slowly this time", the content number 2 is an utterance content as "Although it seems you did see the exhibition Ei well last time, please also see the exhibition Ej this time", the content number 3 is an utterance as "Although it seems you did see various exhibitions last tune, please see thoroughly this time also", and the content number 4 is an utterance as "Since there is a new exhibition Enew, please see it."

As described above, each of the content numbers 1 to 3 is an utterance content that refers to the inspection action at the time of the last time attendance of the user concerned, and then, guides an inspection this time. However, an utterance content is not limited to the utterance content that mentions the inspection action at the time of the last time attendance in this way, and may be an utterance that is not directly relevant to the last time inspection action but is relevant to the history of the past inspection action like the content number 4, for example.

In the robot control system 100 of this embodiment, the utterance content is chosen from the utterance content table 338 based on the history of inspection action of the user, and the chosen utterance content is provided to the user as guidance information.

Figure 11:
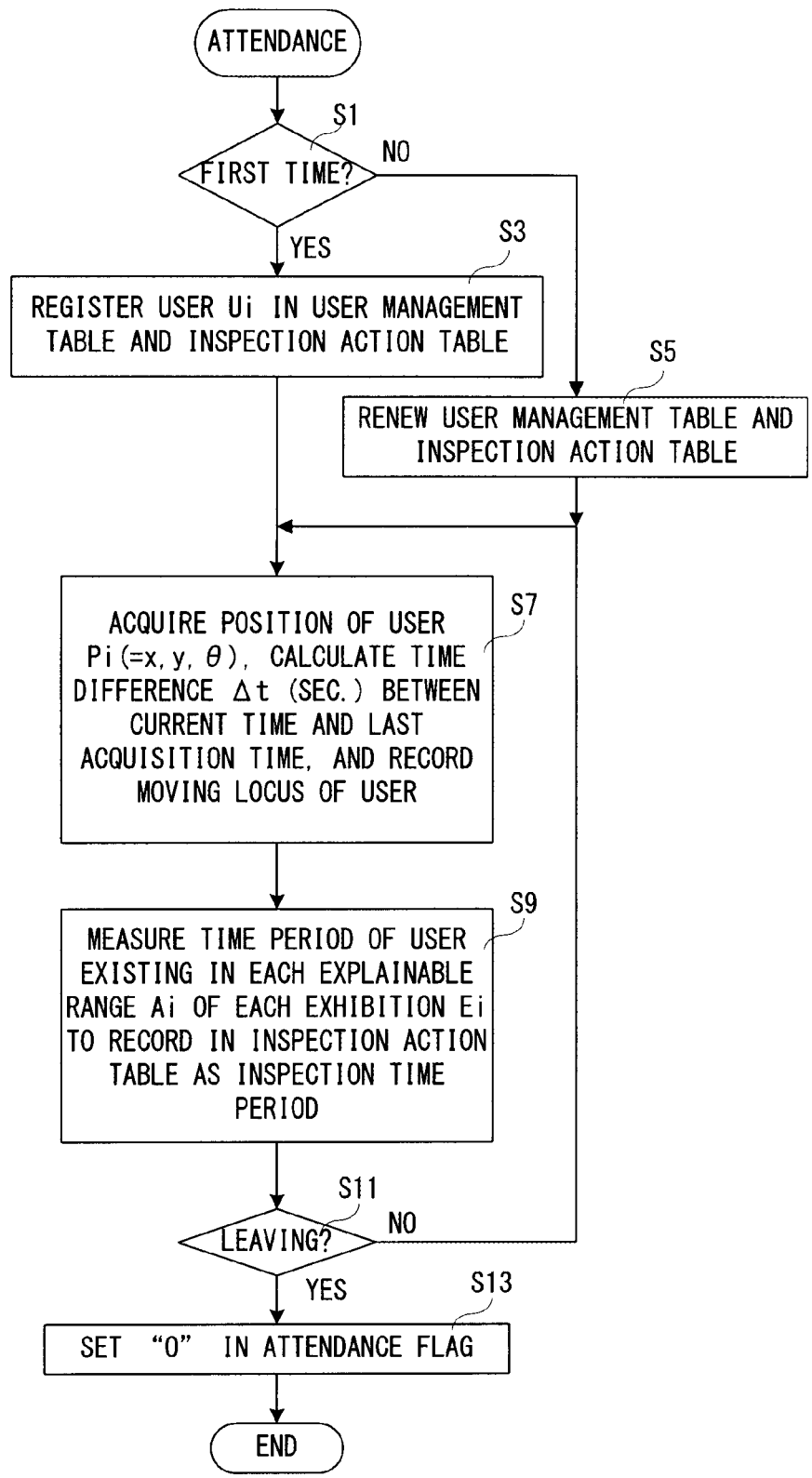
FIG. 11 is a flowchart showing an example of an operation of record processing of a processor of the central controller shown in FIG. 4.

In such the robot control system 100, the central controller 14 performs record processing of FIG. 11 if the tag reader 13 that is provided at the entrance (FIG. 2) of the exhibition hall reads the RFID tag of an attendant.

If the read ID data is input to the central controller 14 by the tag reader 13, in a first step S1, the central controller 14 determines whether the attendant at that time is the first time attendance with referring to the user management table 334 of FIG. 8, for example. For example, if there is no record in the user management table 334, it is possible to determine that this time attendance is the first attendance for the user concerned. Then, if "YES" at the step S1 in a next step S3, the central controller 14 registers the user Ui into the user management table 334 and the inspection action table 336, and sets the attendance flag of the user in the user management table 334.

When "NO" is determined at the step S1, that is, if it is determined that the user Ui is attendance for the second time and afterwards, in a next step S5, the central controller 14 updates the user management table 334 and the inspection action table 336. In detail, in this step S5, the number of the attendance times in the user management table 334 is updated, and the attendance flag is set. Furthermore, in the step S5, a storage area that is to record therein data of the attendance at this time is secured in the inspection action table 336. For example, if the user AAA is the second time attendance, a storage area of "number of attendance times=2" in FIG. 9 is secured.

After the step S3 or S5, the central controller 14 acquires a position Pi (=x, y, θ) of the user Ui in a step S7. More specifically, the central controller 14 can receive distance information from each range image sensor 12, and calculate the position of the user based on the distance information and information on the installation position already known of each range image sensor. In addition, an angle θ is an angle that indicates a direction of the user, and is represented by an angle to the horizontal in the plan view of FIG. 2 as an example. At this step S7, a time difference Δt (seconds) between a current time and the last acquisition time is further calculated. The moving locus of the inspection action table 336 is recorded. That is, the position of the user that changes with lapse of time is recorded as the moving locus.

Then, in a step S9, the central controller 14 measures a time period (inspection time period) that the user exists in the explainable range Ai about the exhibition Ei, and records the time period (inspection time period) in the column of the inspection time of the inspection action table 336.

The steps S7 and S9 are performed repeatedly about the user until it is detected that the user leaves in a step S11. That is, the user is pursued by the range image sensor 12 (tracking) after the user enters the exhibition hall until the user leaves, and an inspection action, what inspection action is performed about which exhibition during how much time, and the moving locus are recorded in the inspection action table 336.

However, a tracking method of each user for recording such an inspection action table is not limited to this embodiment, and may be performed by other arbitrary methods. Then, if the leaving of the user is detected based on the information from the tag reader 13 described previously, for example, in the step S11, the attendance flag for the corresponding user in the user management table 334 is reset in a step S13, and then, this record processing is terminated.

In addition, although the inspection action after the user entering until leaving is recorded in the inspection action table 336 in real time in the above-described embodiment, it is not necessary to record in real time while performing the tracking of the user, and the data representing the above-described inspection action of the user may be temporarily stored in a buffer, and when the user leaving, for example, the inspection action table 336 may be recorded as badge processing.

Figure 12:
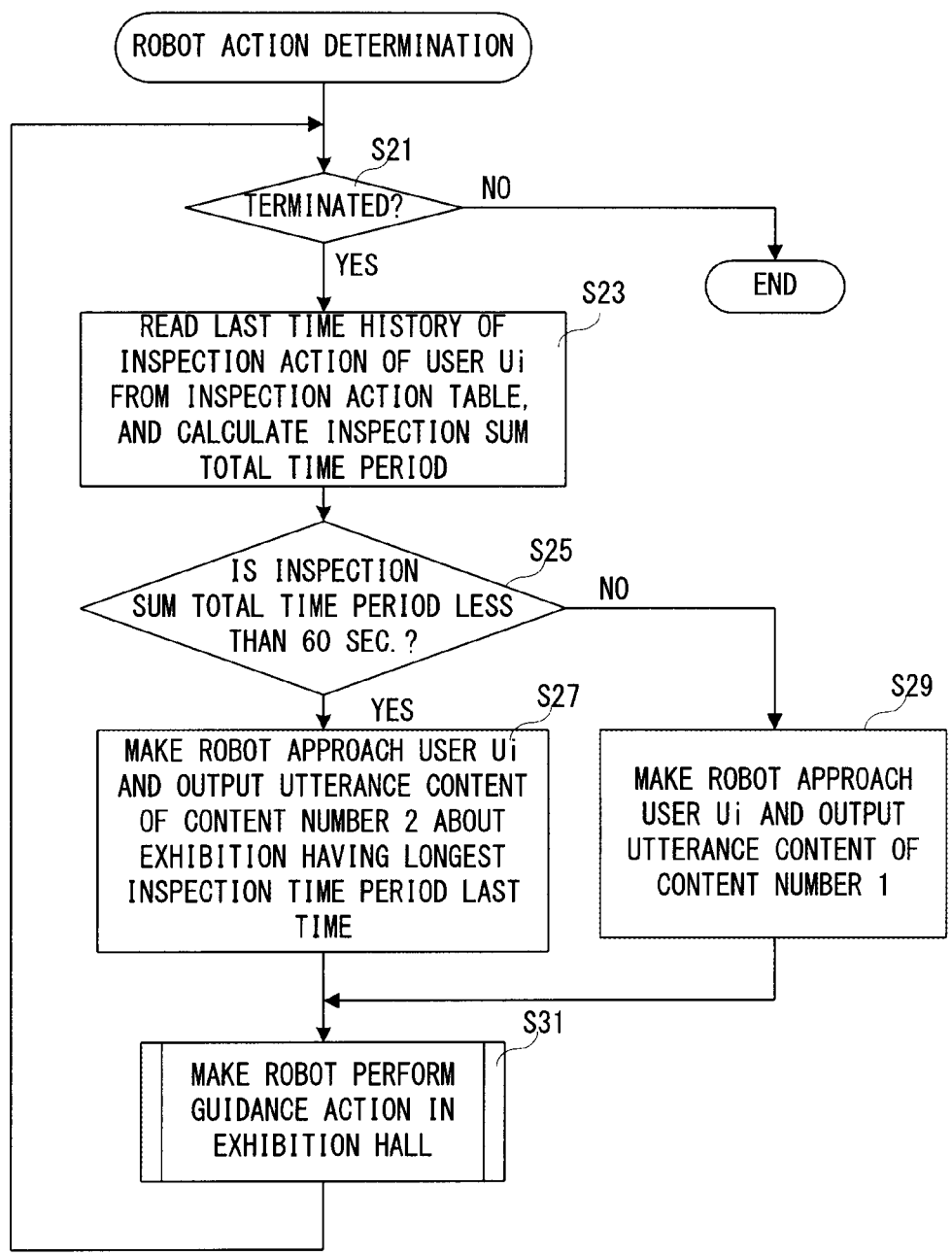
FIG. 12 is a flowchart showing an example of an operation of robot action determination processing of the processor of the central controller shown in FIG. 4.

Like previous record processing, robot action determination processing shown in FIG. 12 is started when a new attendance is in the exhibition hall. Then, unless the processing is terminated at a step S21, proceeding to a step S23 wherein an inspection sum total time of the user Ui is calculated. In the inspection action table of the user AAA of FIG. 9, since the user AAA is the second time attendance at this time, the inspection sum total time is calculated by reading the history of inspection action at the last time (the first time) attendance, and totaling the inspection time period included in the history of inspection action.

Then, the central controller 14 determines whether the calculated inspection sum total time is less than a predetermined time period, 60 seconds, for example in a step S25. Since the first inspection sum total time of the user AAA is 400 seconds (=300+60+40), "YES" is determined at the step S25.

Accordingly, in a next step S27, the central controller 14 controls the movement of the robot 10 so as to make the robot 10 approach the user Ui, and makes the robot 10 output an utterance content of the content number 2 about the exhibition Ei (the exhibition E1 in the embodiment) having the longest inspection time period last time, for example. The central controller 14 makes the utterance content 2 as "Although it seems you did see the exhibition Ei well last time, please also see the exhibition Ej this time", for example be output from the speaker 74 via the audio input/output board 110 of the robot 10.

On the contrary, "NO" is determined at the step S25 at a time that the inspection sum total time period last time is less than the predetermined time (60 seconds, in the embodiment). In such a case, in a next step S29, the central controller 14 controls the movement of the robot 10 so as to make the robot 10 approach the user Ui, and makes the robot 10 output an utterance content of the content number 1. The central controller 14 makes the utterance content as "Although it seems you did not see very much last time, please see slowly this time", for example be output from the speaker 74 of the robot 10 If constructed that the robot outputs the utterance content that includes the phrase referring to the history of inspection action at the last time attendance of the user and is suitable for the this time attendance as in this embodiment, since it is possible not only to provide appropriate guidance information for the user, but to give the user a strong impression that the robot observes the user well, it is expectable, like a case to contact with a familiar explainer or shop clerk, to increase a sense of closeness for the robot of the user.

However, the utterance content output to the user at the step S27 and/or S29 may not necessarily be an utterance content that mentions the history of inspection action at the last time attendance. For example, in a case where a new exhibition is exhibited, for example, regardless of the history of inspection action at the last time attendance, an utterance content like the content number 4 of the utterance content table 338 in FIG. 10 may be output.

Then, the central controller 14 applies instructions to the robot 10 in a step S31 so as to perform an appropriate guidance action to the same user or another user. However, the guidance action itself of the robot 10 is not very important, and therefore, a description thereof is omitted here.

In addition, in the above-described embodiment, although the utterance content that is output at the step S27 or S29 is chosen and determined by determining whether the inspection sum total time period at the last time attendance is equal to or more than the predetermined time in the step S25, a factor for selectively determining an utterance content is not limited to the inspection sum total time at the last time attendance of this embodiment.

For example, an utterance content may be chosen and determined based on the moving locus of the user that is recorded in the inspection action table 336 at the step S9 of FIG. 11. For example, it is considered an embodiment that the moving locus is classified with patterns, and an utterance content is chosen and output according to the classification.

Furthermore, in other embodiments, when the robot 10 has a display, the guidance information may be provided to the user with utilizing an image content in addition to an utterance content.

In the above-described embodiment, it is described that both the record processing of FIG. 11 and the action determination processing of FIG. 12 are performed by the central controller 14. However, these processing may be performed by the robot 10 altogether. In such a case, the processor 90 (FIG. 6) of the robot should just receive directly the output data from the range image sensor 12 shown in FIG. 3 and the output data from the tag reader 13. However, the output data from the range image sensor 12 and the output data from the tag reader 13 may be input to the central controller 14 like the above-described embodiment, and after performing required processing by the central controller 14, only the data of a result may be given to the robot 10. Since the processing burden of the processor 90 of the robot 10 decreases, such a way may be desirable. Furthermore, in the above-described embodiment, in order to determine whether the inspection sum total time at the last time attendance is shorter than the predetermined time, in the step S25 of FIG. 12, it is determined whether "the inspection sum total time is less than 60 seconds." However, not limited to "less than", and it may be determined whether "the inspection sum total time is equal to or less than 60 seconds."

Second Embodiment

In the second embodiment, the robot 10 outputs an utterance content while pointing at an exhibition. In addition, a robot control system 100 of the second embodiment is approximately the same as that of the first embodiment, and therefore, a description of the structure of the system, the appearance of the robot 10, the electric structure, etc. is omitted.

FIG. 13 is a block diagram showing the electric structure of the central controller 14. With reference to FIG. 13, in the central controller 14 of the second embodiment, the utterance content database (DB: database) 24 and the user DB 26 are further connected to the processor 16 of the first embodiment.

The utterance content DB 24 is stored with the utterance contents that the robot 10 outputs. The user DB 26 is stored with the information of the user in the space corresponding to the user ID. In addition, because these DBs will be described later, a detailed description is omitted here.

FIG. 14 is a map showing the planar position of the exhibition hall (space) according to the second embodiment. With reference to FIG. 14, the position of the entrance and the positions that a plurality of exhibitions E are installed in the second embodiment are the same as those of the first embodiment.

Two explanation start ranges A and two explanation stop ranges A' that respectively include the explanation start ranges A are formed so as to correspond to the exhibition E1 of the second embodiment. The explanation start range A4 and the explanation stop range A4' are made to correspond to a left side of the exhibition E1. Furthermore, the explanation start range A5 and the explanation stop range A5' are made to correspond to a lower side of the exhibition E1. Then, each explanation start range A corresponds to an utterance content (contents to be explained) that is to be output to the user. In addition, the explanation stop range A' is set up more widely than the explanation start range A. Furthermore, the explanation start range A and the explanation stop range A' may be called a first predetermined range and a second predetermined range, respectively. Then, these ranges may be called a predetermined range when not distinguishing these ranges.

Figures 15, 16:
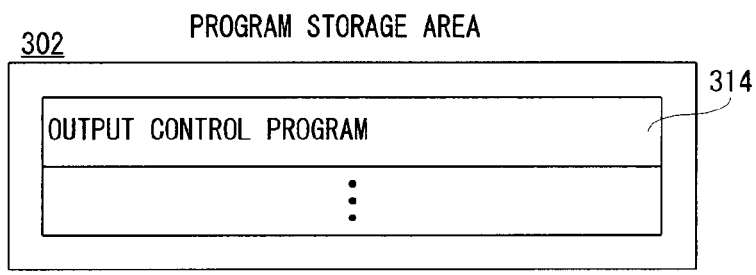
FIG. 15 is a view showing an example of structure of an utterance content database (DB) shown in FIG. 13.
FIG. 16 is a view showing a further example of a memory map of the memory of the central controller shown in FIG. 4.

With reference to FIG. 15, the utterance content DB 24 is constructed by a table, for example, and the table includes columns of a number, a center point, an explanation start range, an explanation stop range and contents. Then, one utterance content is indicated by one line. For example, in the utterance content that "1" is stored in the column of the number, "C1" is stored in the column of the center point, "A1" is stored in the column of the explanation start range, "A1'" is stored in the column of the explanation stop range, and utterance contents as "This (with pointing) is electric socket", "Electricity is charged from here (with pointing)", etc. are stored in the column of the contents. Furthermore, in the utterance content that "2" is stored in the column of the number, "C2" is stored in the column of the center point, "A2" is stored in the column of the explanation start range, "A2'" is stored in the column of the explanation stop range, and utterance contents as "This motor (with pointing) also bears cooling", etc. are stored in the column of the content.

For example, at a time that the position and the direction of the user are detected, if the position of the user is included in the explanation start range A4 and the direction of the user turns to the center point C1, the robot 10 moves to around the user and the utterance content of "1" is sent to the robot 10 from the central controller 14. Then, the robot 10 outputs the received utterance content of "1" to the user. That is, the robot 10 explains (utters) "This is electric socket" about the exhibition E, after approaching the user and greeting to the user. Furthermore, when instructed as "pointing" in the contents of the utterance content, the robot 10 explains while pointing to a direction toward the center point C by the hand 66. In addition, the voice based on the utterance content, etc. is output from the speaker 74 of the robot 10.

At this time, if the position of the user is not outside the explanation stop range A4', that is, if the user does not go outside the explanation stop range A4', the robot 10 outputs a continuation of the utterance content of "1." That is, the robot 10 continues the explain as "Electricity is charged from here" to the user. Then, when the output of the utterance content is completed, the robot 10 moves to another place or a different user, after having done goodbye to the user.

Thus, if it is determined that the user approaches the exhibition E and turns to the exhibition E, or it is determined at least one of that the user approaches the exhibition E and that the user turns to the exhibition E, the robot 10 outputs the utterance content concerning the exhibition E. That is, it is possible to adequately provide to the user the utterance content concerning the exhibition E when the user gets interested in the exhibition E. Furthermore, since the exhibition E is pointed by pointing of the robot 10 when outputting the utterance content, it is possible to effectively provide to the user the utterance content concerning the exhibition E with using the body of the robot 10.

Furthermore, if the position of the user is outside the explanation stop range A4', that is, if the user goes out of the explanation stop range A4', the robot 10 stops the output of the utterance content. That is, since it is thought that the user is not interested in the exhibition E, the output of the utterance content can be stopped. Especially, by setting the explanation start range A4 and the explanation stop range A4' wider than the range A4, it is possible to prevent instructions to output the utterance content and instructions to stop the utterance content from being repeatedly output to the robot at a time that the user exists near the explanation start range A4. That is, it is possible to stabilize the operation or action of the robot 10 by the two predetermined ranges.

In addition, although illustration is omitted, the center point C, the explanation start range A, the explanation stop range A' and the utterance content are also associated with the exhibition E2 and the exhibition E3, respectively.

Furthermore, if the position of the user continues to be detected in the explanation start range A, the robot 10 outputs a plurality of utterance contents in succession. That is, if the user is stopping around the exhibition E that the user is interested in, the user can receive the output of a plurality of utterance contents from the robot 10.

In the above, the feature of the second embodiment is roughly described. In the following, the second embodiment will be described in detail with referring to a program storage area 302 of the second embodiment shown in FIG. 16 and a flowchart shown in FIG. 17.

FIG. 16 is a view showing an example of the program storage area 302 of the memory 18 in the central controller 14 shown in FIG. 13. In addition, since other programs stored in the program storage area 302 and other data stored in the data storage areas 304 are the same as those of the first embodiment, a detailed description is omitted. As shown in FIG. 16, in the program storage area 302 of the second embodiment, an output control program 314 that controls an output of an utterance content is further stored as a program for operating the central controller 14.

Figure 17:
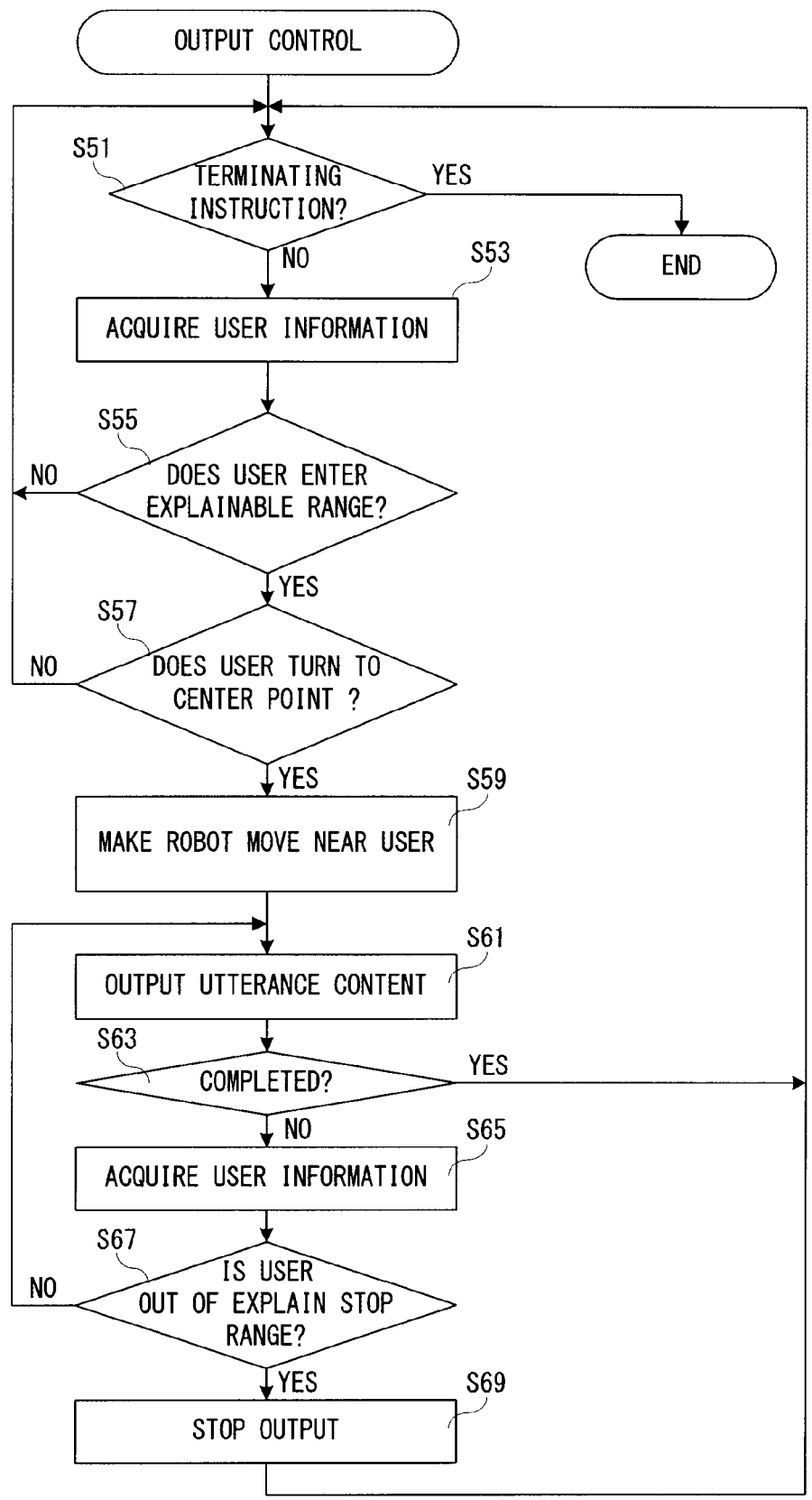
FIG. 17 is a flowchart showing an example of output control processing of the processor of the central controller shown in FIG. 4.

The processor 16 of the central controller 14 of the second embodiment processes a plurality of tasks including output control processing, etc. shown in FIG. 17 under control of the OS of Linux (registered trademark) base or other OS.

FIG. 17 is a flowchart of output control processing. If the power supply of the central controller 14 is turned on, the processor 16 of the central controller 14 determines whether a terminating instruction is input in a step S51. For example, it is determined whether an operation of terminating the central controller 14 is performed by the administrator. If "NO" at the step S51, that is, if the terminating instruction is not received, the processor 16 acquires user information in a step S53. That is, the position and the direction of the user are read from the user information buffer 330.

Subsequently, the processor 16 determines whether the user enters the explanation start range A in a step S55. For example, the processor 16 reads the map data 332 and determines whether the position of the user is included within the explanation start range A4 of the exhibition E1. If "NO" at the step S55, that is, if the position of the user is the circumference of the entrance, for example, the processor 16 returns to the processing of the step S51. Furthermore, if "YES" at the step S55, that is, if the position of the user is included within the explanation start range A4, for example, the processor 16 determines whether the user faces the center point C in a step S57. For example, when the user is in the explanation start range A4, it is determined whether the direction of the user turns to the direction toward the center point C1 of the exhibition E1. In addition, when determining whether the direction of the user turns to the center point C, ±5 degrees is considered as a permissible range. That is, at the step S57, it is determined whether the center point C is included within the permissible range of ±5 degrees with respect to the direction of the user. If "NO" at the step S57, that is, if the user does not turn to the center point C, the processor 16 returns to the processing of the step S51. In addition, the processor 16 performing the processing of the step S55 functions as a first determining module, and the processor 16 performing the processing of the step S57 functions as a second determining module.

Furthermore, if "YES" at the step S57, that is, if the user turns to the center point C, the processor 16 makes the robot 10 move near the user in a step S59. That is, the processor 16 issues the coordinates indicating the position of the user and instructions to move to the coordinates to the robot 10. As a result, the robot 10 approaches the user.

Subsequently, the processor 16 outputs an utterance content in a step S61. That is, an utterance content corresponding to the explanation start range A that the user enters is read from the utterance content DB 24 to be sent to the robot 10. The robot 10 performs the explanation about the exhibition E based on the received utterance content to the user while performing the pointing. In addition, the processor 16 performing the processing of the step S61 functions as an output module or a second output module.

Subsequently, the processor 16 determines whether the output is completed in a step S63. That is, the processor 16 determines whether it is notified by the robot 10 that the output of the utterance content is completed. If "YES" at the step S63, that is, if the output of the utterance content completed, the processor 16 returns to the processing of Step S51.

On the other hand, if "NO" at the step S63, that is, if the output of the utterance content continues, the processor 16 acquires the user information in a step S65. For example, the position of the user is read from the user information buffer 330. Subsequently, the processor 16 determines in a step S67 whether the user is out of the explanation stop range A'. That is, it is determined whether the user loses interest in the explanation concerning the exhibition E. In addition, the processor 16 performing the processing of the step S67 functions as a third determining module.

If "NO" at the step S67, that is, if the position of the user is within the explanation stop range A', the processor 16 returns to the processing of the step S61. That is, the robot 10 continues the output of the utterance content. On the other hand, if "YES" at the step S67, that is, if the user goes out of the explanation stop range A', the processor 16 stops the output in a step S69. That is, the processor 16 issues instructions to the robot 10 to stop the output of the utterance content. Then, the processor 16 returns to the processing of the step S51 if the processing of the step S69 is ended. In addition, the processor 16 performing the processing of the step S69 functions as a stopping module.

Then, if "YES" at the step S51, that is, if the user performs an operation to terminate the central controller 14, for example, the processor 16 terminates the output control processing.

In addition, the processor 16 performing the processing of the step S53 or S65 functions as an acquisition module.

Third Embodiment

In the third embodiment, a degree of intimacy between the user and the robot 10 is presumed, and an operation or action of the robot 10 that outputs an utterance content is changed based on the presumed degree of intimacy. In addition, a robot control system 100 of the third embodiment is the same as that of the second embodiment, and therefore, a description of the structure of the system, the appearance of the robot 10, the electric structure, etc. is omitted.

The degree of intimacy of the user and the robot 10 is presumed based on the number of times of outputting an utterance content to the user. Furthermore, when counting the number of times, the number of times is counted by distinguishing whether the output of the utterance content is completed or stopped.

With reference to FIG. 18, in the user DB 26, corresponding to the user ID, the exhibition E that the utterance is output and the number of times that the utterance content of the exhibition E is output to the user are recorded. Furthermore, the number of times of hearing an utterance content is counted by distinguishing "deepening (specialty)" indicating that the utterance content is heard to the last, that is, the output of the utterance content is completed and "spread" indicating that the user left while hearing the utterance content, that is, the output of the utterance content stopped. Paying attention to the user of "001" of the user ID, for example, it is understood that the user receives the explanation about the exhibition E1 by the robot 10 three times and the user listens to the explanation of three times to the last. Furthermore, although the user receives the explanation two times by the robot 10 about the exhibition E2, the user stops hearing the explanation on the way both. Similarly, in a case of the user of "002" of the user ID, the user receives the explanation about the exhibition E1, but the user stops hearing the explanation on the way. In addition, in the user DB 26, one user ID and corresponding one or more lines are treated as single user data.

Subsequently, with reference to FIG. 19, in the utterance content DB 24 of the third embodiment, columns of "deepening (specialty)" and "spread" are added in comparison with the utterance content DB 24 of the second embodiment. Numeral values are stored in these columns. In the utterance content DB 24, when "0" is stored in each of the columns of "deepening" and "spread", respectively, a message ("This is electric socket", for example) that introduces the exhibition E simply is stored in the column of the "contents." In contrast, when "1" is stored in the column of "deepening", a message ("Electricity flows into battery from here, and battery is of lithium ion") that introduces the exhibition E in more detail is stored in the column of the "contents." Furthermore, when "1" is stored in the column of "spread", a message ("Electric bicycle capable of being charged in the same way at home seems to be sold") that is relevant to the exhibition E is stored in the column of the "contents."

Then, if the user enters the explanation start range A and the robot 10 approaches the user, the degree of intimacy is presumed based on the value of the "deepening" and the value of the "spread" of the user from the user DB 26, that is, the number of times that the utterance content is output. If the number of times of outputting the utterance content to the user is one time, for example, since the user and the robot 10 are in a state that there is already acquaintance in both, the degree of intimacy of a low level can be presumed. Furthermore, if there is much number of times of leaving repeatedly although the utterance content is output to the user, the degree of intimacy of a middle level can be presumed. Then, if there is much number of times that the utterance content is output to the last to the user, the degree of intimacy of a high level can be presumed. In addition, the degree of intimacy to the user to whom an utterance content has never output is made "null."

Thus, at every time that the user receives the explanation by the robot 10, the user can make higher the degree of intimacy with the robot 10.

For example, if the user attends the exhibition hall, the operation or action of the robot 10 is changed according to the presumed degree of intimacy with the user. In the third embodiment, at least one of a reaction time until the robot 10 begins to move, a movement speed when approaching, a distance to the user and a standing position, and a waiting position are changed. If the presumed degree of intimacy is larger than the middle level when based on a state that the degree of intimacy is not set, the robot 10 waits in advance at a position included in a field of view of the user. Furthermore, as the degree of intimacy becomes higher, the reaction time until the robot begins to move is shortened, the moving speed when approaching is made faster, and the distance to the user is shortened, whereby the robot can move with the user side-by-side. Thus, in the third embodiment, the degree of intimacy between the user and the robot 10 is changed by an action using no language.

Next, when the robot 10 approaches the user and the degree of intimacy of a low level is presumed by such action, the robot 10 outputs an utterance content after greeting saying "You came again" or the like. When the degree of intimacy of a middle level is presumed, the robot 10 outputs an utterance content after greeting saying "We are already completely good friends." When the degree of intimacy of a high level is presumed, after speaking saying "I am glad to meet again" and asking for handshaking etc., the robot 10 outputs an utterance content.

Furthermore, if the degree of intimacy is equal to or more than the low level, before outputting an utterance content, the abstract of an utterance content having been already output is output to the user. For example, it is possible to specify an utterance content having been output based on a status of the user data of the user DB 26. Therefore, if the utterance contents of top two lines in the utterance content DB 24 shown in FIG. 19 have been already output, the abstract of the contents as "This is electric socket", "Battery of lithium ion is charged" and "Now, I explain more little" are uttered (output) from the robot 10.

Next, for the user to the exhibition E, corresponding to the value of the column of "deepening" of the user DB 26, an utterance content is read from the utterance content DB 24, and output from the robot 10. For example, in a case where the user enters the explanation start range A4 of the exhibition E1 (center point C1), and "1" is stored as "deepening" to the exhibition E1 for the user, from the utterance content DB 24, the utterance content that "deepening" for the exhibition E1 is "1" is read, and sent to the robot 10. As a result, the robot 10 provides the explanation about the exhibition E1 "Electricity flows to battery from here, and battery is of lithium ion" to the user. That is, the user who heard the last time utterance content to the last can deepen the knowledge over the exhibition E more.

On the other hand, in a case where the user enters the explanation start range A4 of the exhibition E1 (center point C1), and "1" is stored as "spread" to the exhibition E1 for the user, the utterance content of "1" of "spread" for the exhibition E1 is read from the utterance content DB 24, and sent to the robot 10. As a result, the robot 10 provides the explanation about the exhibition E as "Electric bicycle capable of being charged in the same way at home seems to be sold" to the user. That is, the user who did not hear the last time utterance content to the last can acquire knowledge derived from the exhibition E. Thus, it is possible to prevent the robot 10 from providing the same explanation to the same user repeatedly. Therefore, the user can acquire different knowledge at every time of seeing the exhibition E.

Furthermore, since the action of the robot 10 changes according to the degree of intimacy that is presumed, the user can realize the deepening of the degree of intimacy with the robot 10. Furthermore, in the embodiment, it is possible to presume the degree of intimacy based on the number of output times the utterance content to the user, that is, the number of communication times with the user. Accordingly, the processing time when presuming the degree of intimacy can be shortened.

In addition, in a case where a further user is in the circumference (within 1 to 2 meters, for example) during outputting the utterance content to the user, it is determined that the utterance content is also output to the further user, that is, the further user heard the explanation secondhand. Then, the user data of the further user is updated like the user data of the user. Accordingly, in the space that many users exist, each user needs to cease to receive the offer of the same utterance content repeatedly.

Furthermore, in other embodiments, a frequency that the robot 10 offers the explanation to the user may be changed according to the degree of intimacy. For example, the robot 10 is made not to output the utterance content to the user as the presumed degree of intimacy becomes lower. Specifically, the utterance content is certainly output to the user having the degree of intimacy of a high level, and the utterance content is output to the user having the degree of intimacy of a middle level at a half rate to the user of the high level. However, for the user having no degree of intimacy, that is, the user who attends the exhibition hall first, the utterance content is certainly output.

In the above, the feature of the third embodiment is outlined. In the following, the third embodiment will be described in detail with using flowcharts shown in FIG. 20 to FIG. 21.

Figure 20:
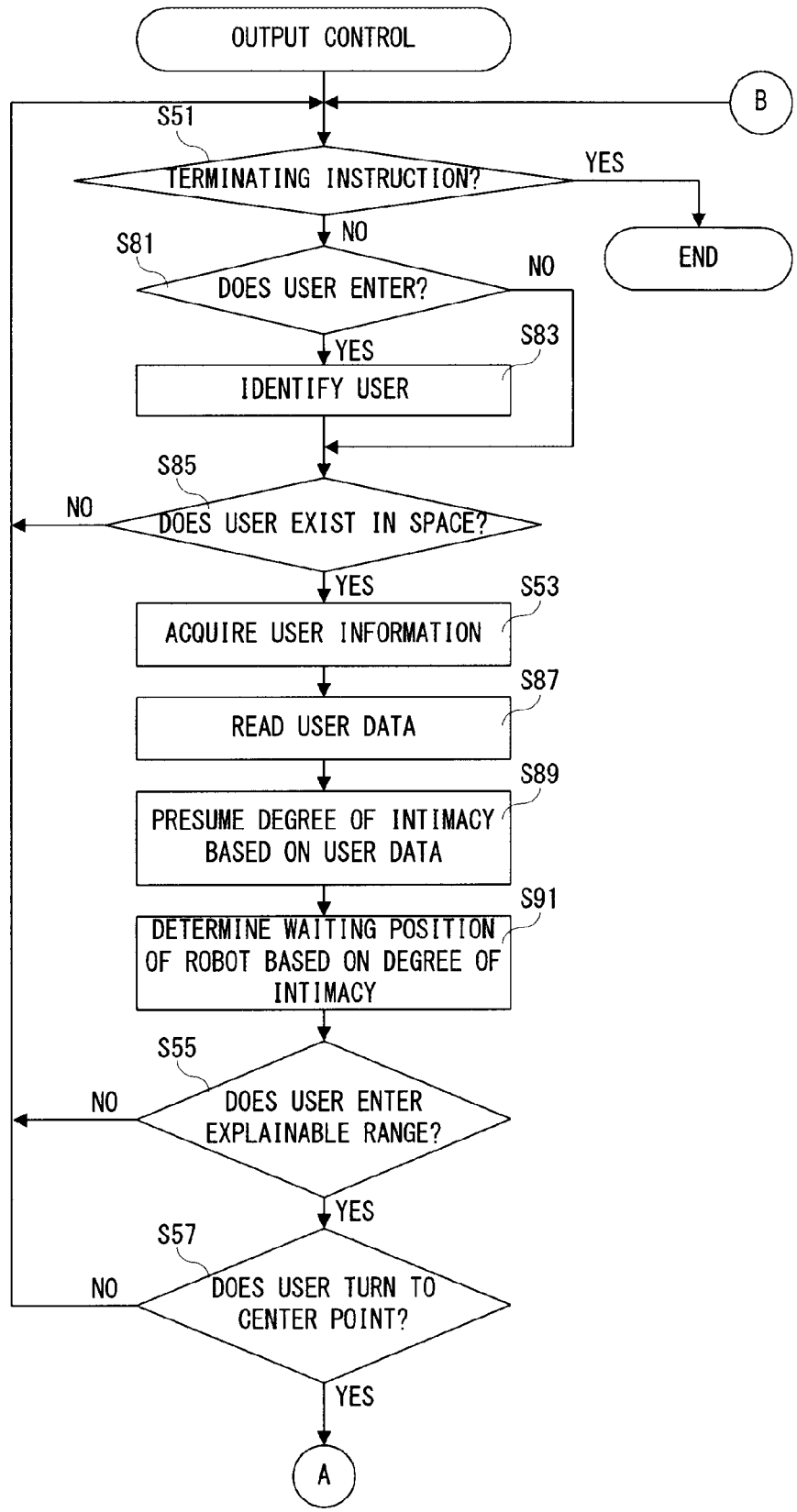
FIG. 20 is a flowchart showing an example of a part of output control processing in a further embodiment of the processor of the central controller shown in FIG. 4.
Figure 21:
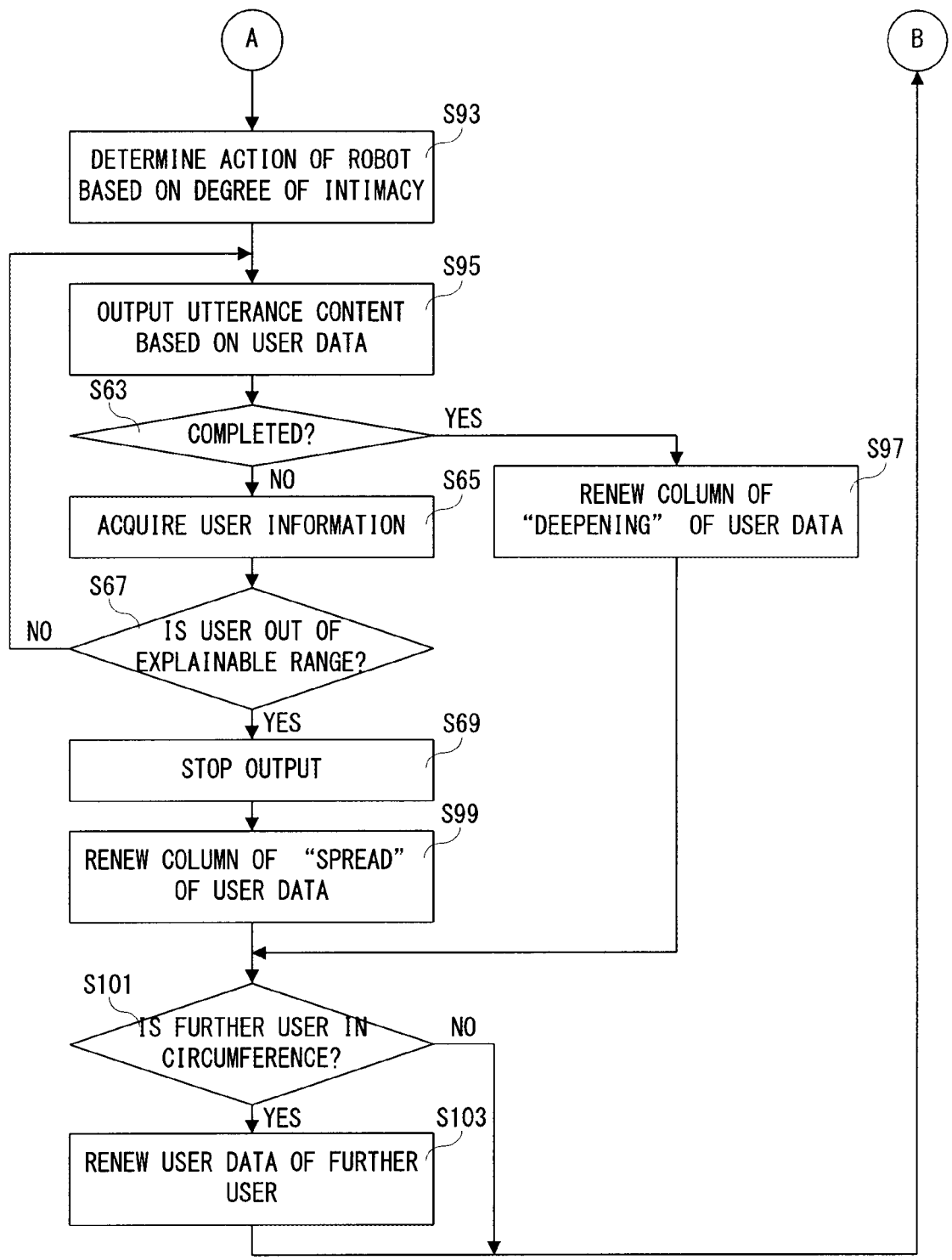
FIG. 21 is a flowchart showing an example of another part of the output control processing in the further embodiment of the processor of the central controller shown in FIG. 4, following FIG. 20.

FIG. 20 and FIG. 21 are flowcharts of output control processing of the third embodiment. In addition, since the processing in the steps S51-S69 in the output control processing of the third embodiment are substantively unchanged, a detailed description thereof is omitted.

If the power supply of the central controller 14 is turned on, the processor 16 determines whether a terminating instruction is received in a step S51. If "NO" at the step S51, that is, if not the terminating instruction, the processor 16 determines whether the user enters in a step S81. That is, it is determined whether a new user is detected at the entrance of the space. If "NO" at the step S81, that is, if a new user is not detected, the processor 16 proceeds to processing of a step S85. On the other hand, if "YES" at the step S81, that is, if a new user is detected, the processor 16 identifies the user in a step S83. That is, when the tag reader 13 that is installed at the entrance of the space reads a user ID of the user from an RFID tag, the user ID is specified from the user DB 26. If the user ID that is read is not registered in the user DB 26 at this time, user data containing the user ID is registered in the user DB 26. Then, when the user ID is specified or registered, a position of the user that is detected at the entrance and the user ID are associated with each other.

Subsequently, the processor 16 determines whether the user is in the space in a step S85. It is determined whether the position of the user is detected in the space. If "NO" at the step S85, that is, if there is no user in the space, the processor 16 returns to the processing of step S51. On the other hand, if "YES" at the step S85, that is, if the user is detected in the space, the processor 16 acquires user information in a step S53.

Subsequently, the processor 16 reads user data in a step S87. That is, the user data corresponding to the above-described user is read from the user DB 26. Subsequently, the processor 16 presumes the degree of intimacy based on the user data in a step S89. That is, the degree of intimacy is presumed based on the values stored in the columns of "deepening" and "spread" in the user data. Subsequently, the processor 16 determines the waiting position of the robot 10 based on the degree of intimacy in a step S91. If the presumed degree of intimacy is larger than the middle level, for example, the robot 10 moves to a position to be included in a field of view of the user.

Subsequently, the processor 16 determines whether the user enters the explanation start range in a step S55. The processor 16 returns to the processing of step S51 if "NO" at the step S55, and if "YES" at the step S55, the processor 16 determines whether the user turns to the center point C in a step S57. If "NO" at the step S57, the processor 16 returns to the processing of the step S51.

Furthermore, if "YES" at the step S57, that is, the user enters the explanation start range A and the user turns to the corresponding center point C, the processor 16 determines the action of the robot 10 based on the degree of intimacy in a step S93. That is, the processor 16 determines, according to the level of the presumed degree of intimacy, at least one of the reaction time until the robot 10 begins to move, the movement speed when approaching, the distance to the user and the standing position.

Subsequently, the processor 16 outputs an utterance content based on the user data in a step S95. That is, based on the values stored in the columns of "deepening" and "spread" in the user data, the utterance content is chosen from the utterance content DB 24. Then, the utterance content being chosen is sent to the robot 10, and the utterance content is output to the user. In addition, the processor 16 performing the processing of the step S95 functions as an output module.

Subsequently, the processor 16 determines whether the output is completed in a step S63. If "YES" at the step S63, that is, if the output of the utterance content is completed, the processor 16 updates the column of "deepening" of the user data in a step S97. That is, since the user listens to the explanation by the robot 10 to the last, the value of the column of "deepening" is incremented, and the value increases by one (1). If the processing of the step S97 is ended, the processor 16 proceeds to the processing of the step S101.

Furthermore, if "NO" at the step S63, that is, if the output of the utterance content is not completed, the processor 16 acquires the user information in a step S65, and the processor 16 determines whether the user is out of the explanation stop range A' in a step S67. The processor 16 returns to the processing of the step S95 if "NO" at the step S67, and if "YES" at the step S67, the processor 16 stops the output in a step S69.

Subsequently, the processor 16 updates the column of "spread" of the user data in a step S99. That is, since the user left without listening to the explanation by the robot 10 to the last, the value of the column of "spread" is incremented, and the value increases by one (1).

Subsequently, the processor 16 determines whether a further user is in the circumference in a step S101. That is, it is determined whether the utterance content that is output to the user is heard by the further user. If "NO" at the step S101, that is, if no further user exists in the circumference, the processor 16 returns to the processing of the step S51. On the other hand, if "YES" at the step S101, that is, if the further user is in the circumference, the processor 16 updates the user data of the further user in a step S103. If the value of the column of "deepening" is updated in the user data of the user, for example, the value of the column of "deepening" is also updated in the user table of the further user. Then, if the processing of the step S103 is ended, the processor 16 returns to the processing of the step SM. Then, if "YES" at the step S51, the processor 16 terminates the output control processing.

Furthermore, the processor 16 performing the processing of the step S89 or S95 functions as a presuming module. Furthermore, the processor 16 performing the processing of the step S91 or step S93 functions as a determination module. The processor 16 performing the processing of the steps S97, S99 and S103 functions as a storing module. Especially, the processor 16 performing the processing of the step S97 functions as a completion storing module, and the processor 16 performing the processing of the step S99 functions as a stop storing module. Then, the processor 16 performing the processing of the step S101 functions as the fourth determination module.

In addition, the pointing at the exhibition E may be performed by a face movement, a gaze, etc. of the robot 10. Furthermore, the robot 10 may be provided with a pointing module or pointing member, such as a laser pointer, a pointing stick, etc.

Furthermore, in further embodiments, the robot 10 may have the central controller 14, and the robot 10 may directly acquire the three-dimensional information from the range image sensors 12 through a wireless connection or a wired connection. In such a case, the robot 10 can determine an utterance content to be output alone and output the same. For example, the processor 90 of the robot 10 that performs the output control processing of the second embodiment makes the robot 10 move near the user based on the user information in the processing of the step S59, and reads an utterance content corresponding to the exhibition E from the utterance content DB 24 and makes the robot 10 output the utterance content in the processing of the step S61. Furthermore, the processor 90 of the robot 10 that performs the output control processing of the third embodiment makes the robot 10 move to the waiting position that is determined based on the degree of intimacy in the processing of the step S91, makes the robot 10 perform the action that is determined based on the degree of intimacy in the processing of the step S93, and in the step S95, reads an utterance content from the utterance content DB 24 based on the user data and makes the utterance content be output. Thus, in the further embodiments, the robot 10 can perform the explanation about the exhibition to the user by autonomously moving in the inside of the exhibition hall and operating.

Furthermore, in other embodiments, the robot 10 may output performing instructions of the output control processing to the central controller 14 in order to output the utterance content when the robot 10 detects the entering of the user. Thus, in order to support the autonomous action of the robot 10, the central controller 14 may be used by the robot 10.

Furthermore, in other embodiments, the explanation start range A and the explanation stop range A' may be the same coordinates ranges.

In addition, in other embodiments, when the robot 10 is provided with a display, the utterance content may be output with using not only a voice but an image. For example, the robot 10 that outputs the utterance content performs the explanation about the exhibition E while displaying an image on the own display.

Fourth Embodiment

In the fourth embodiment, in place of the robot 10 shown in the first embodiment to the third embodiment, a humanoid robot 501 that comprises a pair of left and right leg portions and a pair of left and right arm portions, and is movable by an action of the leg portions is adopted.

[Structure]

Figure 22:
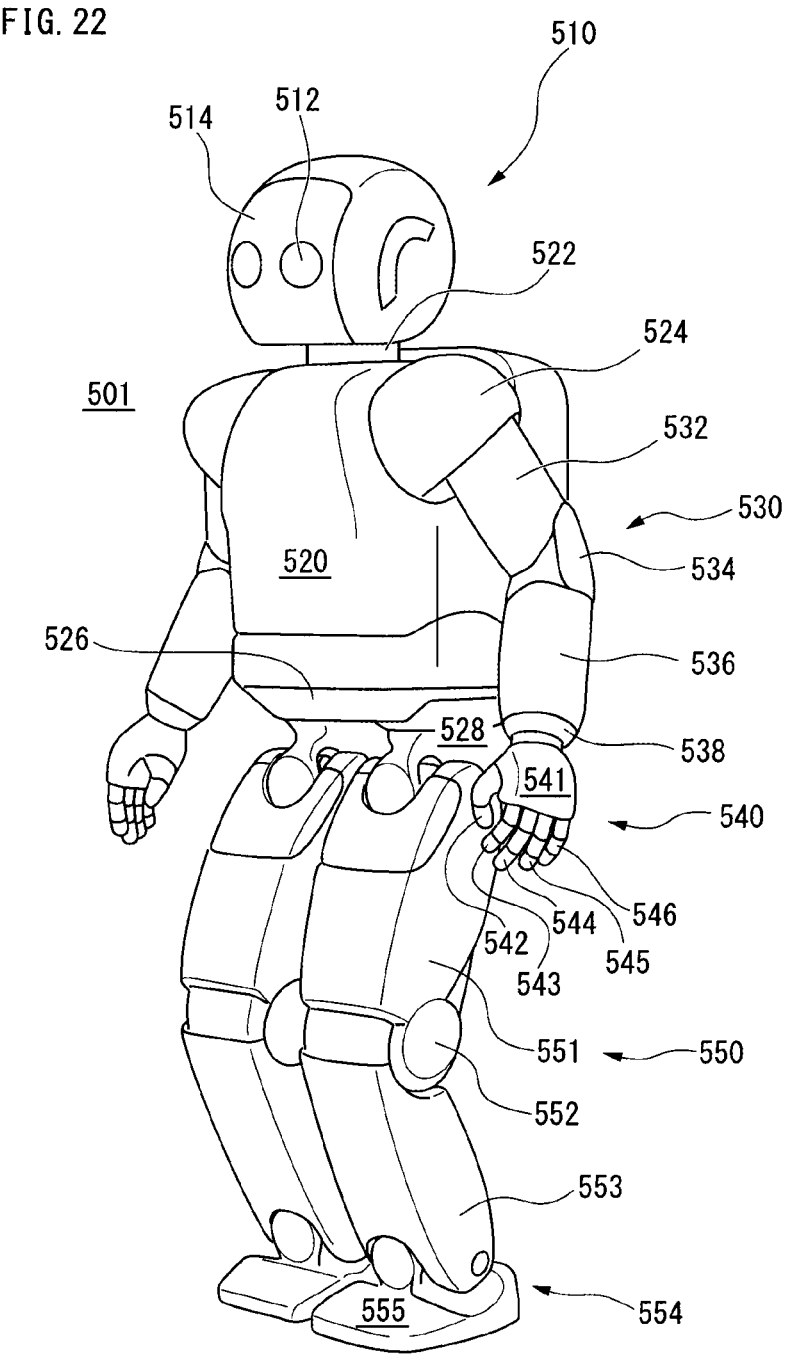
FIG. 22 is a view showing an example of an appearance configuration of a robot 501 of the other embodiment.
Figure 23:
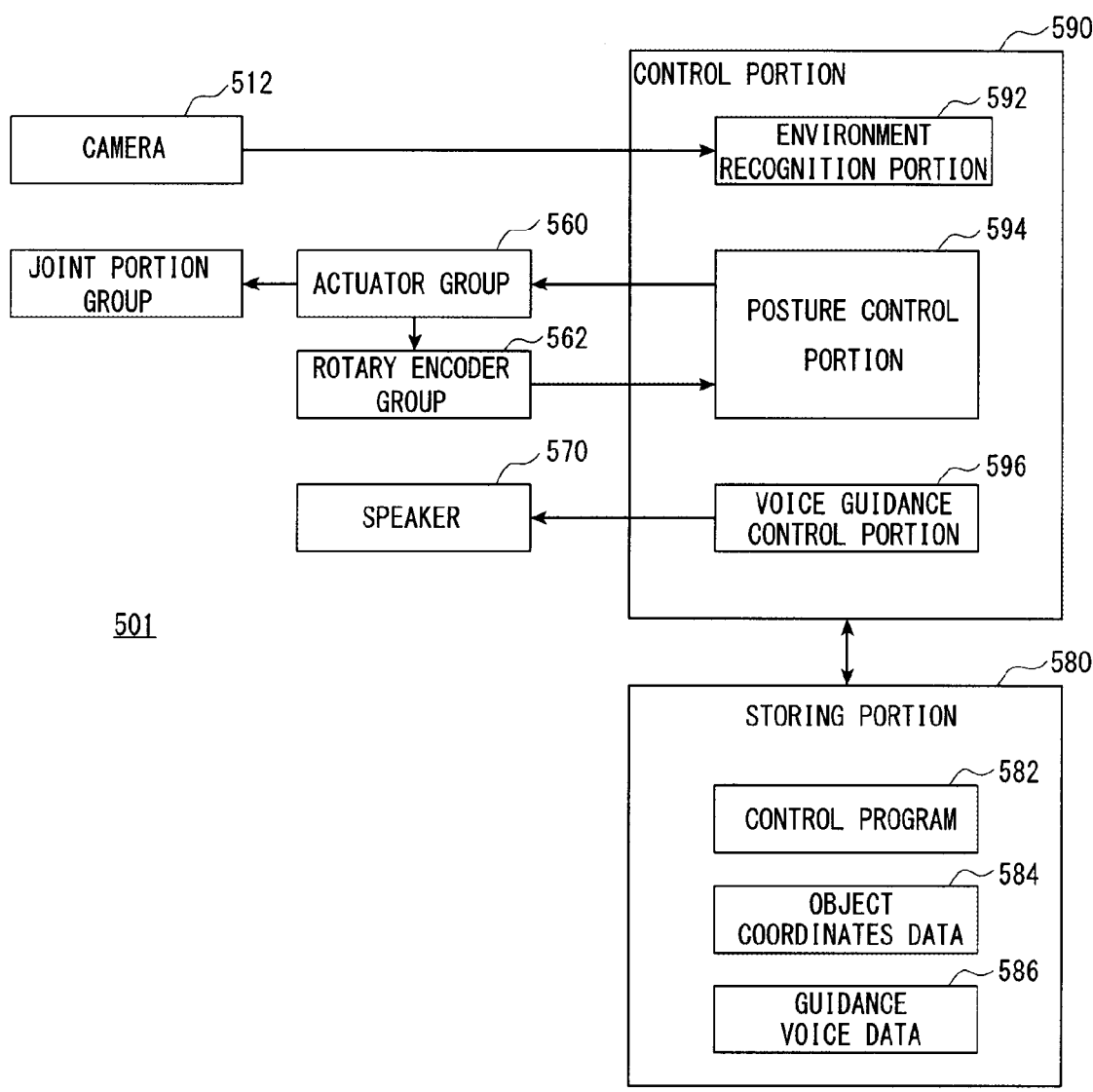
FIG. 23 is a view showing an example of functional structure provided on the robot 501.

FIG. 22 is a view showing an example of an appearance configuration of the robot 501 according to an embodiment. Furthermore, FIG. 23 is a view showing an example of functional structure that the robot 501 is provided with. The robot 501 has a head portion 510, a body portion 520, a pair of left and right arm portions 530, a pair of left and right hand portions 540 and a pair of left and right leg portions 550, for example. In addition, in the following, a description is made without distinguishing the left component and the right component about each pair of left and right components.

A pair of left and right cameras 512 are provided on the head portion 510. The camera 512 is a camera having a solid-state imaging device such as CCD and CMOS, for example. The camera 512 photographs a visible light or infrared light, and sends an image being photographed to a control portion 590.

Figure 24:
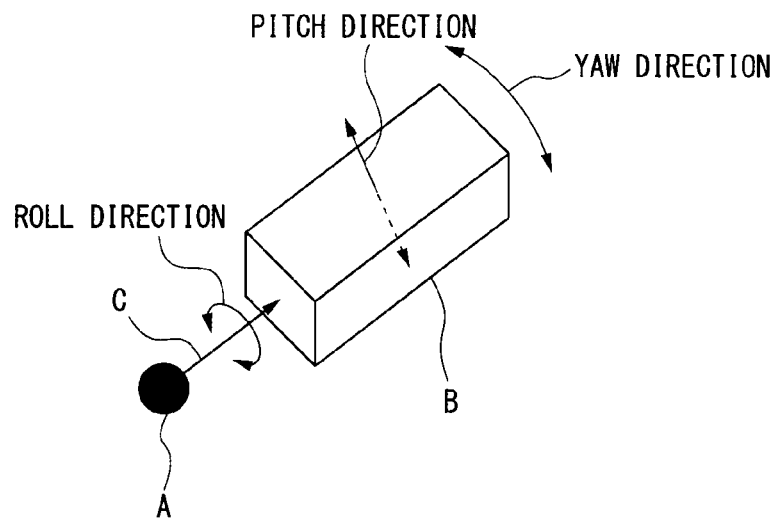
FIG. 24 is a view showing definition of a yaw direction, a pitch direction and a roll direction.

The body portion 520 is joined with the head portion 510 via a head joint portion 522, is joined with the arm portion 530 via a shoulder joint portion 524, and is joined with the leg portion 550 via a waist joint portion 526 and a hip joint portion 528. The head joint portion 522 makes the head portion 510 rotate to the body portion 520 with one degree of freedom in the roll direction. In the following, a description is made with using rotation directions represented by a yaw direction, a pitch direction and a roll direction. FIG. 24 is a view showing a definition of the yaw direction, the pitch direction and the roll direction. As shown in this view, a direction that a driven member B is rotated with an axis of a direction C of the driven member B being viewed from a joint portion A is defined as the roll direction. Furthermore, a direction that the direction C itself is rotated in a first direction is defined as the pitch direction, and a direction that the direction C itself is rotated in a second direction perpendicularly intersecting the first direction is defined as the yaw direction.

The shoulder joint portion 524 makes the arm portion 530 rotate to the body portion 520 with three degrees of freedom in the yaw direction, the pitch direction and the roll direction, for example. The waist joint portion 526 makes the hip joint portion 528 rotate to the body portion 520 with one degree of freedom in the roll direction, for example. The hip joint portion 528 makes the leg portion 550 rotate to the hip joint portion 528 with three degrees of freedom in the yaw direction, the pitch direction and the roll direction, for example. In addition, a waist camera, etc. not shown may be housed in the body portion 520.

The arm portion 530 comprises a first arm link portion 532 equivalent to an upper arm, an elbow joint portion 534, a second arm link portion 536 equivalent to a forearm and a wrist joint portion 538, for example. The elbow joint portion 534 makes the second arm link portion 536 rotate to the first arm link portion 532 with one degree of freedom in the pitch direction (to inner side of the arm). The wrist joint portion 538 makes the hand portion 540 rotate to the second arm link portion 536 with three degrees of freedom in the yaw direction, the pitch direction and the roll direction, for example.

Figure 25:
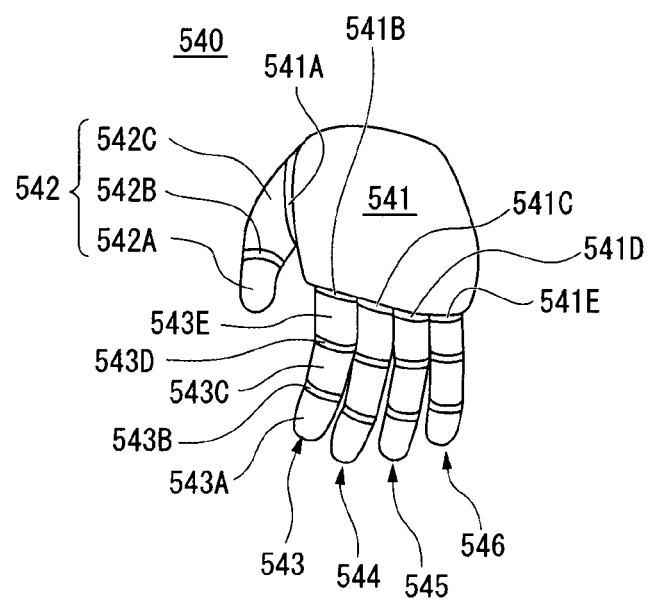
FIG. 25 is a view enlargedly showing a hand portion 540.

The hand portion 540 comprises a palm portion 541, a thumb portion 542, an index finger portion 543, a middle finger part 544, a third finger portion 545 and a little finger portion 546, for example. FIG. 25 is a view enlargedly showing the hand portion 540. Each finger portion can rotate to the palm portion 541 with two degrees of freedom in the pitch direction and the roll direction by knuckle joint portions 541A-541E. The thumb portion 542 comprises a thumb tip portion 542A, a first thumb joint portion 542B and a first thumb link portion 542C. The first thumb joint portion 542B makes the thumb tip portion 542A rotate to the first thumb link portion 542C with one degree of freedom in the pitch direction (to a palm side). The index finger portion 543 comprises an index finger tip portion 543A, a first index finger joint portion 543B, a first index finger link portion 543C, a second index finger joint portion 543D and a second index finger link portion 543E. The first index finger joint portion 543B makes the index finger tip portion 543A rotate to the first index finger link portion 543C with one degree of freedom in the pitch direction (to a palm side). The second index finger joint portion 543D makes the first index finger link portion 543C rotate to the second index finger link portion 543E with one degree of freedom in the pitch direction (to a palm side). The middle finger portion 544, the third finger portion 545 and the little finger portion 546 comprises, like the index finger 543, a tip portion, a first joint portion, a first link portion, a second joint portion and a second link portion. A detailed description about these is omitted.

The leg portion 550 comprises a first leg link portion 551, a knee joint portion 552, a second leg link portion 553, an ankle joint portion 554 and a foot portion 555, for example. The knee joint portion 552 makes the second leg link portion 553 rotate to the first leg link portion 551 with one degree of freedom in the pitch direction. The ankle joint portion 554 makes the foot portion 555 rotate to the second leg link portion 553 with two degrees of freedom in the pitch direction and the roll direction.

The robot 501 comprises an actuator group 560 that makes a driven member (the second leg link portion 553 in case of the knee joint portion 552) rotate a joint base member (the first leg link portion 551 in case of the knee joint portion 552) by applying a rotation power to the joint portion. Each actuator of the actuator group 560 may be provided for each of the joint portions, and there may exist an actuator capable of applying a rotation power to a plurality of joint portions. Furthermore, the actuator may be housed within the joint portion, or may be arranged outside the joint portion. In a case of the latter, the actuator applies the rotation power to the joint portion by connecting to the joint portion and the driven member by a wire, a belt, a pulley, a hydraulic organization, etc.

Furthermore, each actuator included in the actuator group 560 is attached with each rotary encoder included in a rotary encoder group 562. Each rotary encoder detects a rotation angle of the corresponding actuator, and sends the same to the control portion 590. In addition, the rotary encoder group 562 may detect not the rotation angle of the actuator group 560 but the rotation angle of the joint portion.

The robot 501 comprises a speaker 570 for outputting a voice. Contents of the voice that the speaker 570 outputs is determined by the control portion 590. The robot 501 further comprises a storage portion 580 and the control portion 590. The storage portion 580 includes a RAM, a ROM, an HDD, a flash memory, etc., for example. The storage portion 580 is stored with data such as a control program 582 that a processor such as a CPU, etc. provided in the control portion 590 executes, object coordinates data 584 indicating a position of an object OB (exhibition E) that is a target that the robot 501 guides and guidance voice data 586 etc. The control program 582 may be stored in advance in the storage portion 580, or may be downloaded from another computer device via an Internet. Furthermore, the control program 582 that is stored in a portable type storage medium may be installed in the storage portion 580.

The control portion 590 comprises an environment recognition portion 592, a posture control portion 594 and a voice guidance control portion 596, for example. A part or all of these functional portions may be software functional portions that show functions when the processor of the control portion 590 performs the control program 582. In addition, a part or all of these functional portions may be hardware functional portions such as an LSI (Large Scale Integration), an ASIC (Application Specific Integrated Circuit), etc.

The environment recognition portion 592 analyzes a photographed image that is input from the camera 512, and grasps positions of the above-described object and a person (user). In addition, a photographed image of a camera attached to the ceiling or the like in the house that the object is placed, for example, is input to the robot 501, and the positions of the object and the person may be grasped by analyzing this photographed image. If constructed like this, since bird's-eye view information can be acquired, the environment can be more correctly recognized. Furthermore, the environment recognition portion 592 may grasp a position of the object by an infrared radar, an ultrasonic radar, etc. In performing the guidance about the object, the posture control portion 594 controls the actuator group 560 such that the object can be pointed by the hand portion 540. The voice guidance control portion 596 controls the speaker 570 to output the voice that guides the object.

Figure 26:
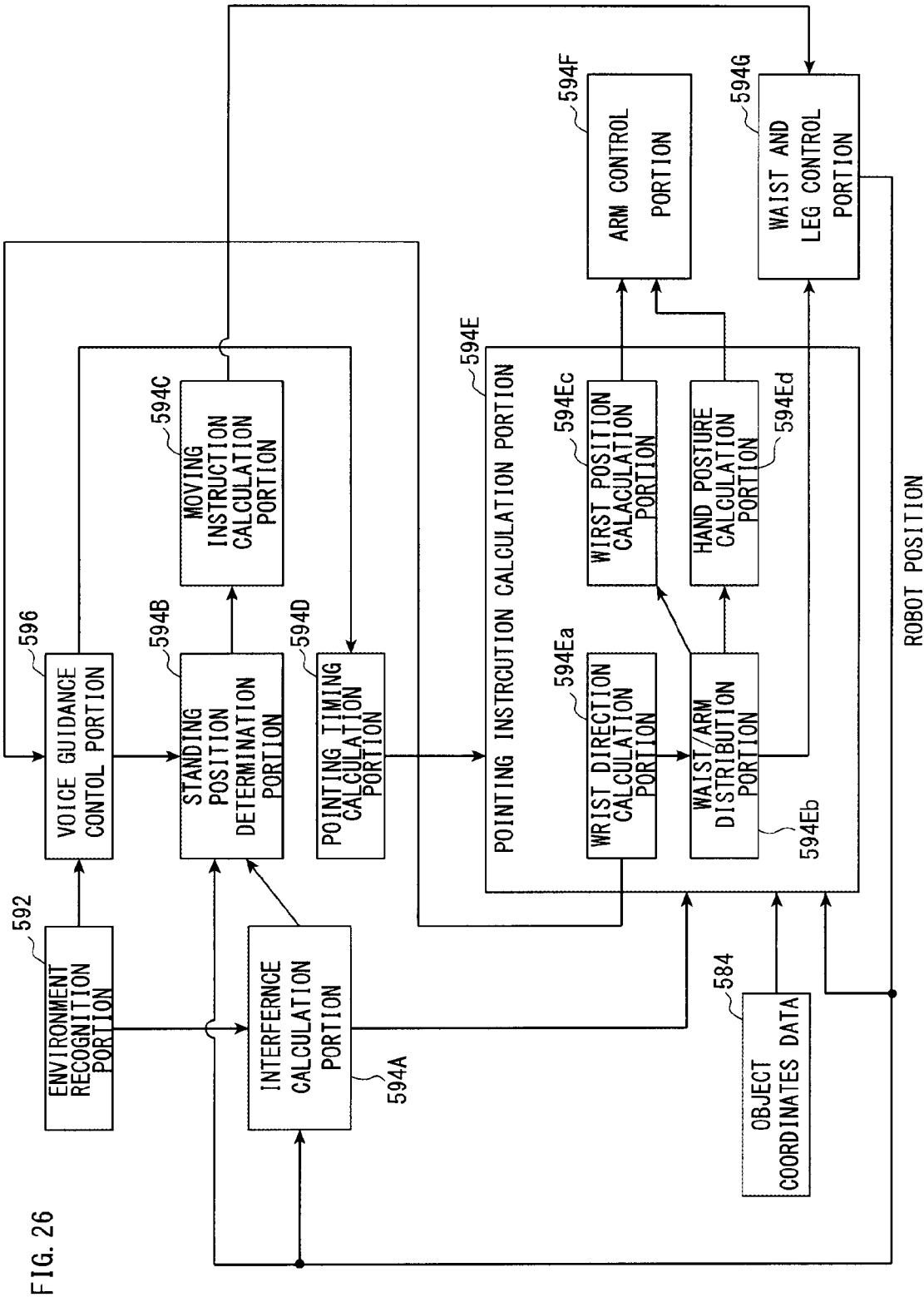
FIG. 26 is a view showing functional structure of a control portion 590 in detail.

FIG. 26 is a view showing the functional structure of the control portion 590 in more detail. The posture control portion 594 comprises an interference calculation portion 594A, a standing position determination portion 594B, a moving instruction calculation portion 594C, a pointing timing calculation portion 594D, a pointing instruction calculation portion 594E, an arm control portion 594F and a waist and leg control portion 594G. Furthermore, the pointing instruction calculation portion 594E comprises a wrist direction calculation portion 594Ea, a waist/arm distribution portion 594Eb, a wrist position calculation portion 594Ec and a hand posture calculation portion 594Ed.

[Movement of the Robot 501]

The robot 501 moves according to the position to the object and the position of the person who receives the guidance. Then, before and after moving, the actuator group 560 is controlled such that a state that a predetermined position OB1 of the object OB is located in the direction that is pointed by the index finger portion 543, for example, can be maintained. Hereinafter, this will be described.

Figure 27:
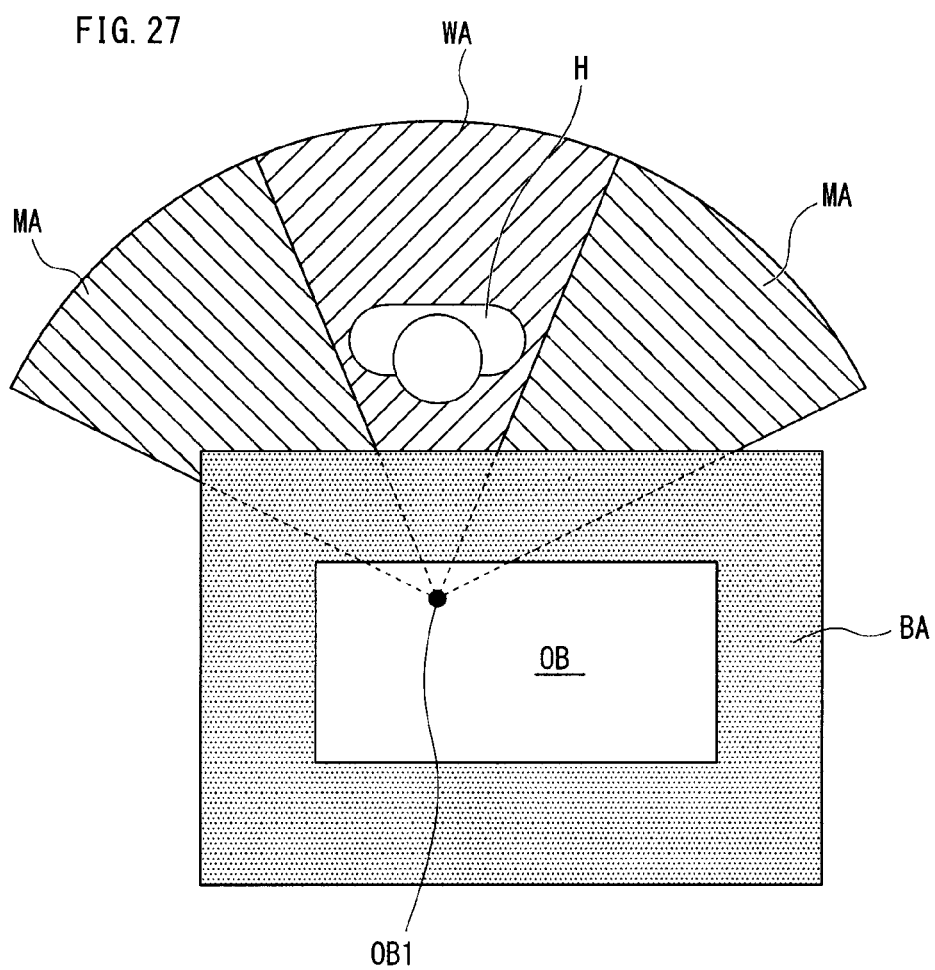
FIG. 27 is a view showing a movement principle of the robot 501.

FIG. 27 is a view showing the moving principle of the robot 501. The robot 501 stores a positional area of the object OB as the object coordinates data 584, and the standing position determination portion 594B sets up an area within a predetermined distance from an outer edge of the positional area as a ban (inhibit) area BA. Furthermore, the position OB1 of the object OB is described in advance in the object coordinates data 584 as a representative position suitable for looking at the object OB. Then, a suitable area WA that is located in the front of the position OB1 and excludes the ban area BA from a fan shape area with the center of the position OB1 is an optimal area for the person H looking at the position OB1 that is the representative point of the object OB. Furthermore, an area that is located at both sides of the suitable area WA and excludes the ban area BA from a fan shape area having an angle range wider than the suitable area WA with the center of position OB1 is set as a movable area MA. The robot 501 is controlled to move in an area including the movable area MA and the suitable area WA when performing the voice guidance about the object OB. The standing position determination portion 594B determines the standing position of the robot 501 within such the areas, and outputs the standing position to the moving instruction calculation portion 594C. The moving instruction calculation portion 594C instructs the waist and leg control portion 594G such that the robot 501 moves to the standing position that is determined by the standing position determination portion 594B. The waist and leg control portion 594G controls the actuators attached to joint portions below the waist joint portion 526 so as to move according to the instructions applied from the moving instruction calculation portion 594C.

Figure 28:
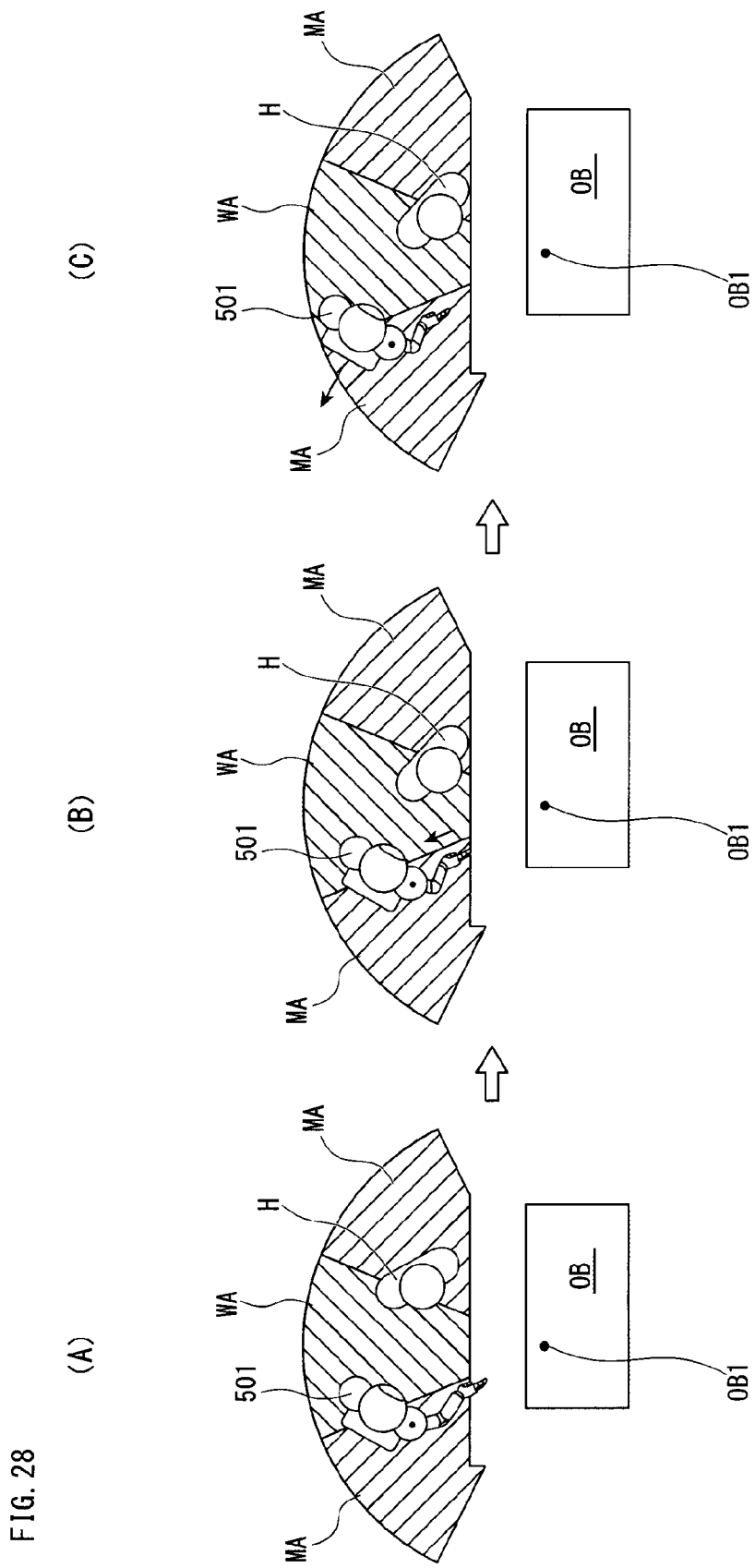
FIG. 28 is a view showing a manner that the robot 501 avoids interference with a person.

The interference calculation portion 594A performs a calculation for the robot 501 not to interfere (contact) with a person who receives the guidance. FIG. 28 is a view showing a manner that the robot 501 avoids the interference with a person. The interference calculation portion 594A determines whether a position of a person H that is input from the environment recognition portion 592 is within the predetermined distance from the position of each of the body portion 520, the arm portion 530 and the hand portion 540. Then, when the distance is within the predetermined distance, the interference calculation portion 594A outputs control amounts for retracting the arm portion 530 and/or retreating the robot 501 (an shrinkage amount of the arm and/or the standing position) to the position determination portion 594B and/or the pointing instruction calculation portion 594E. As shown in FIG. 28, if the person H approaches, the robot 501 contracts the arm portion 530 in a direction indicated by an arrow mark in FIG. 28 (B) to keep away from the person H, shortens an interference radius from the shoulder, and recedes in a direction indicated by an arrow mark (direction opposite to the person H) in FIG. 28 (C).

Figure 29:
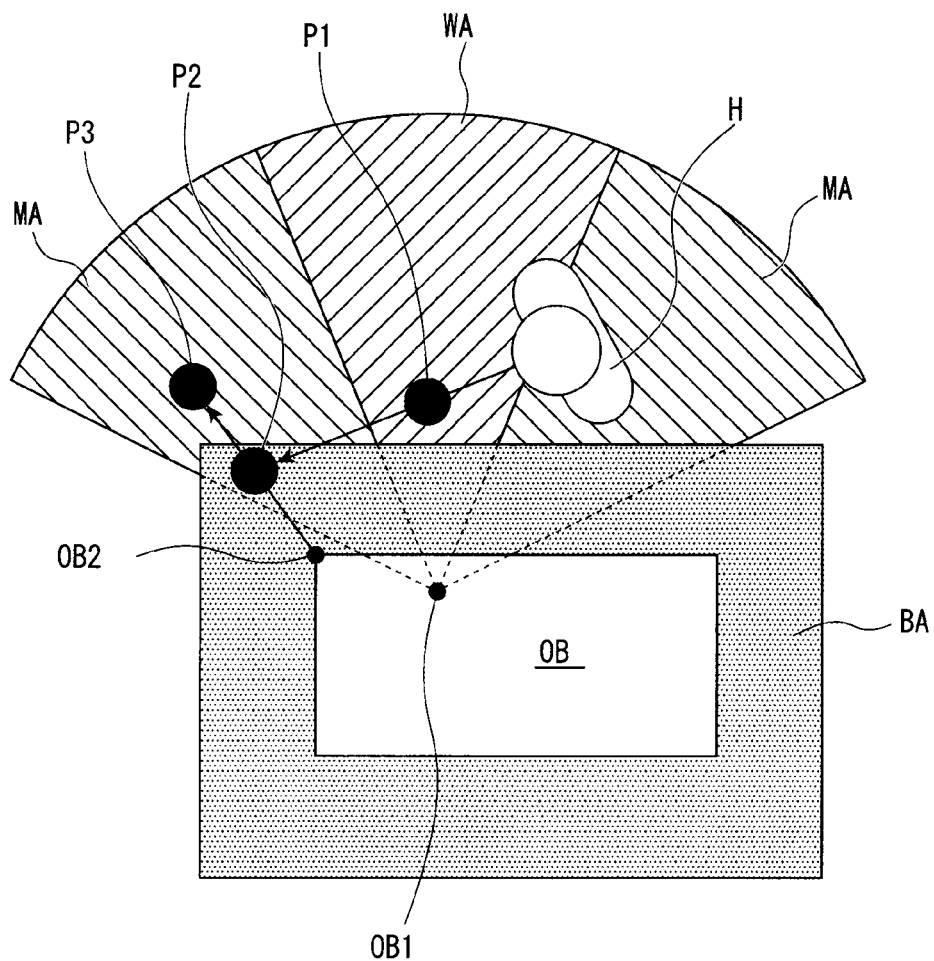
FIG. 29 is a view showing processing for calculating by an interference calculation unit 594A a standing position.

FIG. 29 is a view showing processing that the interference calculation portion 594A calculates the standing position. In this view, a point P1 is originally the standing position for the robot 501. If the person H approaches (if the distance becomes within a predetermined distance, for example), the interference calculation portion 594A determines first a provisional standing position at a position P2 that makes the robot 501 keep away linearly from the position of the person H. Then, the interference calculation portion 594A determines whether the provisional standing position P2 is within the ban area BA, and when within the ban area BA, the interference calculation portion 594A determines, as a new standing position, a position P3 that is kept away linearly from the position OB2 nearest the object OB (OB1 may be sufficient or the center point of an area of the object OB may be sufficient), and within the suitable area WA or the movable area MA. At this time, the interference calculation portion 594A instructs the arm control portion 594F and/or the waist and leg control portion 594G via the standing position determination portion 594B and the moving instruction calculation portion 594C such that the robot 501 moves without changing the direction of the body portion 520 and/or the direction of the arm portion 530. By this, the robot 501 can prevent interfering with the person H even if turns the body portion 520 and/or the arm portion 530. Then, the interference calculation portion 594A instructs the arm control portion 594F and/or the waist and leg control portion 594G via the standing position determination portion 594B and the moving instruction calculation portion 594C such that the robot 501 moves to the position P3 with turning the direction thereof (turning the left in case of FIG. 29). By these, the robot 501 can move smoothly while avoiding interference with the person and the object OB.

[Guidance Posture and Action]

Figure 30:
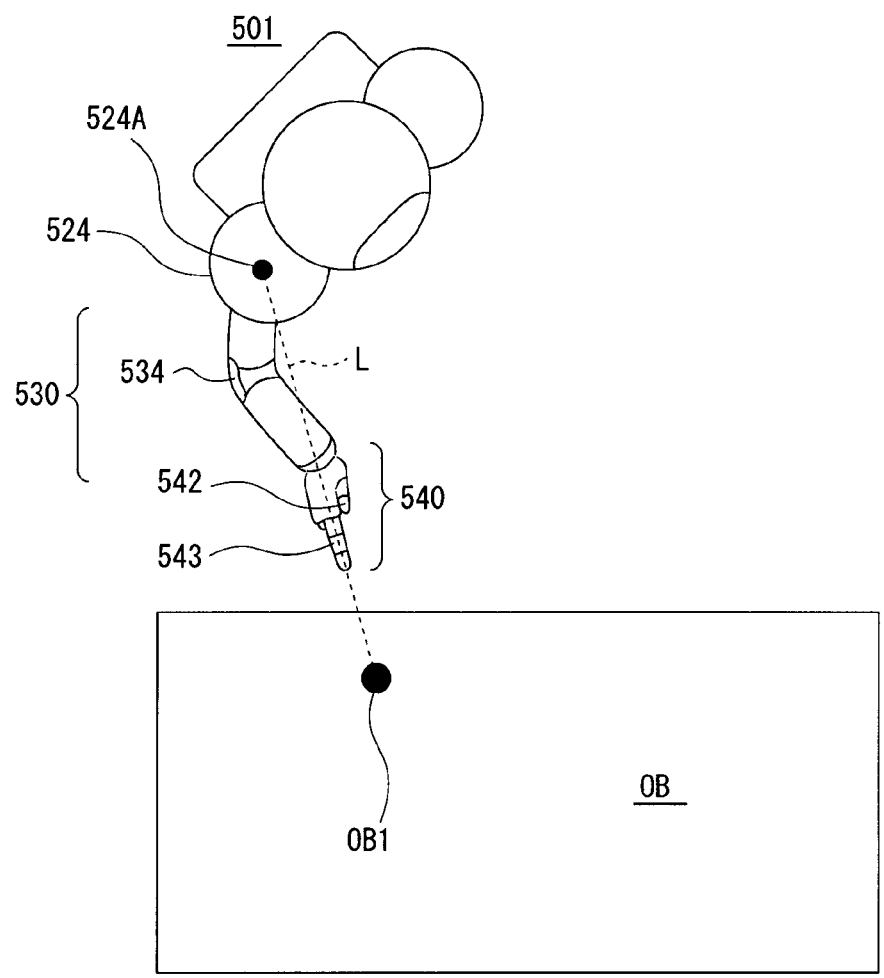
FIG. 30 is a view showing an example of a posture at a time of the robot 501 pointing at an object.
Figure 31:
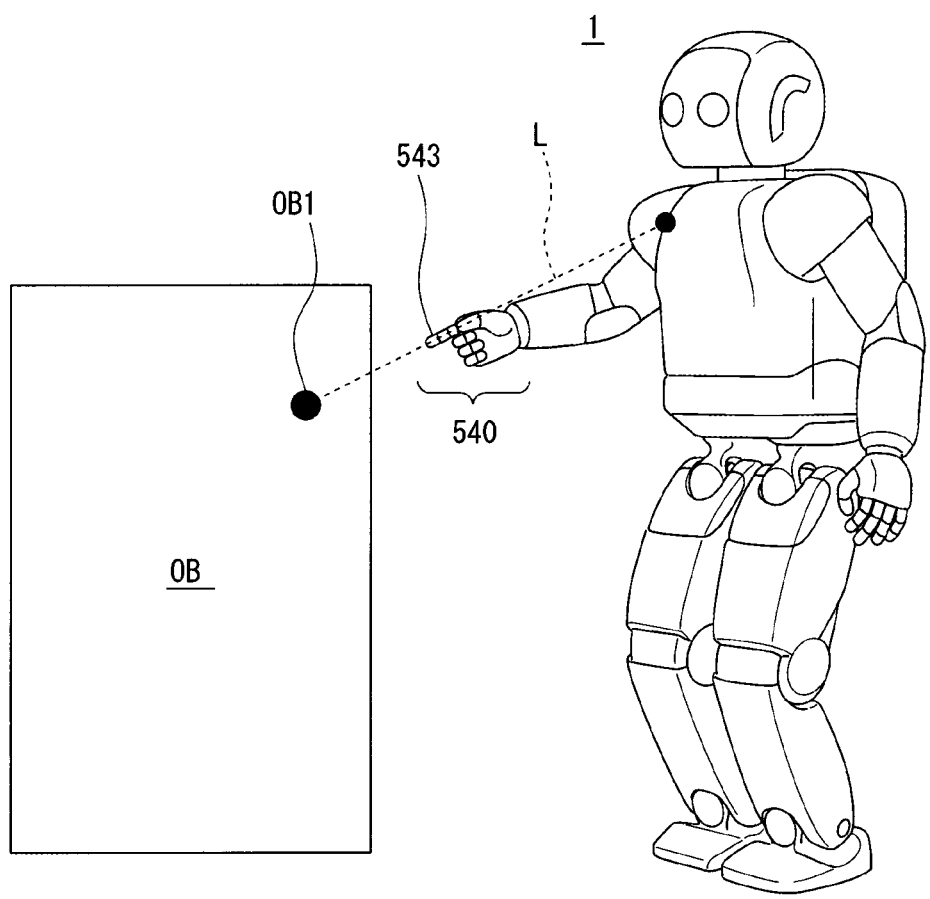
FIG. 31 is a view showing an example of a posture at a time of the robot 501 pointing at an object.

FIG. 30 and FIG. 31 are views showing an example of a posture at a time of the robot 501 pointing at an object. FIG. 30 is a view that is viewed from a top and FIG. 31 is a view that is viewed from a side. As shown, when pointing to the direction of the specific position OB1 of the object OB, the robot 501 forms a posture that the index finger portion 543 is extended on a straight line L that connects the rotation center 524A of the first arm link portion 532 in the shoulder joint portion 524 (an example of the "predetermined portion" in the body portion 520) with the specific position OB1. The robot 501 stores the coordinates information of predetermined position OB1 of the object OB in the storage portion 580 as the object coordinates data 584. The posture control portion 594 controls the actuators of the shoulder joint portion 524, the elbow joint portion 534, the wrist joint portion 538 and the hand portion 540 to realize such a posture. Thus, the person who receives the guidance can grasp intuitively the direction that the robot 501 points. That is, the robot 501 can guide more effectively the gaze of the person who received the guidance.

Figure 32:
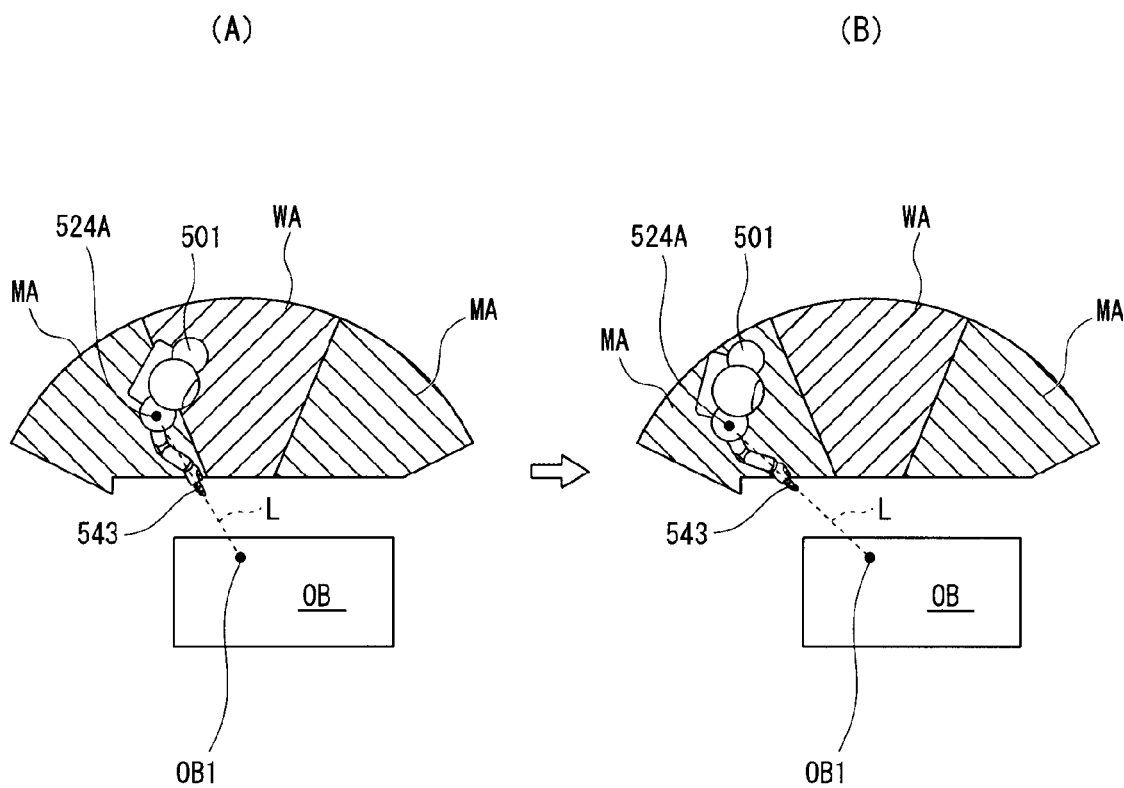
FIG. 32 is a view showing a manner that the robot 501 continues turning an extending direction of an index finger portion 543 toward a position OB1.

Furthermore, the robot 501 maintains, by the processing of the interference calculation portion 594A, etc., a state that the extending direction of the index finger portion 543 (the pointing direction) turns to the position OB1 before and after moving. FIG. 32 is a view showing a manner that the robot 501 continues turning the extending direction of the index finger portion 543 to the position OB1. By this, the person who receives the guidance can grasp intuitively the direction that the robot 501 points. That is, the robot 501 can guide more effectively the gaze of the persons who receive the guidance.

Figure 33:
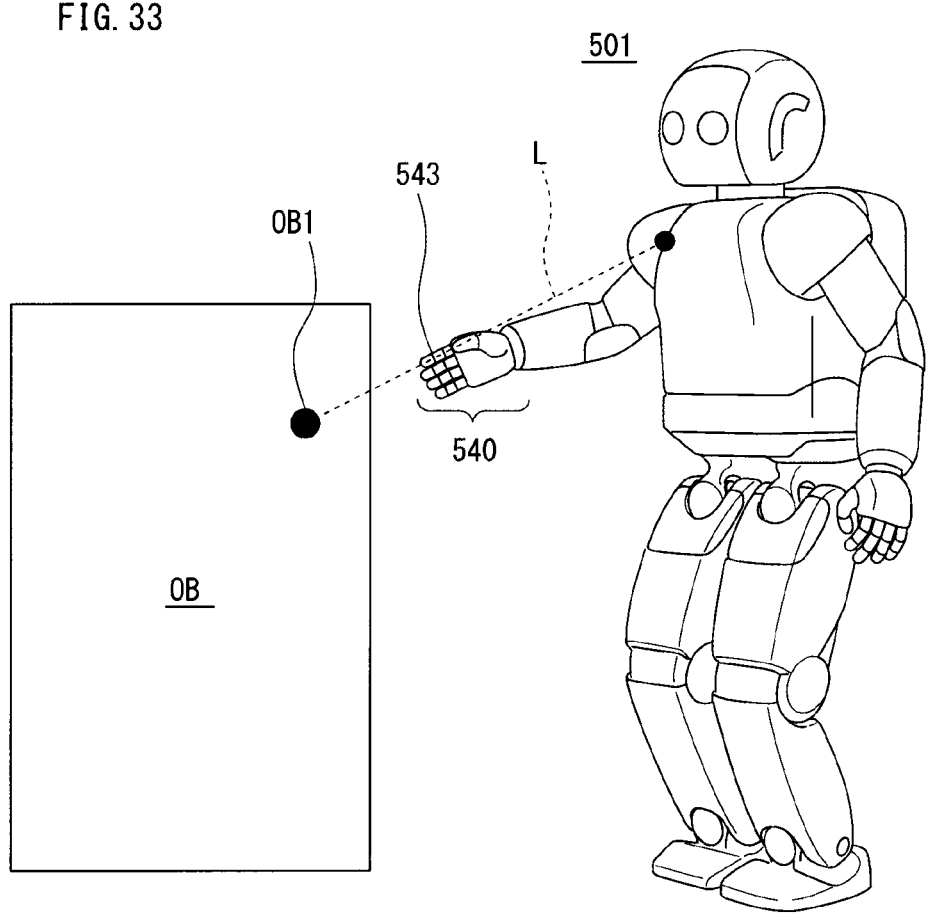
FIG. 33 is a view showing another example of the posture at a time of the robot 501 pointing at an object.

In addition, although the index finger portion 543 is shown as an example of a "pointing member (pointing module)", not limited to this. For example, the robot 501 may treat the whole of the hand portion 540 as the pointing member. The robot 501 may turn the hand portion 540 to the object OB with a state that all the finger portions are straightened, for example. In such a case, the posture control portion 594 controls the actuators of the shoulder joint portion 524, the elbow joint portion 534, the wrist joint portion 538 and the hand portion 540 to take the posture that the whole of the hand portion 540 extends on the straight line L. FIG. 33 is a view showing such a posture, and showing another example of a posture at a time of the robot 501 pointing at an object (since a view that is viewed from the top is approximately the same as FIG. 26, only a view that is viewed form the side is shown). Furthermore, the robot 501 may hold tools such as a pointing stick in the hand portion 540, and may turn the pointing stick being held to the object OB.

In addition, although that "the index finger portion 543 extends on the straight line L" is described to have a meaning on the three-dimensional space in FIG. 30 and FIG. 31, this may have a meaning on the two-dimensional space. That is, that "when viewed from a specific direction, the index finger portion 543 may extend on the straight line L" is sufficient.

Furthermore, FIG. 34 and FIG. 35 are views schematically showing the action that is performed when the robot 501 points at an object. FIG. 34 is a view that is viewed from a top and FIG. 35 is a view that is viewed from a side. As shown, when pointing to the direction of the specific position OB1 in the object OB, the robot 501 performs an action that the index finger portion 543 comes and goes on the straight line L while maintaining a state that the index finger portion 543 is extending on the straight line L. The posture control portion 594 controls the actuators of the shoulder joint portion 524, the elbow joint portion 534 and the wrist joint portion 538 so as to realize such an action. By this, the person who receives the guidance can grasp still more intuitively the direction that the robot 501 points. That is, the robot 501 can guide still more effectively the gaze of the person who receives the guidance. In addition, such an action is also performed when a tip side member from the arm portion 530 of the robot 501 interferes with the object OB and/or a person.

In the following, with reference to FIG. 26, a flow of processing until the posture shown in FIG. 30 to FIG. 35 is realized will be described. The pointing instruction calculation portion 594E is input with a pointing timing signal and identification information of the object OB from the pointing timing calculation portion 594D, information that designates a shrinkage amount of the arm portion from the interference calculation portion 594A and the positions of all the objects OB from the object coordinates data 584, respectively, for example.

Figure 36:
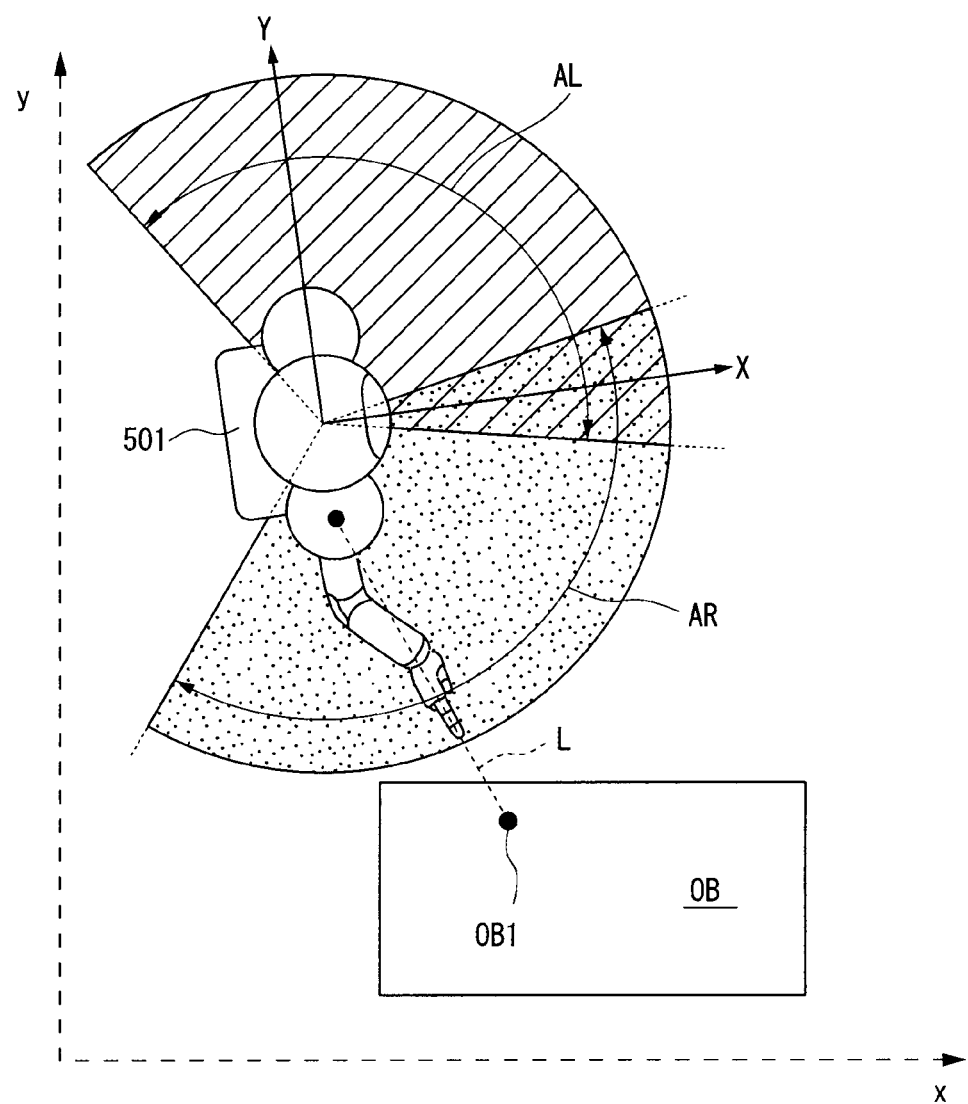
FIG. 36 is a view showing processing by a wrist direction calculation unit 594Ea.

The wrist direction calculation portion 594Ea specifies, first, the position OB1 of the object OB that the guidance is to be performed out of the positions of all the objects OB with using the identification information of the objects OB. This position OB1 is described as a position (position at a time of making the exhibition hall into a plane) on a real coordinate system, for example. The wrist direction calculation portion 594Ea performs processing that converts the position on the real coordinate system into the position on a robot coordinate system. FIG. 36 is a view showing the processing by the wrist direction calculation portion 594Ea. In this view, an x-axis and a y-axis shown by dotted lines indicate the real coordinate system, and an X-axis and a Y-axis shown by solid lined indicate the robot coordinate system. The X-axis of the robot coordinate system is defined as a direction that a part equivalent to a tiptoe of the robot 501 turns to, for example. Conversion of the position in the real coordinate system into the position on the robot coordinate system is performed based on the position and the direction of the robot 501 on the real coordinate system.

Furthermore, if the position and the direction on the robot coordinate system of the position OB1 are evaluated by the above-mentioned conversion, the wrist direction calculation portion 594Ea determines whether the position OB1 is to be pointed by a right arm portion or a left arm portion. In FIG. 36, an angle range AR shows a possible range of pointing by the right arm and an angle range AL shows a possible range of pointing by the left arm. The wrist direction calculation portion 594Ea determines fundamentally that, if the direction of the position OB1 is within the angle range AR, the position OB1 is to be pointed by the right arm, and if the direction of the position OB1 is within the angle range AL, the position OB1 is to be pointed by the left arm.

Figure 37:
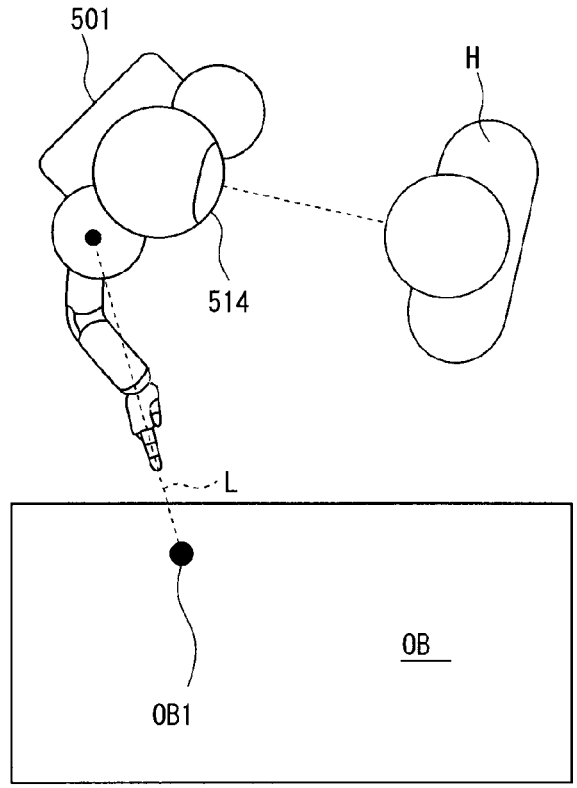
FIG. 37 is a view showing a manner that an arm having to point is determined when the position OB1 exists in an overlapping area of angle ranges AR and AL.

Here, a range that is included in neither the angle range AR nor the angle range AL is an impossible range of pointing from the standing position. In such a case, the wrist direction calculation portion 594Ea outputs information on the purport that cannot be pointed to the voice guidance control portion 596, for example, and the voice guidance control portion 596 performs control to change to the voice guidance that does not need to be performed while pointing. Furthermore, in FIG. 36, there is an overlap area of the angle ranges AR and AL. When the position OB1 exists within the overlap area, the wrist direction calculation portion 594Ea determines whether to point which arm according to the position of the person. FIG. 37 is a view showing a manner that the arm having to point is determined when the position OB1 exists in the overlap area of the angle ranges AR and AL. The robot 501 performs the explanation while making the head front 514 (side that the camera 512 is provided) of the head portion 510 face the person H. Then, the wrist direction calculation portion 594Ea determines whether to point with which arm such that the rotation center 524A of the shoulder joint portion 524, the hand portion 540 and the straight line L connecting the position OB1 do not intersect the straight line that connects the head portion 510 and the person. In a scene as shown in FIG. 37, if the position OB1 is pointed by the left arm provisionally, since the rotation center 524A, the hand portion 540 and the straight line connecting the position OB1 become to intersect the straight line that connects the head front 514 and the person, there occurs an unnatural posture seemingly. Accordingly, the wrist direction calculation portion 594Ea determines, in the scene as shown in FIG. 37, that the voice guidance is to be performed while pointing at the position OB1 by the right arm.

Figure 38:
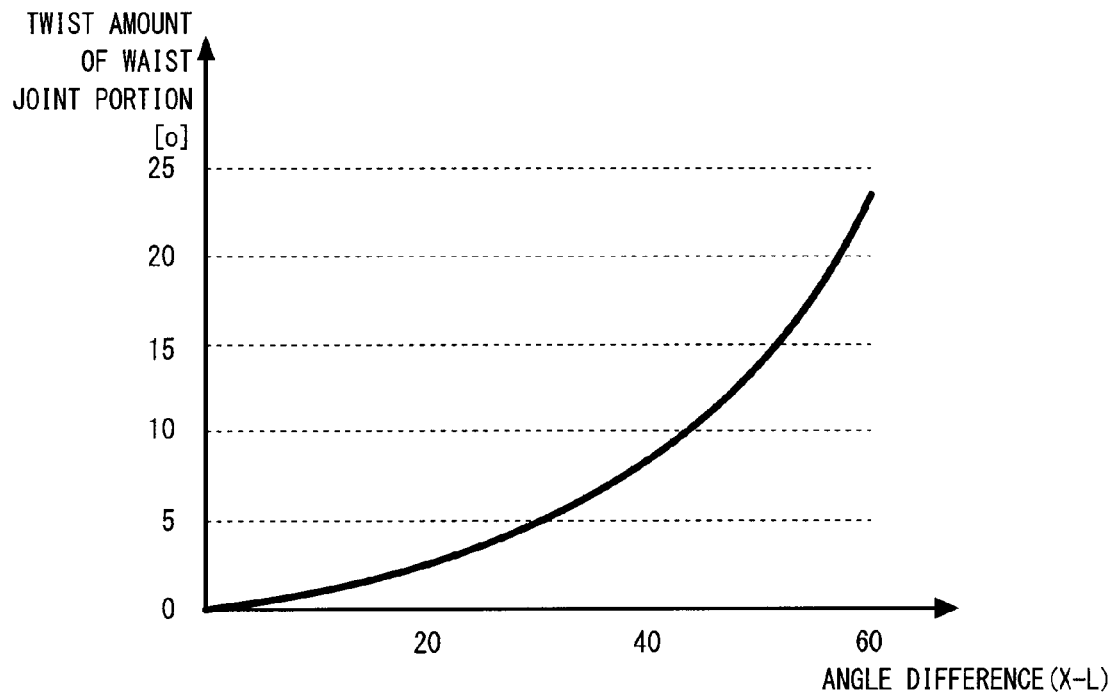
FIG. 38 is a view showing an example of distribution tendency at a time of the waist/arm distribution portion 594Eb distributing a twist amount.

If the wrist direction calculation portion 594Ea determines the direction of the hand portion 540 that determines the direction of the position OB1, that is, the extending direction of the index finger portion 543, the waist/arm distribution portion 594Eb distributes a "twist" to realize an angle difference (an angle formed by the X-axis and the straight line L in FIG. 36, for example) of the X direction on the robot coordinate system and the extending direction of the index finger portion 543 to the waist joint portion 526 and the joint portions from the shoulder to the arm, the shoulder joint portion 524, the elbow joint portion 534 and the wrist joint portion 538. The waist/arm distribution portion 594Eb distributes the twist amount such that the larger the angle difference, the larger rate of the twist about the waist joint portion 526, for example. FIG. 38 is a view showing an example of a distribution tendency at a time of the waist/arm distribution portion 594Eb distributing the twist amount. The twist amount θ 526 of the waist joint portion 526 is calculated by a formula (1), for example, when assuming that an angle formed by the X-axis and the straight line L is θ XL.

$$\theta 526 = -\theta XL \times \{1 | \exp(|\theta XL/\pi|)\} \quad (1)$$

If a distribution degree or ratio of the twist amount is determined by the waist/arm distribution portion 594Eb, in order to realize the twist amount being distributed, the waist and leg control portion 594G controls the actuator attached to the waist joint portion 526. Furthermore, a position (x, y, z) of the hand portion 540 on the robot coordinate system is calculated by wrist position calculation portion 594Ec. Furthermore, an angle that is formed by the index finger portion 543 against the palm portion 541 is calculated by the posture calculation portion 594Ed. The postures shown in FIG. 30, FIG. 31, etc. can be realized by driving, by the arm control portion 594F with using these calculation results, the actuators attached to the joint portions in a tip side part from the shoulder joint 524.

[Processing Flow]

Figure 39:
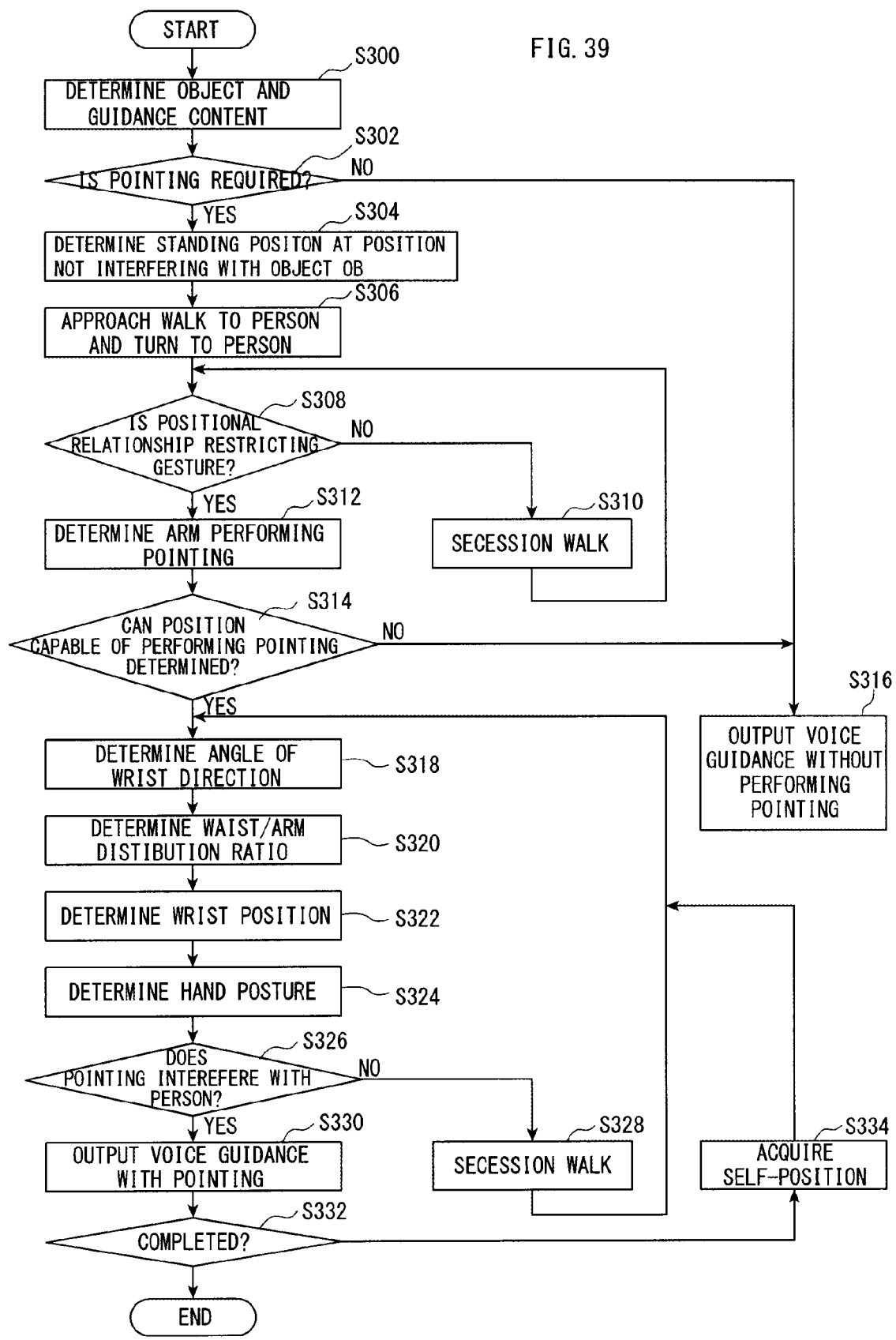
FIG. 39 is an example of a flowchart showing a flow of processing performed by the control portion 590.

In the following, a flow of processing after the standing position of the robot 501 is determined until the voice guidance is performed in a form of a flowchart. FIG. 39 is an example of a flowchart showing the flow of the processing performed by the control portion 590. First, the control portion 590 determines an object OB and a guidance content (in a step S300). Next, the control portion 590 determines whether the guidance content is a content requiring pointing (in a step S302). When the guidance content is not a content requiring the pointing, the voice guidance control portion 596 controls the speaker 570 to output the voice guidance while the pointing is not performed (in a step S316).

When the guidance content is a content requiring the pointing, the standing position that does not interfere with the object OB is determined (in a step S304). Next, the posture control portion 594 controls the actuator group 560 such that the robot 501 performs an approach walk at a person and the head front 514 of the head portion 510 turns to the direction of the person (in a step S306).

Next, the posture control portion 594 determines whether there is a positional relationship that a gesture is restricted (in a step S308). In a case of the positional relationship that the gesture is restricted, the posture control portion 594 controls the robot 501 to perform a secession walk (in a step S310), and performs the determination in the step S308 again.

If not the positional relationship that the gesture is restricted, the posture control portion 594 determines the arm that performs the pointing (in a step S312). Next, the posture control portion 594 determines whether the position capable of performing the pointing can be determined (in a step S314). When the position capable of performing the pointing cannot be determined, the voice guidance control portion 596 controls the speaker 570 to output the voice guidance without pointing (in a step S316).

When the position capable of performing the pointing can be determined, as mentioned above, the posture control portion 594 determines an angle of the wrist direction (in a step S318), determines the waist/arm distribution ratio (in a step S320), determines the wrist position (in a step S322), and determines the hand posture (in a step S324). Then, the posture control portion determines whether the pointing interferes with the person (in a step S326). When the pointing interferes with the person, the posture control portion 594 controls the robot 501 to perform a secession walk (in a step S328), and returns to the step S318.

On the other hand, when the pointing does not interfere with the person, the voice guidance control portion 596 controls the speaker 570 to output the voice guidance while the posture control portion 594 controls the actuator group 560 to make the robot 10 form the posture for the pointing (in a step S330). Subsequently, the control portion 590 determines whether the voice guidance is completed (in a step S332). When the voice guidance is not completed, the position of the robot 501 is acquired based on the history of the operation of the actuator group 560 and the analysis of the photographed image of the camera 512 (in a step S334), and returns to the step S318. When the voice guidance is completed, this flowchart at this time is terminated.

[Appeal Control]

Figure 40:
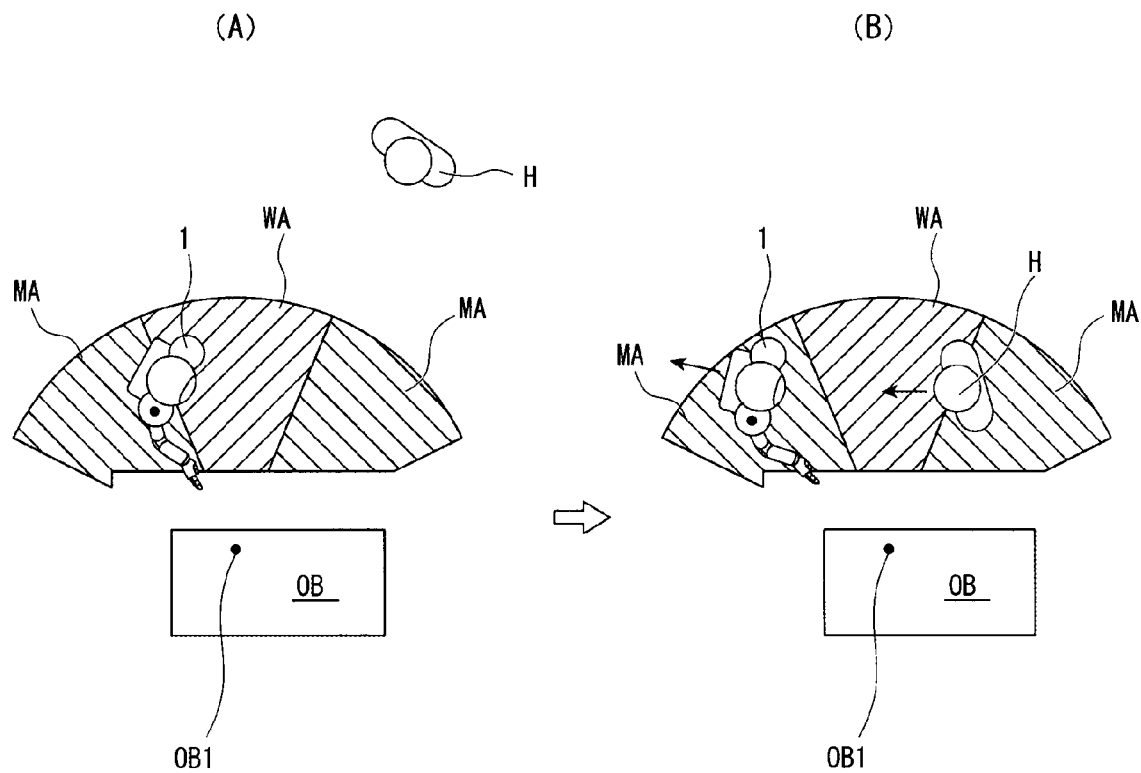
FIG. 40 is a view showing a manner that the robot 501 guides a person H to a suitable area WA.

The robot 501 may perform action that guides the person H to the suitable area WA, before performing the voice guidance about object OB, as described below. FIG. 40 is a view showing a manner that the robot 501 guides the person H to the suitable area WA. As shown in FIG. 40 (A), the robot 501 stands in the suitable area WA first, and outputs a voice ("it is here" or the like) that appeals to come to a self-position to the person H while pointing at the object OB. Then, as shown in FIG. 40 (B), if the robot 501 recedes to the movable area MA according to the person H approaching, and outputs the voice guidance about the object OB if the person H enters the suitable area WA. By such control, the robot 501 can guide the person to a position easy to see the object OB.

Figure 41:
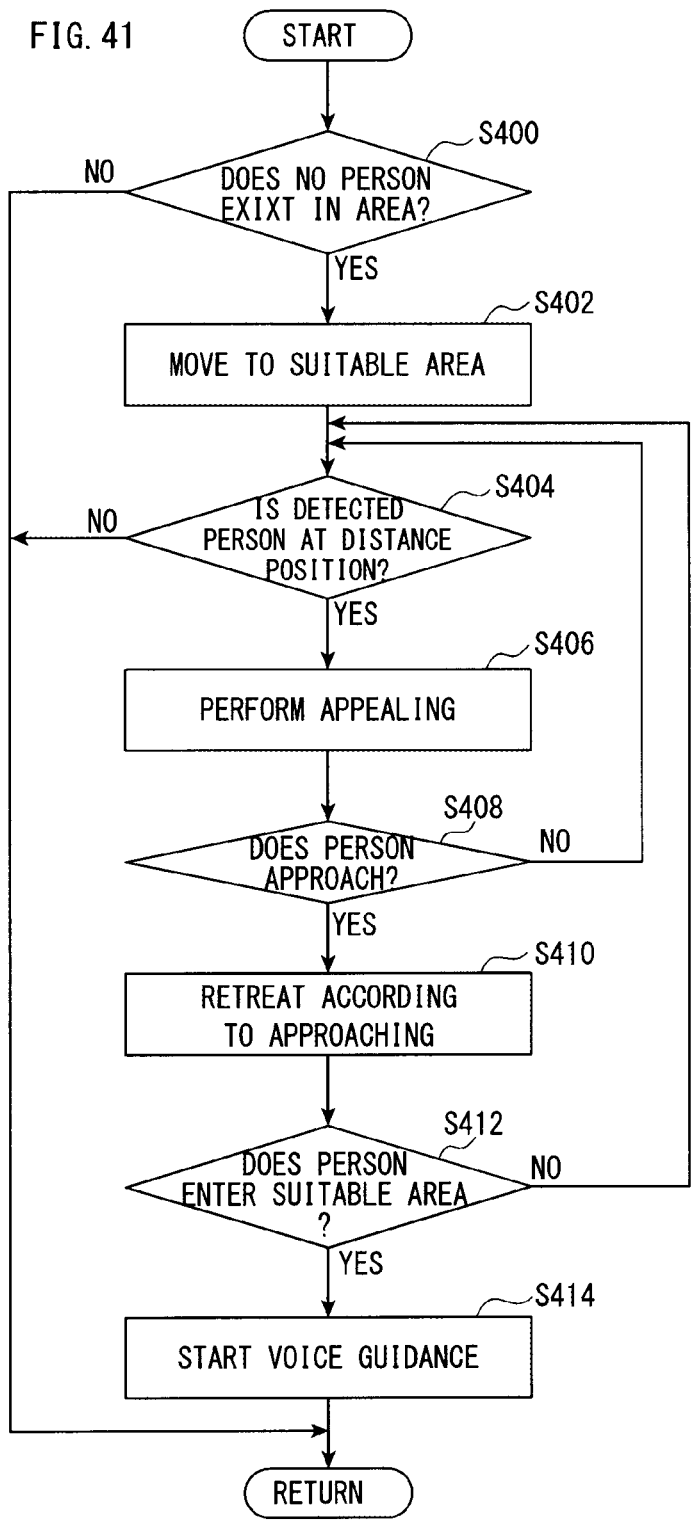
FIG. 41 is an example of a flowchart showing a flow of the processing that is performed when the robot 501 guiding the person H to the suitable area WA.

FIG. 41 shows an example of a flowchart showing a flow of processing performed when the robot 501 guides the person H to the suitable area WA. First, the posture control portion 594 determines whether a person is present in the suitable area WA or the movable area MA (in a step S400). When there is a person in the suitable area WA or the movable area MA, this flowchart at this time is terminated. In this case, processing of the flowchart of FIG. 39 is performed, for example.

When there is no person in the suitable area WA or the movable area MA, the posture control portion 594 makes the robot 501 move into the suitable area WA (in a step S402). Then, it is determined whether a person is detected in a distant position by the environment recognition portion 592 (in a step S404). The "distant position" may mean a position outside the suitable area WA and the movable area MA, and may mean a position beyond a predetermined distance from the outer edges of the suitable area WA and the movable area MA or beyond a predetermined distance from the robot 501. When no person is detected in the distant position, this flowchart at this time is terminated.

When a person is detected in the distant position, the robot 501 outputs the voice appealing to the person to come to a self-position (in a step S406). Then, the posture control portion 594 determines whether the person approaching (in a step S408). When the person approaching, the posture control portion 594 makes the robot 501 retreat according to the person approaching (in a step S410).

Next, the posture control portion 594 determines whether the person enters the suitable area WA (in a step S412). If the person enters the suitable area WA, the voice guidance control portion 596 controls the speaker 570 to start the voice guidance about the object OB (in a step S414). In addition, when negative determination is obtained at the step S408 or S412, returning to the determination processing of the step S404.

According to the robot 501 of the above-described embodiment, before and after moving by the processing of the interference calculation portion 594A, etc., since the state that the extending direction (the pointing direction) of the index finger portion 543 turns to the position OB1 is maintained, the person who receives the guidance can grasp intuitively the direction that the robot 501 points. As a result, the robot 501 can guide more effectively the gaze of the person who receives the guidance.

Furthermore, according to the robot 501 of this embodiment, when pointing to the direction of the specific position OB1 in the object OB, since the posture that the index finger portion 543 extends on the straight line L connecting the rotation center 524A of the first arm link portion 532 in the shoulder joint portion 524 to the specific position OB1 is formed, the person who receives the guidance can grasp intuitively the direction that the robot 501 points. As a result, the robot 501 can guide more effectively the gaze of the person who receives the guidance.

Furthermore, according to the robot 501 of this embodiment, when pointing to the direction of the specific position OB1 in the object OB, since the robot 501 performs the action that the index finger portion 543 comes and goes on the straight line L while the state that the index finger portion 543 is extending on the straight line L is maintained, the person who receives the guidance can grasp still more nearly intuitively the direction that the robot 501 points. As a result, the robot 501 can guide still more effectively the gaze of the person who receives the guidance.

Furthermore, according to the robot 501 of this embodiment, first, the robot 501 outputs the voice that appeals to come to a self-position to the person H, recedes to the movable area MA according to the person H approaching, and outputs the voice guidance about object OB if the person H enters the suitable area WA, and accordingly, the robot 501 can guide the person to the position easy to see the object OB.

Furthermore, not limited to such the robot, the robot 501 may be a robot that can move by hovercraft, etc., or may have one or three or more arm portions.

Furthermore, the first embodiment to the fourth embodiment can be combined arbitrarily. Then, since it can imagine easily about the combination, a detailed description is omitted here.

In addition, although the word "larger" or "more than" is used about the threshold value, etc. in the above-described embodiments, is should be noted that the meaning of a "larger" or "more than" also includes a meaning of "equal to or larger" or "equal to or more than."

A plurality of programs that are described in the above-described embodiments may be stored in an HDD of the server for data distribution, and distributed to a system having the same structure as the embodiments. Furthermore, these programs may be stored in a storage medium such as an optical disk of CD, DVD, BD (Blu-ray (registered trademark) Disc) or the like, a USB memory, a memory card, etc. and then, such the storage medium may be sold or distributed. In a case where the plurality of programs downloaded via the above-described server or storage medium are installed to a system having the structure equal to the structure of the embodiments, it is possible to obtain advantages equal to advantages according to the embodiments.

In the above, although the form for implementing the present invention is described with using the embodiments, the present invention is not limited to such the embodiments at all, and can add various modification and substitution within a range that do not deviate from the gist of the present invention.

Furthermore, the specific numerical values and the utterance content mentioned in this specification are only examples, and changeable properly in accordance with the change of kind of the exhibition hall and other specifications.

It is to be noted that an inside of the parentheses and the supplements show an example of a corresponding relationship with the embodiments for easy understanding of the present invention, and do not limit the present invention.

An embodiment is a robot control system including a robot that outputs an utterance content to a user in an exhibition hall placing an exhibition, comprising: a recording module that records an inspection action of a user at a time of attendance of the user as a history; and a first output module that makes the robot, when the user attends again, output an utterance content that is determined based on the history.

In the embodiment, the robot control system (100: reference numeral exemplifying a corresponding component or portion in the embodiments, and so forth) includes the robot (10, 501) that can perform an autonomous movement inside the exhibition hall that the exhibition (E, OB) is placed. The recording module (16, S9, 336) records whether each user inspects each exhibition in how long time period (inspection time period), etc. as a history of inspection action. When the user attends again, the first output module (16, S27, S29) reads the history of inspection action, determines an utterance content based on the history, and make the robot output the utterance content. For example, when there is a record that the user inspects about the specific exhibition for a comparatively long time, the utterance content as "you seeing xxx well" may be output. For example, if there is a history of inspection action that the user only passes through the exhibition hall without seeing most the exhibition, the utterance content such as "please see slowly" may be output.

According to the embodiment, since an utterance content is output according to the history of inspection action of the user, it is possible to provide appropriate guidance information for the user.

Another embodiment is a robot control system, wherein the first output module makes an utterance content that is determined based on the history of inspection action at a last time attendance of the user be output.

In this embodiment, if there is a record that the user inspects about the specific exhibition for a comparatively long time, for example, an utterance content such as "It seems you did see xxx well last time, please also see further exhibition this time" may be output. For example, if there is a history of inspection action that the user only passes through the exhibition hall without seeing most the exhibition, an utterance content such as "Although it seems you did not see very much last time, please see slowly this time" may be output.

According to this embodiment, since the utterance content that is determined based on the history of inspection action at the last time attendance is output, since it is possible not only to provide the appropriate guidance information for the user but to give an impression that the robot is observing the user well, it is expectable to increase a sense of closeness for the robot of the user.

A further embodiment is a robot control system, wherein the utterance content includes a phrase that mentions the inspection action at the last time attendance of the user.

In the further embodiment, the utterance content that includes a phrase mentioning directly to the inspection action last time such as "it seems you did see xxx well last time", or "it seems you did not see very much last time" may be output.

According to the further embodiment, since the utterance content including the phrase that mentions the inspection action at the last time attendance of the user is output, it is possible to give a strong impression that the robot is observing the user well, and it is expectable to increase a sense of closeness for the robot of the user.

A still further embodiment is a robot control system, further comprising a second output module (16, S61, S95) that makes the robot output an utterance content about the exhibition when a predetermined condition is satisfied.

A yet further embodiment is a robot control system, wherein the predetermined condition includes at least one of that the user enters a predetermined range corresponding to an exhibition and that the direction of the user turns to the exhibition.

According to the still further embodiment and the yet further embodiment, it is possible to provide the utterance content concerning an exhibition adequately when the user gets interested in the exhibition.

A further embodiment is a robot control method performed by a computer of a robot control system including a robot that outputs a utterance content to a user in an exhibition hall placing an exhibition, comprising steps of: recording an inspection action of a user at a time of attendance of the user as a history; and making the robot, when the user attends again, output an utterance content that is determined based on the history.

According to the further embodiment, since an utterance content is output according to the history of inspection action of the user, it is possible to provide appropriate guidance information for the user.

A still further embodiment is a robot control system including a robot capable of autonomously moving in a space that an exhibition is placed, comprising: an acquiring module that acquires a position and a direction of a user in the space; a first determining module that determines whether the user enters a predetermined range corresponding to the exhibition; a second determining module that determines whether the direction of the user turns to the exhibition, and an outputting module that makes the robot output an utterance content about the exhibition when it is determined that the user enters the predetermined range and that the direction of the user turns to the exhibition.

In the still further embodiment, the robot (10, 501) of the robot control system (100) does autonomous movement of the inside of the space placing therein the exhibition (E, OB). The acquiring module (16, S53, S65) acquires a position and a direction that are detected by range image sensors (12) installed on a ceiling of the space, for example. The first determining module (16, S55) determines whether the position of the user is detected within the predetermined range corresponding to the center point (C) of the exhibition, for example. The second determining module (16, S57) determines whether the direction of a body of the user turns to the center point of the exhibition, for example. If the user approaches the exhibition and enters the predetermined range and turns to the exhibition, the output module (16, S61, S95) applies an utterance content to the robot, and the robot outputs the utterance content concerning the exhibition to the user.

According to the still further embodiment, it is possible to provide the utterance content concerning an exhibition adequately when the user gets interested in the exhibition.

A yet further embodiment is a robot control system, further comprising a third determining module that determines whether the user is out of the predetermined range; and a stop module that stops the output of the utterance content when it is determined that the user is out of the predetermined range.

In the yet further embodiment, it is determined by the third determining module (16, S67) whether the user to whom the utterance content is output, for example, is out of the predetermined range. Then, the stop module (16, S69) stops the output of the utterance content if the user to whom the utterance is currently output moves to an outside of the predetermined range, for example.

According to the yet further embodiment, since it is thought that the user is not interested in the exhibition, it is possible to stop offer of the utterance content.

A further embodiment is a robot control system, further comprising a presuming module that presumes a degree of intimacy between the user and the robot, and a determination module that determines an action of the robot based on a presumed degree of intimacy.

In the further embodiment, the presuming module (16, S89, S95) presumes the depth (height) of the degree of intimacy between the user and the robot according to a level, for example. The determination module (16, S91, S93) determines the action such as a movement speed, etc., for example, based on the degree of intimacy. For example, the robot moves to the user with the movement speed that is determined based on the degree of intimacy, and outputs the utterance content to the user.

According to the further embodiment, since the action of the robot changes according to the presumed degree of intimacy, the user can realize how depending that the degree of intimacy with the robot deepens.

A still further embodiment is a robot control system, wherein the determination module determines at least one of a reaction time until the robot begins to move, a movement speed when approaching, a distance to the user and a standing position, and a waiting position.

A yet further embodiment is a robot control system, further comprising a storing module storing that an utterance content is output to the user, wherein the output modules outputs an utterance content different from the utterance content at the last time when it is determined that the user to whom it is stored that the utterance content is output and the direction of the user turns to the exhibition.

In the yet further embodiment, the storing module (16, S97, S99, S103) stores that the utterance content is output for each user when a plurality of users are in the space, for example. For example, to the user to whom the utterance content has been output, an utterance content that is different from the last time is output.

According to the yet further embodiment, it is possible to prevent the robot from giving the same explanation to the same user repeatedly. Therefore, the user can acquire different knowledge at every seeing the exhibition.

A further embodiment is a robot control system, wherein the utterance content that is different from the last time includes an abstract of the utterance content already output to the user.

A still further embodiment is a robot control system, wherein the storing module includes a stop storing module storing that the output of the utterance content is stopped, and the output module outputs an utterance content different from last time when it is determined that the user to whom it is stored that the output of the utterance content is stopped enters the predetermined range and that the direction of the user turns to the exhibition.

In the still further embodiment, when the user goes out of the predetermined range and the output of the utterance content is stopped, the stop storing module (16, S99) stores that the output of the utterance content stopped. For example, at a time that an utterance content is to be output again to the user who left during outputting of the utterance content, an utterance content that is derived from the exhibition is output.

According to the still further embodiment, the user who did not hear the last time utterance content to the last can acquire the knowledge derived from the exhibition.

A yet further embodiment is a robot control system, wherein the storing module includes a completion storing module storing that the output of the utterance content is completed, and the output module outputs an utterance content different from last time when it is determined that the user to whom it is stored that the output of the utterance content is completed enters the predetermined range and that the direction of the user turns to the exhibition.

In the yet further embodiment, when the output of the utterance content to the user is completed, the completion storing module (16, S97) stores that the output of the utterance content is completed. For example, an utterance content that explains deeper contents to the exhibition is output to the user who listens to the explanation from the robot to the last.

According to the yet further embodiment, the user who heard the last time utterance content to the last can deepen the knowledge over the exhibition more.

A further embodiment is a robot control system, further comprising a fourth determining module that determines whether a further user is in a circumference when outputting the utterance content, wherein the storing module stores that the utterance content is output to the further user when it is determined that there is the further user in the circumference.

In the further embodiment, the fourth determining module (16, S101) determines whether a further user exists in the circumference of the user to whom the utterance content is being output, for example. If it is determined that the further user is in the circumference, it is thought that the utterance content is output also to the further user, and therefore, the storing module stores that the utterance content is output also to the further user.

According to the further embodiment, a user needs to cease to receive offer of the same utterance content repeatedly in the space that many users exist.

A still further embodiment is a robot control system, wherein the robot comprises a pointing member for pointing to a direction, and the robot outputs the utterance content while pointing at the exhibition.

In the still further embodiment, the pointing member (60, 64, 66, 543) for pointing to the direction is a hand, arm or the like of the robot, for example. For example, the robot outputs the utterance content in a state that the exhibition is pointed by the hand or the like.

According to the still further embodiment, it is possible to effectively provide the utterance content about the exhibition with using a body of the robot.

A yet further embodiment is a robot control system, wherein the robot (501) further comprises an actuator (560) that drives the pointing member, a moving portion (550) that makes a body portion that the actuator is attached move, and a control portion (594) that controls the actuator such that when making the pointing member point to a direction of the exhibition, at least a part of the pointing member extends on a straight line that connects a predetermined part of the body portion and a position of the exhibition.

According to the yet further embodiment, since the robot is controlled such that at least a part of the pointing member extends on the straight line connecting the predetermined part of the body portion and the position of the exhibition, the user who receives guidance can grasp intuitively the direction that the robot points. As a result, it is possible to guide still more effectively the gaze of the user who receives guidance.

A further embodiment is a robot control system, wherein the control portion controls the actuator such that a state that the exhibition is located in the direction that the pointing member points to can be maintained before and after moving of the body portion by the moving portion.

According to the further embodiment, since the state that the exhibition is located in the direction that the pointing member points to is maintained before and after the body portion moves by the moving portion, the user who receives the guidance can grasp intuitively the direction that the robot points. As a result, it is possible to guide more effectively the gaze of the user who receives the guidance.

A still further embodiment is a robot control system, further comprising a detection portion (512, 592) that detects a position of the user, wherein the control portion controls the moving portion to make the body portion keep away from the user when the body portion is in an area centering on the user.

According to the still further embodiment, since the robot comprises the detection portion that detects the position of the user, and the control portion controls the moving portion to make the body portion keep away from the user when the body portion is in an area centering on the user, an interference with the user can be prevented.

A yet further embodiment is a robot control system, wherein the control portion controls, when controlling the moving portion to keep away the body portion from the user, the moving portion to make the body portion move without changing the direction of the body portion, and then, controls the moving portion to make the body portion turn and move to a target position that is determined based on the position of the exhibition.

According to the yet further embodiment, since the control portion controls, when controlling the moving portion to keep away the body portion from the user, the moving portion to make the body portion move without changing the direction of the body portion, and then, controls the moving portion to make the body portion turn and move to a target position that is determined based on the position of the exhibition, it is possible to prevent the robot interfering with the user by turning.

A further embodiment is an output control method in a robot control system including a robot capable of autonomously moving in a space that an exhibition is placed, wherein a processor of the robot control system performing: an acquiring step that acquires a position and a direction of a user in the space; a first determining step that determines whether the user enters a predetermined range corresponding to the exhibition; a second determining step that determines whether the direction of the user turns to the exhibition, and an outputting step that makes the robot output an utterance content about the exhibition when it is determined that the user enters the predetermined range and that the direction of the user turns to the exhibition.

According to the further embodiment, it is possible to provide the utterance content concerning the exhibition adequately when the user gets interested in the exhibition.

In the above embodiment, when the user exists in the explainable range Ai of the exhibition Ei, it is assumed that the user inspects the exhibition Ei. However, when the user exists in the explainable range Ai of the exhibition Ei, it may be assumed that the user looks at attentively the exhibition Ei, that is, the user views the exhibition Ei. In such an embodiment, "inspection" may be replaced with "viewing," for example, "viewing action" instead of "inspection action," or "viewing time period" instead of "inspection time period."

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. A robot control system including a robot that outputs an utterance content to a user in an exhibition hall placing an exhibition, comprising:
   a recording module that records to a memory device an inspection action of a user at a time of attendance of the user in the exhibition hall as a history, the history comprises the exhibition placed in the hall and an inspection time period spent by the user for inspection as to the exhibition; and
   a first output module that, when the user attends again, determines an appropriate utterance content by using the history associated with the attending user, and makes the robot output the determined utterance content.

2. A robot control system according to claim 1, wherein the first output module makes the utterance content that is determined based on the history of inspection action at a last time attendance of the user be output.

3. A robot control system according to claim 2, wherein the utterance content includes a phrase that mentions the inspection action at the last time attendance of the user.

4. A robot control system according to claim 1, further comprising a second output module that makes the robot output the utterance content about the exhibition when a predetermined condition is satisfied.

5. A robot control system according to claim 4, wherein the predetermined condition includes at least one of that the user enters a predetermined range corresponding to the exhibition and that the direction of the user turns to the exhibition.

6. A robot control system according to claim 1, wherein the history comprises a plurality of exhibitions placed in the hall and an inspection time period spent by the user for inspection as to respective exhibitions.

7. A robot control method performed by a computer of a robot control system including a robot that outputs an utterance content to a user in an exhibition hall placing an exhibition, comprising steps of:
  recording to a memory device an inspection action of the user at a time of attendance of the user in the exhibition hall as a history, the history comprises the exhibition placed in the hall and an inspection time period spent by the user for inspection as to the exhibition;
  when the user attends again, determining an appropriate utterance content by using the history associated with the attending user; and
  making the robot output the determined utterance content.

8. A robot control method according to claim 7, wherein the history comprises a plurality of exhibitions placed in the hall and an inspection time period spent by the user for inspection as to respective exhibitions.

9. A robot control system including a robot capable of autonomously moving in a space that an exhibition is placed, comprising:
  an acquiring module that acquires a position and a direction of a user in the space;
  a first determining module that determines whether the user enters a predetermined first range corresponding to the exhibition;
  a second determining module that determines whether the direction of the user turns to the exhibition; and
  an outputting module that makes the robot output an utterance content about the exhibition when it is determined that the user enters the predetermined first range and that the direction of the user turns to the exhibition;
  a third determining module that determines whether the user is out of a second range; and
  a stop module that stops the output of the utterance content when it is determined that the user is out of the second range,
  wherein the second range surrounds the predetermined first range and is broader than the predetermined first range.

10. A robot control system according to claim 9, further comprising a presuming module that presumes a degree of intimacy between the user and the robot, and
  a determination module that determines an action of the robot based on the presumed degree of intimacy.

11. A robot control system according to claim 10, wherein the determination module determines at least one of a reaction time until the robot begins to move, a movement speed when approaching, a distance to the user and a standing position, and a waiting position.

12. A robot control system according to claim 9, further comprising a storing module storing that the utterance content is output to the user, wherein
  the outputting module outputs the utterance content different from the utterance content at the last time when it is determined that the user to whom it is stored that the utterance content is output and the direction of the user turns to the exhibition.

13. A robot control system according to claim 12, wherein the utterance content that is different from the last time includes an abstract of the utterance content already output to the user.

14. A robot control system according to claim 12, wherein the storing module includes a stop storing module storing that the output of the utterance content is stopped, and
  the outputting module outputs the utterance content different from last time when it is determined that the user to whom it is stored that the output of the utterance content is stopped enters the predetermined range and that the direction of the user turns to the exhibition.

15. A robot control system according to claim 12, wherein the storing module includes a completion storing module storing that the output of the utterance content is completed, and
  the outputting module outputs the utterance content different from last time when it is determined that the user to whom it is stored that the output of the utterance content is completed enters the predetermined range and that the direction of the user turns to the exhibition.

16. A robot control system according to claim 12, further comprising a fourth determining module that determines whether a further user is in a circumference when outputting the utterance content, wherein
  the storing module stores that the utterance content is output to the further user when it is determined that there is the further user in the circumference.

17. A robot control system according to claim 9, wherein the robot comprises a pointing member for pointing to a direction, and the robot outputs the utterance content while pointing at the exhibition.

18. A robot control system according to claim 17, wherein the robot further comprises
  an actuator that drives the pointing member,
  a moving portion that makes a body portion that the actuator is attached move, and
  a control portion that controls the actuator such that when making the pointing member point to a direction of the exhibition, at least a part of the pointing member extends on a straight line that connects a predetermined part of the body portion and a position of the exhibition.

19. A robot control system according to claim 18, wherein the control portion controls the actuator such that a state that the exhibition is located in the direction that the pointing member points to can be maintained before and after moving of the body portion by the moving portion.

20. A robot control system according to claim 18, further comprising a detection portion that detects a position of the user, wherein
  the control portion controls the moving portion to make the body portion keep away from the user when the body portion is in an area centering on the user.

21. A robot control system according to claim 20, wherein the control portion controls, when controlling the moving portion to keep away the body portion from the user, the moving portion to make the body portion move without changing the direction of the body portion, and then, controls the moving portion to make the body portion turn and move to a target position that is determined based on the position of the exhibition.

22. An output control method in a robot control system including a robot capable of autonomously moving in a space that an exhibition is placed, wherein a processor of the robot control system performing:
- an acquiring step that acquires a position and a direction of a user in the space;
- a first determining step that determines whether the user enters a predetermined first range corresponding to the exhibition;
- a second determining step that determines whether the direction of the user turns to the exhibition;
- an outputting step that makes the robot output an utterance content about the exhibition when it is determined that the user enters the predetermined first range and that the direction of the user turns to the exhibition;
- a third determining step that determines whether the user is out of a second range; and
- a stopping step that stops the output of the utterance content when it is determined that the user is out of the second range,
- wherein the second range surrounds the predetermined first range and is broader than the predetermined first range.

* * * * *